US009669950B2

(12) United States Patent
Rembala et al.

(10) Patent No.: US 9,669,950 B2
(45) Date of Patent: Jun. 6, 2017

(54) SPACECRAFT CAPTURE MECHANISM

(71) Applicant: MACDONALD, DETTWILER & ASSOCIATES INC., Brampton (CA)

(72) Inventors: Richard Rembala, Toronto (CA); Andrew Turner, Mississauga (CA); Justin Charbonneau, Toronto (CA)

(73) Assignee: MACDONALD, DETTWILER AND ASSOCIATES INC., Brampton, ON (CA)

( * ) Notice: Subject to any disclaimer, the term of this patent is extended or adjusted under 35 U.S.C. 154(b) by 0 days.

(21) Appl. No.: 14/703,709

(22) Filed: May 4, 2015

(65) Prior Publication Data

US 2015/0314893 A1 Nov. 5, 2015

Related U.S. Application Data

(60) Provisional application No. 61/987,860, filed on May 2, 2014.

(51) Int. Cl.
*B64G 4/00* (2006.01)
*B64G 1/10* (2006.01)
(Continued)

(52) U.S. Cl.
CPC ............. *B64G 4/00* (2013.01); *B64G 1/1078* (2013.01); *B64G 1/222* (2013.01); *B64G 1/646* (2013.01); *B64G 2004/005* (2013.01)

(58) Field of Classification Search
CPC ........ B64G 1/1078; B64G 1/646; B64G 4/00; B25J 15/00; B25J 15/0206; B25J 15/10;
(Continued)

(56) References Cited

U.S. PATENT DOCUMENTS 3,346,929 A 10/1967 Webb
3,391,881 A 7/1968 Maltby
(Continued)

FOREIGN PATENT DOCUMENTS

GB 1201749 8/1970
JP 04011600 1/1992
(Continued)

OTHER PUBLICATIONS

NASA Tech Brief, Docking System Would Accommodate Misalignments. NTIS Tech Notes, US Department of Commerce. Springfield, VA,US, Dec. 1, 1991 (Dec. 1, 1991), p. 921, XP000278878 ISSN: 0889-8464.
(Continued)

*Primary Examiner* — Valentina Xavier
(74) *Attorney, Agent, or Firm* — Lynn C. Schumacher; Stephen W. Leonard; Hill & Schumacher

(57) ABSTRACT

The present invention provides a capture mechanism for capturing and locking onto the Marman flange located on the exterior surfaces of spacecraft/satellites. The capture mechanism achieves its goal of quickly capturing a client spacecraft by splitting the two basic actions involved into two separate mechanisms. One mechanism performs the quick grasp of the target while the other mechanism rigidises that grasp to ensure that the target is held as firmly as desired.

35 Claims, 50 Drawing Sheets

(51) Int. Cl.
*B64G 1/64* (2006.01)
*B64G 1/22* (2006.01)

(58) Field of Classification Search
CPC .. B25J 18/025; B25J 15/0009; B25J 15/0028; B25J 15/08; B25J 15/103; B25J 19/0091; B25J 15/0226
See application file for complete search history.

(56) References Cited

U.S. PATENT DOCUMENTS

| | | | |
|---|---|---|---|
| 3,820,741 | A | 6/1974 | Ratcliff |
| 4,195,804 | A | 4/1980 | Hujsak et al. |
| 4,219,171 | A | 8/1980 | Rudmann |
| 4,260,187 | A | 4/1981 | Bejczy |
| 4,273,305 | A | 6/1981 | Hinds |
| 4,391,423 | A | 7/1983 | Pruett et al. |
| 4,718,709 | A | 1/1988 | Myers et al. |
| 4,810,019 | A | 3/1989 | Brucher |
| 4,898,348 | A | 2/1990 | Kahn |
| 4,929,011 | A | 5/1990 | Vandersluis et al. |
| 5,040,748 | A | 8/1991 | Torre et al. |
| 5,094,410 | A | 3/1992 | Johnson |
| 5,735,626 | A | 4/1998 | Khatiblou et al. |
| 6,840,481 | B1 | 1/2005 | Gurevich |
| 6,969,030 | B1 | 11/2005 | Jones et al. |
| 7,070,151 | B2 | 7/2006 | D'Ausilio et al. |
| 7,207,525 | B2 | 4/2007 | Bischof et al. |
| 7,370,896 | B2 | 5/2008 | Anderson et al. |
| 7,828,249 | B2 | 11/2010 | Ritter et al. |
| 7,857,261 | B2 | 12/2010 | Tchoryk, Jr. et al. |
| 2005/0103940 | A1* | 5/2005 | Bischof ............. B25J 15/10 244/172.4 |
| 2005/0178816 | A1 | 8/2005 | Stevenson et al. |
| 2009/0173832 | A1 | 7/2009 | Hays et al. |
| 2013/0249229 | A1 | 9/2013 | Roberts et al. |

FOREIGN PATENT DOCUMENTS

| | | |
|---|---|---|
| JP | 04151400 | 5/1992 |
| JP | 2009532252 | 9/2009 |
| WO | 20071426526 | 8/2007 |
| WO | 2013138936 | 9/2013 |

OTHER PUBLICATIONS

International Search Report for PCT/CA2013/050227 mailed Jul. 25, 2013.
Naasz, B., Satellite Servicing Capabilities Office, Second International Workshop on On-Orbit Satellite Servicing, May 30-31, 2012, NASA Goddard Space Flight Center, Greenbelt, MD (http://ssco.gsfc.nasa.gov/workshop_2012/Naasz_session%20presentation_final_2012_Workshop.pdf).
Reed, B., Satellite Servicing Capabilities Office, In-Space Nondestructive Inspection Technology Workshop, Jan. 13, 2012 (http://www.nasa.gov/pdf/628324main_6-4_Reed.pdf).
International Search Report in PCT/CA2015/050387 dated Aug. 24, 2015.

* cited by examiner

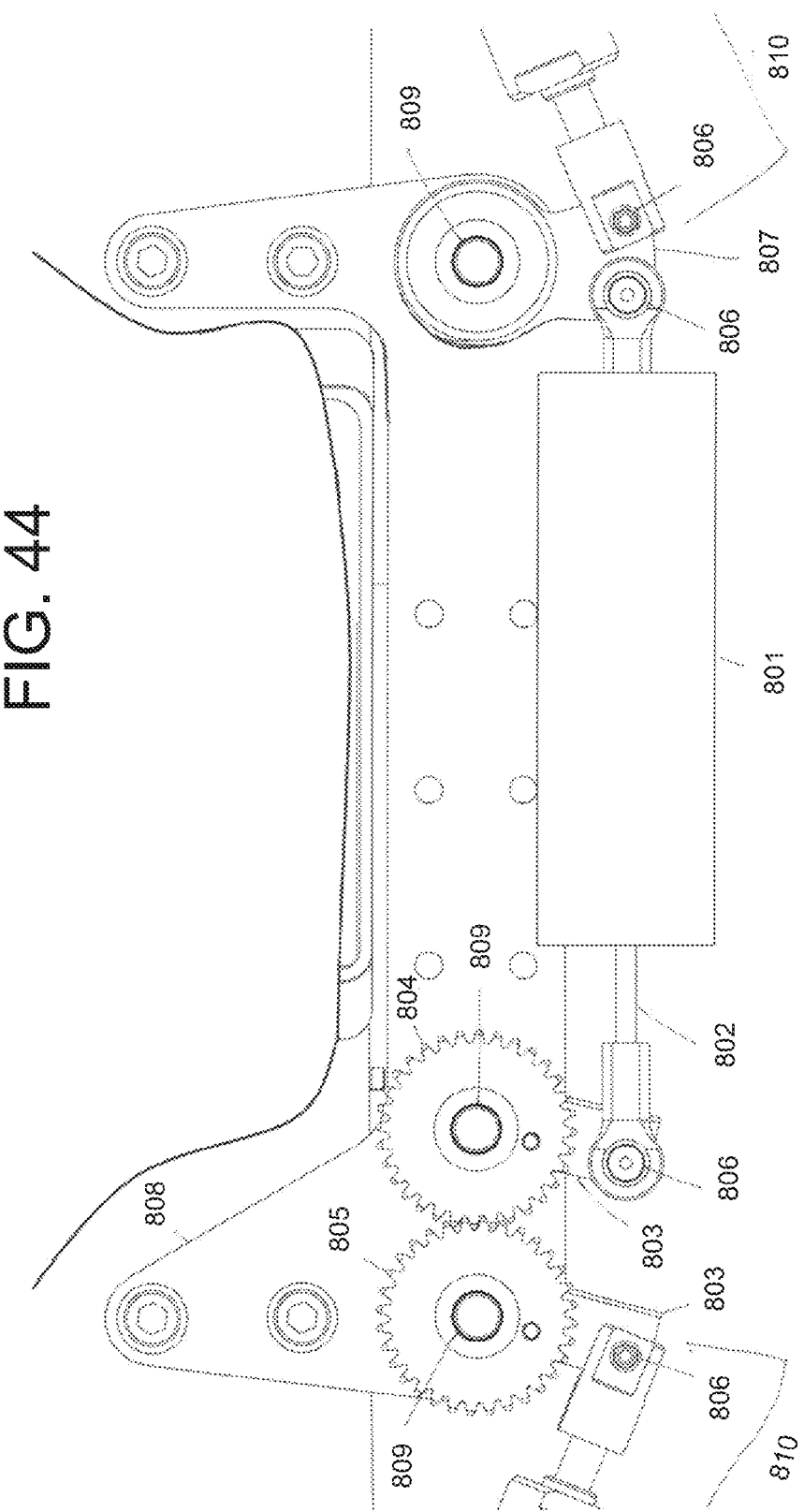

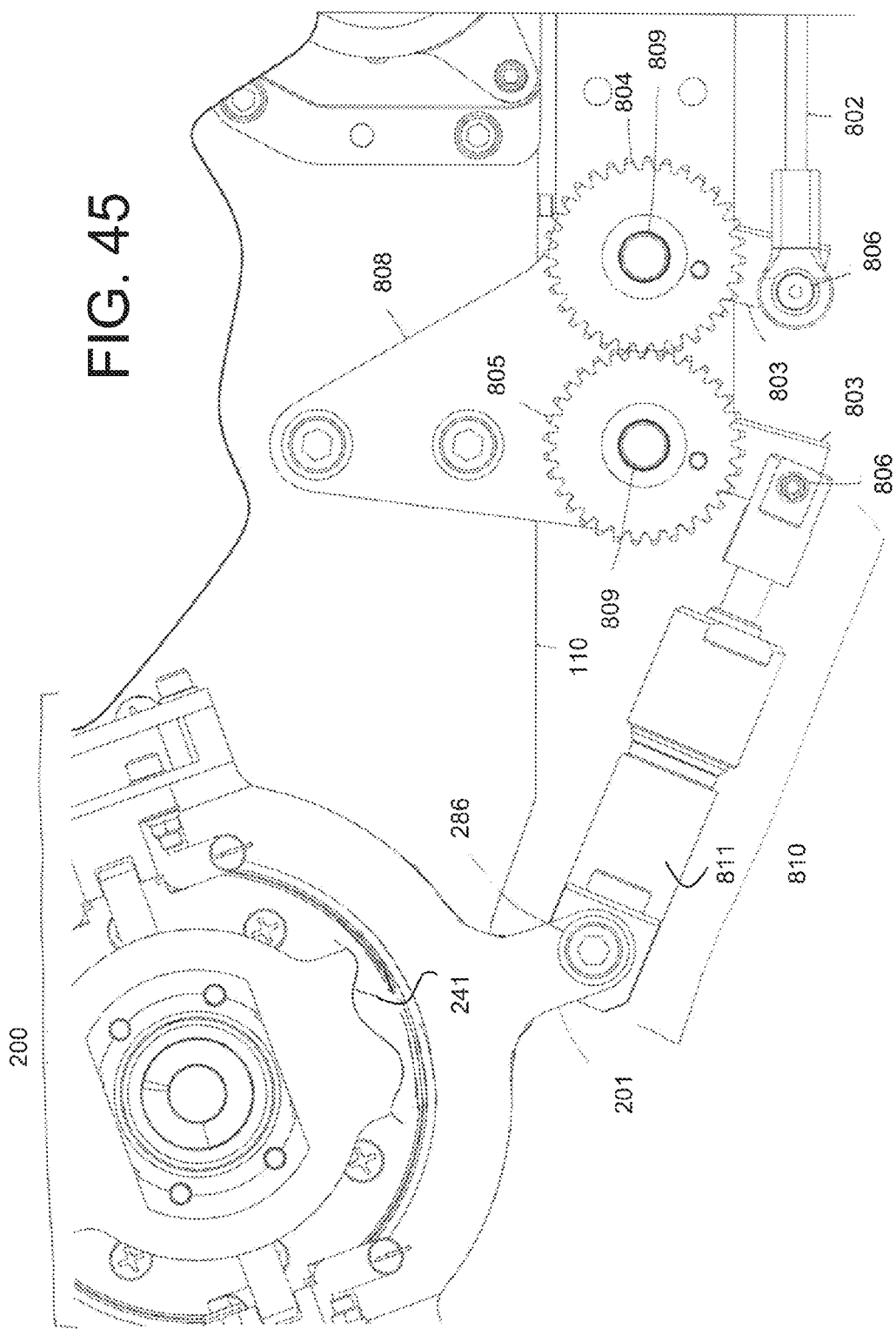

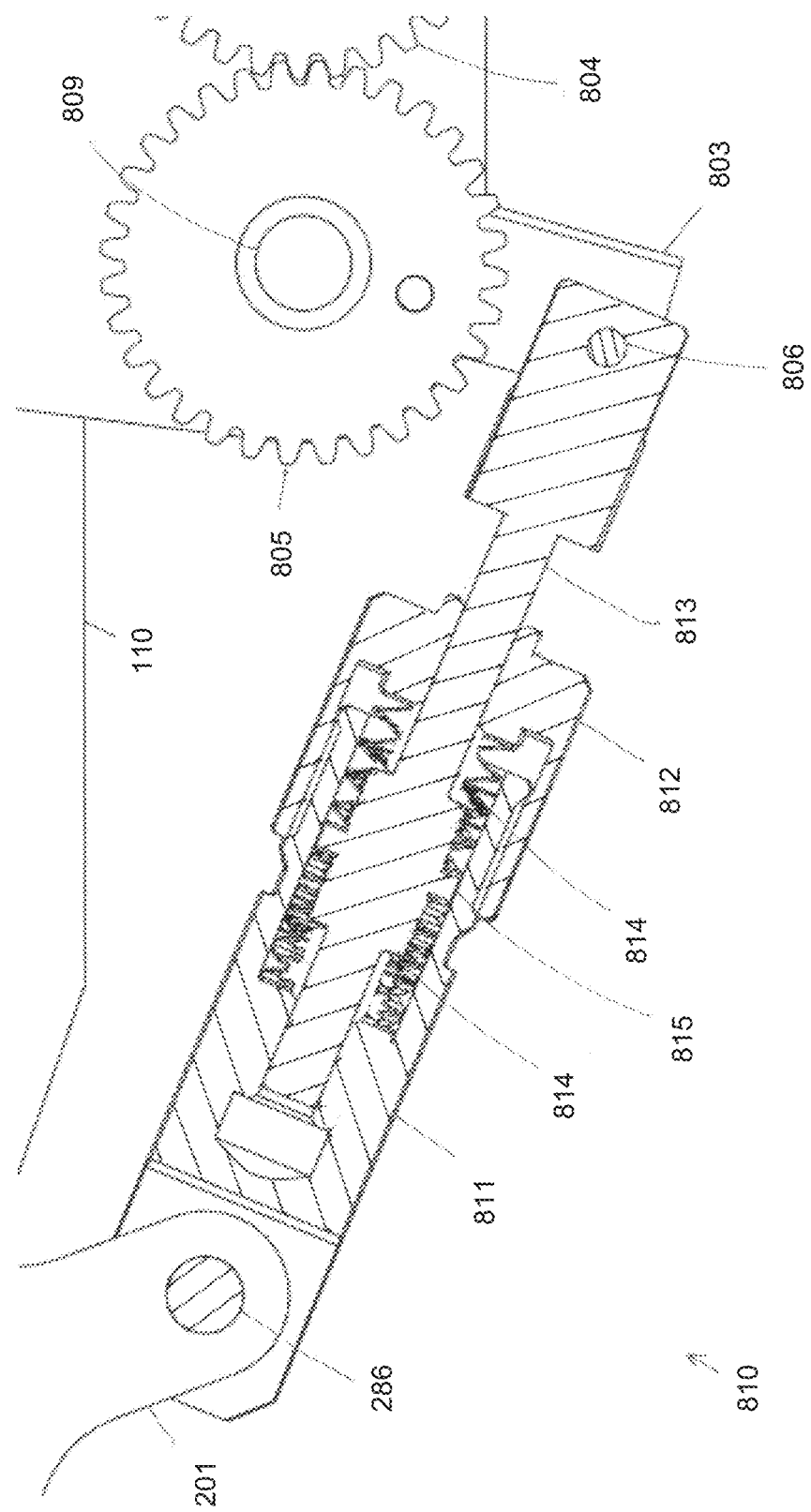

SPACECRAFT CAPTURE MECHANISM

FIELD

The present invention relates to mechanisms for capturing spacecraft, and more particularly the present invention relates to a capture device for capturing and rigidising a bracket mounted on a spacecraft.

BACKGROUND

Grappling free flying target objects in space involves systems which possess the following capabilities: acquiring the location of the target object's position relative to the capture mechanism, establishing and tracking the relative motion of the target and capture mechanism, effecting a timely reduction in the relative separation between the two objects and then acting to capture the target object fast enough that it is grasped by the capture mechanism before the target moves out of the way on its own or is knocked away by the capture mechanism (an event known as "tip off"). The methods by which the relative positions and motions of the capture mechanism and the target object are established and tracked and the methods by which the capture mechanism is moved into position to capture are not part of this description. In general these may be accomplished through the orbital and attitude control of the captured spacecraft and in some cases augmented with manipulator arms which provide further dexterity and speed in the final stage of approach and positioning of the capture device with respect to the spacecraft which is to be captured. All these techniques are well known to those skilled in the art.

Capture mechanisms do, however, play a part in how large the relative movement can be between the target object and the capture mechanism. The faster the capture mechanism can perform an initial capture, the greater the relative motion can be between the two objects. This is because if the mechanism acts quickly enough, the target will have less time to move out of the way. For a given mechanism, the faster it works, the faster the relative motions can be between target object and capture mechanism. Providing a capture mechanism that permits a greater relative motion between the capture mechanism and the target object has significant benefits in potentially simplifying the design of the capture spacecraft if not the client spacecraft.

SUMMARY

The capture mechanism disclosed herein is designed with a view to capturing several of the standard spacecraft Marman clamp flange interfaces (see attached interface documents for specific variations), frequently called Launch Adapter Rings. The vast majority of satellites launched for Western customers, both commercial and military, use this interface due to its heritage and reliability. That said, the capture mechanism disclosed herein can be used to quickly capture other client spacecraft protrusions, the key criteria being the ability of the mechanism jaws to close on the protrusion from both sides and that, when closed, at least one side of the target protrusion has an extended profile that at least one part of the two sets of jaws can get behind with which to contain the target. Examples of potentially suitable target profiles would include, but not be limited to, personnel handles and grab rails, I-beams and C-channels, T-fittings, pipes, structural members, etc. As used herein the word "profile" refers to the cross sectional shape of the capture feature.

An embodiment of a system for system for capturing a capture feature on a free flying spacecraft comprises:
a capture mechanism including
  i) a quick grasp mechanism mounted for movement in a housing, said quick grasp mechanism including at least two spaced pairs of grasping jaws and a closing/opening mechanism connected to said at least two pairs of grasping jaws for closing/opening each pair of grasping jaws, said quick grasp mechanism being configured for forcing said at least two pairs of spaced grasping jaws together around said capture feature to grasp the capture feature when the capture feature is in close proximity to, and triggers, said quick gasp mechanism to soft capture the capture feature;
  ii) said at least two pairs of grasping jaws including structural features configured to accommodate local variations in size and shape of the capture feature at at least two locations on the capture feature being grasped by said at least two pairs grasping jaws; and
  ii) a rigidizing mechanism including a rigidizing contact feature, said rigidizing mechanism being configured to force said at least two spaced grasping jaws further together to a closed position and at the same time driving said rigidizing contact feature into contact with said capture feature within said at least two grasping jaws to secure said capture feature within said closed grasping jaws between said rigidizing contact and said closed grasping jaws, to rigidize the capture feature and the spacecraft.

In another embodiment there is provided a capture mechanism for capturing a capture feature on a free flying spacecraft, comprising:
  i) a quick grasp mechanism mounted for movement in a housing, said quick grasp mechanism including a pair of opposed grasping jaws and a closing/closing mechanism connected to said opposed grasping jaws for closing/opening said pair of grasping jaws, said quick grasp mechanism being configured for forcing said pair of grasping jaws together around said capture feature to grasp the capture feature;
  ii) at least one grasping jaw of said pair of grasping jaws including one or more distal end portions which are flexibly mounted to a remainder of the at least one grasping jaw, and are shaped and sized to accept a range of capture feature shape profiles;
  iii) a rigidizing mechanism including a rigidizing contact feature, said rigidizing mechanism being configured to force said pair of grasping jaws further together to a closed position and at the same time driving said rigidizing contact feature into contact with said capture feature within said at least two grasping jaws to secure said capture feature within said closed grasping jaws between said rigidizing contact and said closed grasping jaws, to rigidize the capture feature and the spacecraft.

The system may include
a) a positioning device attached to the capture mechanism capable of positioning the capture mechanism into close proximity to the feature to trigger the quick grasp mechanism; and
b) a sensing system for ascertaining a relative position and motion of the capture mechanism and the feature to be captured
c) a sensing system for ascertaining the relative or absolute positions of various elements within the capture mechanism.

In addition, the system may include a computer control system connected to said sensing system and programmed to position the capture mechanism in close proximity to said feature to be captured to trigger said quick grasp mechanism.

There is also disclosed herein a servicer satellite for capturing a capture feature on a free flying client satellite, comprising:
a) propulsion and guidance systems;
b) a capture mechanism, the capture mechanism comprising
   ii) said at least two pairs of grasping jaws including structural features configured to accommodate local variations in size and shape of the capture feature at at least two locations on the capture feature being grasped by said at least two pairs grasping jaws; and
   ii) a rigidizing mechanism including a rigidizing contact feature, said rigidizing mechanism being configured to force said at least two spaced grasping jaws further together to a closed position and at the same time driving said rigidizing contact feature into contact with said capture feature within said at least two grasping jaws to secure said capture feature within said closed grasping jaws between said rigidizing contact and said closed grasping jaws, to rigidize the capture feature and the spacecraft
c) a positioning mechanism releasably attached to the capture mechanism capable of positioning the capture mechanism to a desired proximity to the capture feature to trigger the quick grasp mechanism;
d) a sensing system for ascertaining a relative position of the capture mechanism and the capture feature; and
e) a communication system configured to provide communication between a command and control system and a remote operator for remote teleoperator control, supervised autonomous control, or fully autonomous control of all servicer satellite operations and operation of said capture mechanism between the servicer spacecraft and the client satellite.

In an embodiment there is provided a method for capturing a capture feature on a free flying spacecraft, comprising:
a) maneuvering a servicer satellite in proximity to a free flying spacecraft;
b) positioning a capture mechanism mounted on the servicer satellite into proximity to a capture feature located on the free flying spacecraft, the capture mechanism including
   i) a quick grasp mechanism mounted for movement in a housing, said quick grasp mechanism including at least two spaced pairs of grasping jaws and a closing/closing mechanism connected to said at least two pairs of grasping jaws for closing/opening each pair of grasping jaws, said quick grasp mechanism being configured for forcing said at least two spaced grasping jaws together around said capture feature to grasp the capture feature;
   ii) said at least two pairs of grasping jaws including structural features configured to accommodate local variations in size and shape of the capture feature at at least two locations on the capture feature being grasped by said at least two pairs grasping jaws; and
   ii) a rigidizing mechanism including a rigidizing contact feature, said rigidizing mechanism being configured to force said at least two spaced grasping jaws further together to a closed position and at the same time driving said rigidizing contact feature into contact with said capture feature within said at least two grasping jaws to secure said capture feature within said closed grasping jaws between said rigidizing contact and said closed grasping jaws, to rigidize the capture feature and the spacecraft;
c) once the capture mechanism is in proximity to said capture feature, advancing the capture mechanism until quick grasp mechanism is in position and triggering the quick grasp mechanism to close said at least two pairs of grasping jaws to soft capture the capture feature, activating the rigidizing mechanism to rigidize the capture feature and the free flying spacecraft; and
d) after servicing the free flying spacecraft, disengaging the capture mechanism from the capture feature and maneuvering a servicer satellite away from the free flying spacecraft.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which:

FIG. 19A shows the mechanism at the moment the trigger mechanism is activated, FIG. 19B shows the jaws closed to the soft capture position just as the rigidisation starts, FIG. 19C shows the bracket fully captured and seated within the jaws but without any preload applied, FIG. 19D shows the mechanism fully preloaded within the mechanism, FIG. 19E shows the optional locking latch engaged to restrain the bracket within the jaws.

FIG. 44 is a detail view showing how a linear actuator 801 is integrated within the jaw adjustment system 800

FIG. 45 is a detail that shows how the jaw compliance mechanism 810 is integrated within the jay adjustment system 800

FIG. 46 is a section through the jaw compliance mechanism 810.

DETAILED DESCRIPTION

Figure 1:
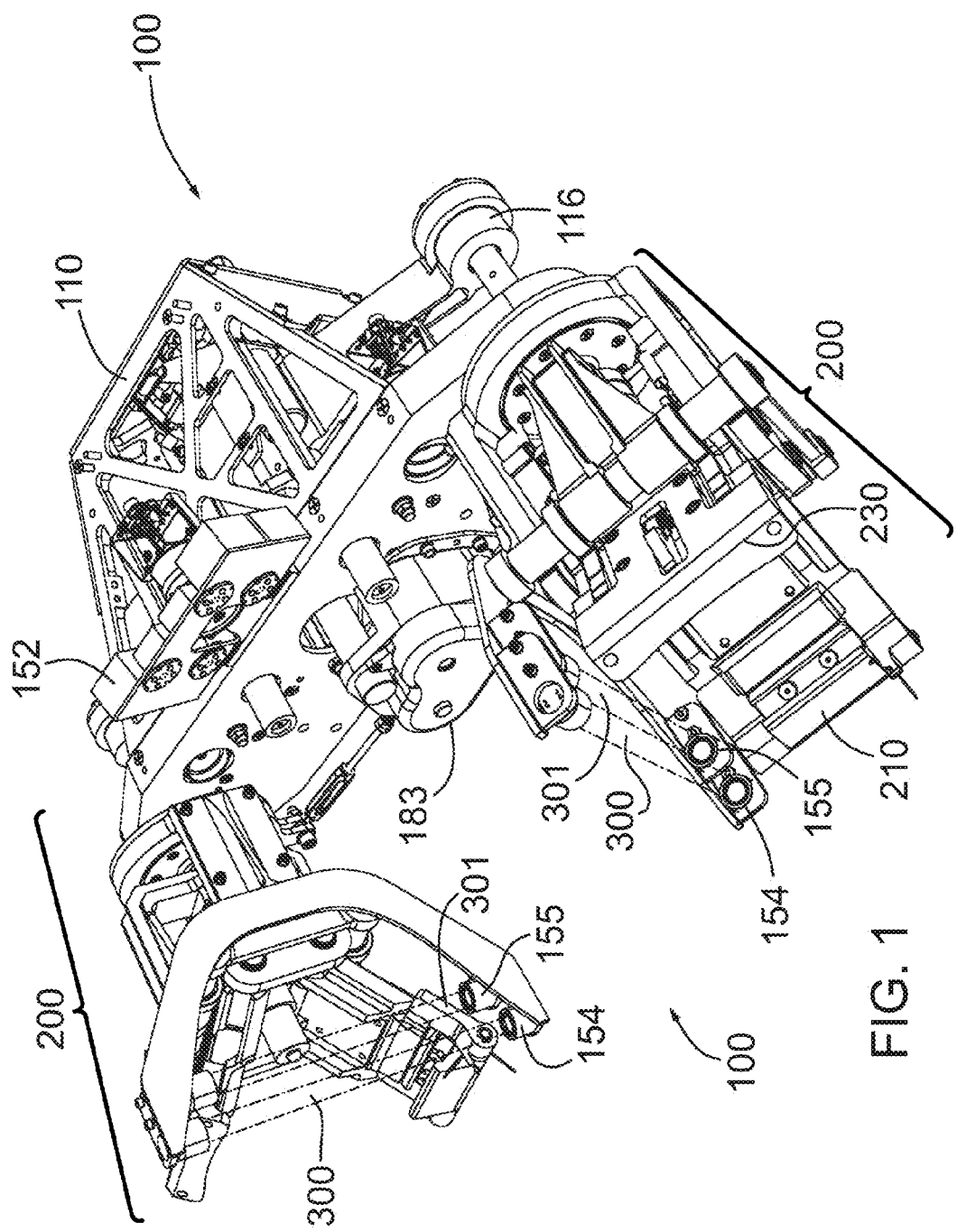
FIG. 1 shows a perspective view of the capture mechanism of the present invention in the open position as if approaching a bracket located on a spacecraft.

Various embodiments and aspects of the disclosure will be described with reference to details discussed below. The following description and drawings are illustrative of the disclosure and are not to be construed as limiting the disclosure. The drawings are not necessarily to scale. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

As used herein, the phrase "rigidized" refers to a joint, union or contact between two items where a predetermined amount of stiffness has been achieved between the two items. The term "rigidizing" refers to the process of achieving this condition.

The capture device disclosed herein has been conceived to address two types of spacecraft/space object capture. In general, it is for capturing "non-prepared" objects. This refers to a class of client spacecraft which were not designed with purpose-made features that would be used for later capture by a servicing spacecraft once the client spacecraft was in orbit. The capture device has been designed to capture through a grasping action of natural features like launch adapter rings which are present on most spacecraft for the purposes of attachment to the launch vehicle prior to release on-orbit. Other natural features such as rails would also be applicable.

A secondary feature of these non-prepared spacecraft for which this proposed capture device is intended is non-cooperative spacecraft. These are client spacecraft which are no longer under standard attitude control with the spacecraft no longer held in a stable attitude, but are instead are tumbling, i.e. rotating in one or more axis with respect to their desired pointing direction. In non-tumbling capture, the rendezvousing servicer spacecraft generally is moving relative to the client on a single axis of motion. In capturing a tumbling spacecraft, the servicer spacecraft and/or its manipulator arm must close the separation between it and the client in a number of axes. This puts a premium on the capture device being able to quickly grasp the tumbling spacecraft in what is a much narrower capture zone time, generally limited by the responsiveness of the spacecraft attitude and orbital control system and the responsiveness and peak rates of the manipulator arm.

The pool of viable clients will increase with the capture mechanism's ability to more quickly capture a mechanical feature on the client over a larger range of relative motion. In addition, the spacecraft carrying the capture mechanism will not have to control its own position as precisely, which will result in less propellant being needed and less complex avionics being required resulting in lower overall mission costs.

This premium on quickly grasping the client which is potentially tumbling presents a challenge for typical robotic grippers. They first must quickly close trapping or soft capturing the mechanical feature, and then very quickly produce a sufficiently high applied gripping load to ensure that the captured spacecraft remains grasped while resisting the forces and moments that develop at the interface as the servicer spacecraft and manipulator arrest the relative motion of the client. This presents a challenge for typical single action gripping devices which generally use some sort of gearing or transmission in the clamping action. In space systems, this gearing is needed because there is a need for lightweight actuators. As the gearing is increased to compensate for the low torque of the actuator, the penalty is a lower closure rate. This design trade-off in single action robotic grippers is a primary motivation for the two-stage, capture device disclosed.

As discussed above, the spacecraft being captured are generally moving relative to one another and the physical grasping of one spacecraft by another is a principle method of cancelling out the relative motions between the two spacecraft. Once a rigid grasp has been obtained upon the client spacecraft it is then necessary that the grasp between the two spacecraft be strong enough to absorb the forces and moment generated as the disparate motions between the two spacecraft are absorbed by the positioning mechanism and capture mechanisms now connecting the vehicles. Even with small relative motions between spacecraft, significant forces can be generated at the grasp points and within the capture mechanism. Spreading out the stance of the grasp reduces many of the internal forces permitting the mechanism to be lighter and achieve a better grasp with lower forces.

Broadly speaking, there is disclosed herein a system for capturing a rail and or flange feature (herein all referred to as a "capture feature") on a free flying spacecraft. The system includes a capture mechanism which includes what may be characterized as a quick grasp mechanism mounted for movement in a housing with the quick grasp mechanism including at least one pair of grasping jaws. The quick grasp mechanism is configured to grasp the capture feature when the capture feature is in sufficiently close proximity, the trigger mechanism is initiated causing the the at least one pair of grasping jaws to quickly close to soft capture the capture feature. The capture mechanism includes an opening/closing mechanism which force the grasping jaws of the quick grasp mechanism further together to a closed position. The capture mechanism also includes a rigidizing contact. After the grasping jaws have been quickly closed to soft capture the capture feature, the rigidizing contact is driven into contact with the capture feature within the grasping jaws to secure the capture feature between the rigidizing contact and the closed grasping jaws, thereby to rigidize the capture feature and hence spacecraft within the capture mechanism.

Parts List

This embodiment of the capture mechanism tool is comprised of the following parts:

| Number | Part Description |
| --- | --- |
| 100 | Capture Mechanism |
| 110 | Main Housing |
| 111 | Guide Shaft |
| 112 | Guide Shaft Bearing |
| 113 | Guide shaft Bearing Spacer |
| 114 | Shuttle |
| 115 | Guide Shaft Retainer |
| 116 | Draw Bar |
| 117 | Microswitch |
| 120 | Ball Screw Shaft |
| 121 | Ball Screw Thrust Bearing |
| 122 | Ball Screw Tail Bearing |
| 123 | Bearing Cover |
| 124 | Ball Screw Nut |
| 125 | Shock Absorber |
| 126 | Shock Absorber Mount Plate |
| 127 | Nut Plate |
| 130 | Trigger Bar |
| 131 | Trigger Bar Support |
| 132 | Trigger Housing |
| 133 | Trigger Guide Rod |
| 134 | Sear Support Rod |
| 135 | Trigger Reset Pawl |
| 136 | Trigger Reset Lever |
| 137 | Spring Retaining Pin |
| 138 | Spring Retaining Pin |
| 139 | Sear Spring |
| 140 | Trigger |
| 141 | Sear |
| 142 | Trigger Spring |
| 143 | Sear Reset Rod |
| 144 | Trigger Roller Axle |
| 145 | Trigger Roller |
| 146 | Trigger Lever Return Spring |
| 147 | Trigger Lever Stop |
| 150 | Camera |
| 151 | Line-Producing Laser |
| 152 | Situational Camera Assembly |
| 153 | Light Curtain Support |
| 154 | Forward Light |
| 155 | Aft Light |
| 156 | Forward Receiver |
| 157 | Aft Receiver |
| 160 | Solenoid Mounting Plate |
| 161 | Solenoid |
| 162 | Solenoid Lever |
| 163 | Solenoid Pin |
| 164 | Lever Pin |
| 165 | Trigger Striker |
| 170 | Plunger |
| 171 | Plunger Spring |
| 172 | Spring Housing |
| 173 | Plunger Retaining Nut |
| 180 | Actuator |
| 181 | Idler Axle |
| 182 | Actuator Mounting |
| 183 | Gearbox Cover |
| 184 | Motor Output Gear |
| 185 | Idler Gear |

| Number | Part Description |
|---|---|
| 186 | Ball Screw Input Gear |
| 200 | Clamp Jaw Assembly |
| 201 | Clamp Housing |
| 202 | Bearing Cover Plate |
| 203 | Clamp Housing Bearing |
| 204 | Hinge Pin |
| 205 | Jaw Bearing Plate |
| 206 | Journal Bearing |
| 207 | Jaw Hinge Springs |
| 210 | Variable Jaw Assembly |
| 211 | Jaw Hinge |
| 212 | Clamp Hinge Plate |
| 213 | Spring Mount |
| 214 | Variable Jaw |
| 215 | Clamp Hinge Pin |
| 216 | Spring |
| 217 | Contact Plunger |
| 218 | Contact Spring |
| 219 | Spring Housing |
| 220 | Plunger Retaining Nut |
| 221 | Plunger Mounting Plate |
| 230 | Locking Jaw Assembly |
| 231 | Jaw Hinge |
| 232 | Contact Rods |
| 233 | Clamp Plate |
| 234 | Lock Hinge Pin |
| 235 | Lock |
| 236 | Lock Spring |
| 240 | Cam Follower Assembly |
| 241 | Housing |
| 242 | Contact Shaft |
| 243 | Guide Pin |
| 244 | Shaft Retaining Nut |
| 245 | Contact Spring |
| 246 | Contact |
| 247 | Contact Housing |
| 248 | Cam Roller |
| 249 | Spacer |
| 250 | Roller Axle |
| 251 | Link |
| 252 | Lock Roller |
| 260 | Compliance Spring |
| 261 | Clamp Retainer |
| 262 | Journal Bearing |
| 263 | Shaft Retainer Nut |
| 281 | Bracket |
| 282 | Link |
| 283 | Spring |
| 284 | Torque Rod |
| 285 | Rod Retainer Nut |
| 286 | Link Pin |
| 287 | Link Pin Nut |
| 300 | Forward Light Beam |
| 301 | Aft Light Beam |
| 302 | Jaw Cam Surface |
| 303 | Lock Cam Surface |
| 304 | Trigger Pawl Surface |
| 305 | Lever Slot |
| 306 | Trigger Surface |
| 307 | Trigger Bar Surface |
| 308 | Ball Screw Nut Slot |
| 500 | Servicer Spacecraft |
| 501 | Robotic Arm |
| 502 | Launch Adapter Ring |
| 503 | Client Spacecraft |
| 504 | Communication Signal |
| 505 | Earth |
| 506 | Communications Antenna |
| 600 | Computer System |
| 601 | Computer Control System |
| 602 | Vision System |
| 603 | Central Processor |
| 604 | Internal Storage |
| 605 | Communications Interface |
| 606 | Power Supply |
| 607 | Memory |
| 608 | Input/Output Devices and Interfaces |
| 609 | Data Network |

The structure of the capture mechanism will first be described and particular reference is made to a feature on most spacecraft named a Marman flange which is used as a launch adapter ring between the launching booster and the client spacecraft but it will be understood the present capture mechanism can be configured to capture any available similar feature on a spacecraft not necessarily intended to be grasped.

Figure 35:
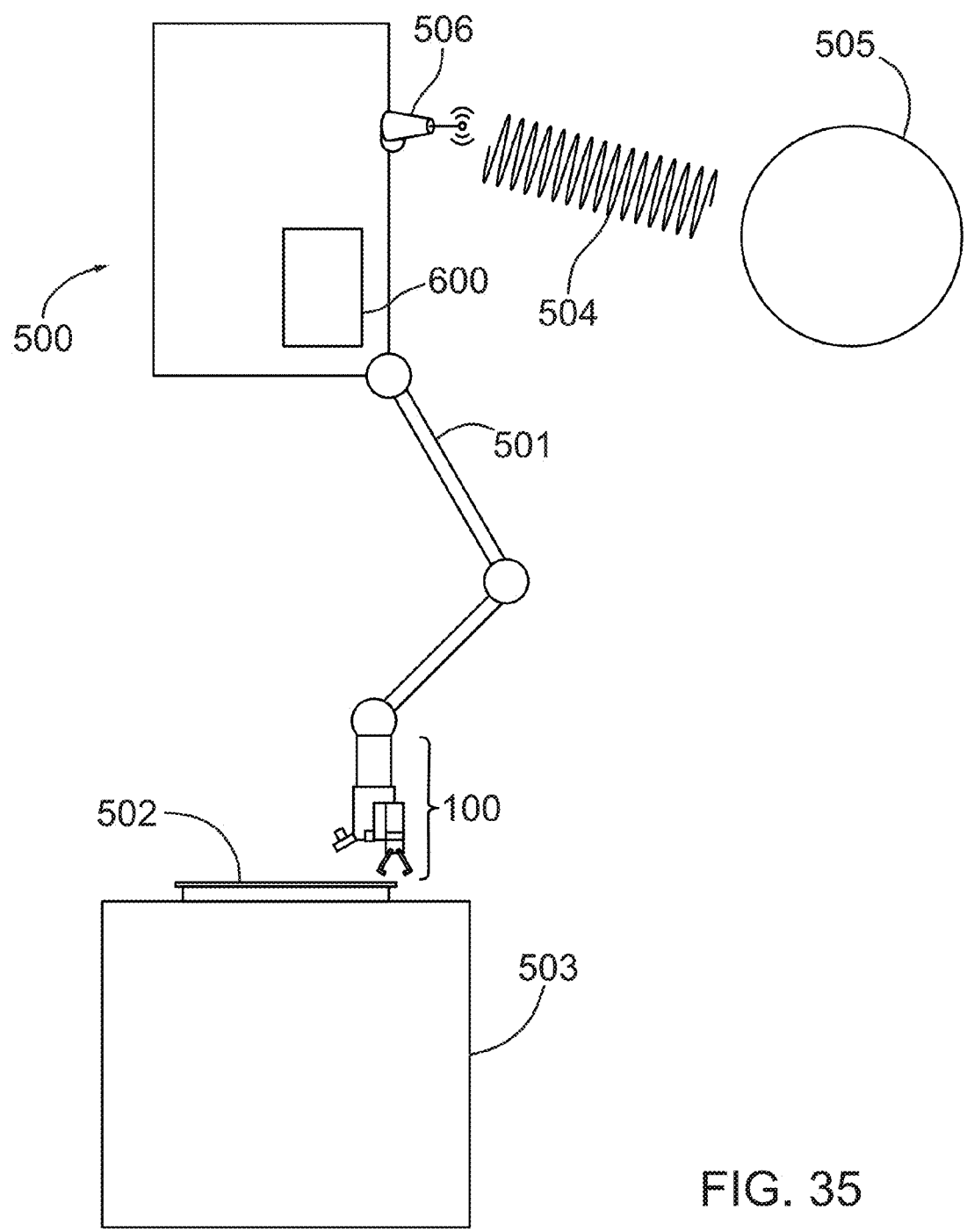
FIG. 35 is a block diagram showing a servicing satellite equipped with the present capture mechanism for capturing a satellite.
Figure 36:
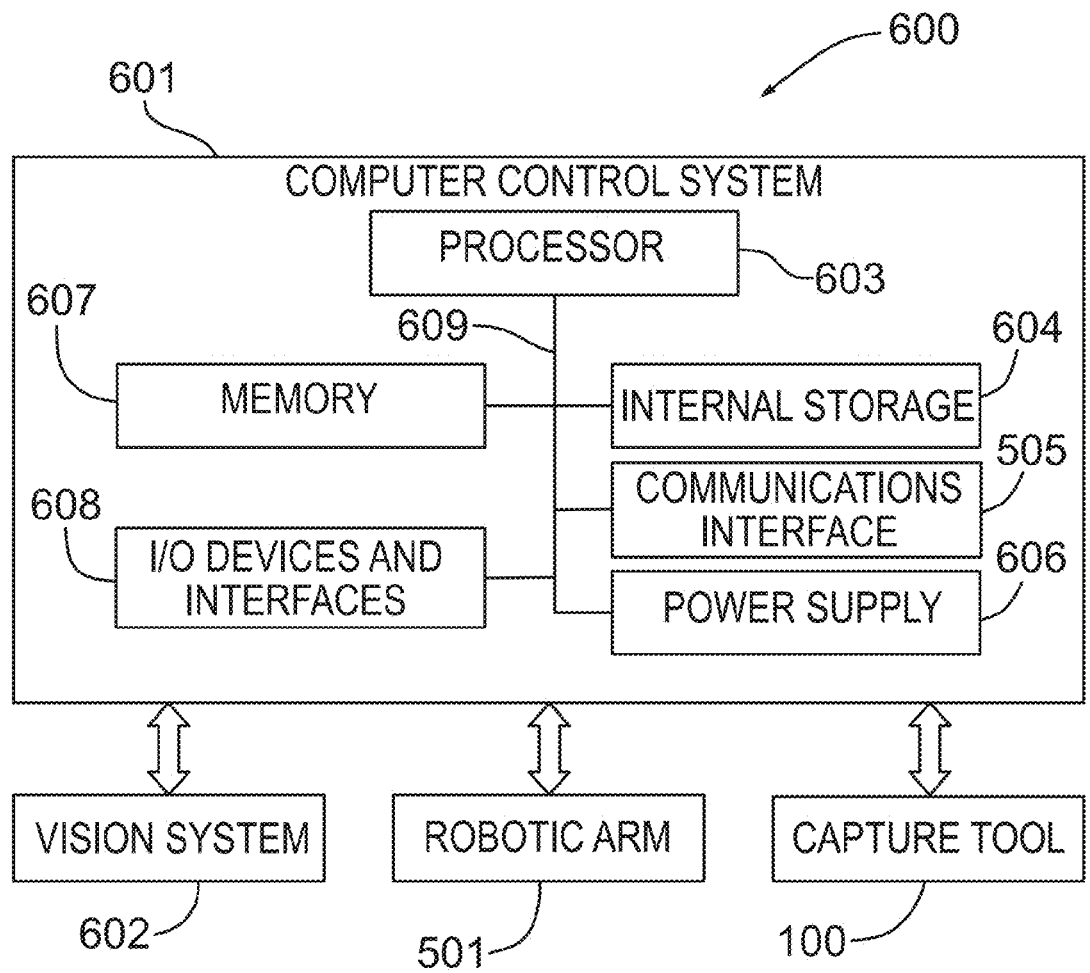
FIG. 36 is a block diagram showing constituent parts of an exemplary computer control system which may be used for controlling the process of capturing the client satellite.

Referring to FIGS. 35 and 36, using known methods not part of this disclosure the servicer spacecraft 500 approaches the client spacecraft 503 and manoeuvres within the reach of the robotic arm 501 attached to the client spacecraft 500. The robotic arm 501 manoeuvres the capture device to within a prescribed distance from the launch adapter ring 502 on the client spacecraft 503 either by autonomous control from the computer system 600 or with partial or full control by human operators located either on the servicer spacecraft or at a remote location. Once the capture mechanism 100 is at the prescribed distance, the computer system 600 assumes automatic control of the final grasping and rigidisation actions. Providing position information to the computer system 600, the vision system 602 receives input from the cameras 150 within the mechanism as well as other sensors on the servicer spacecraft 500. The computer system 600 uses these inputs to calculate required motions needed to manoeuvre the robotic arm 501 and the capture mechanism 100 into the final positions near the launch adapter ring 502 while tracking any motions of the client spacecraft 503. At the proper moment, the computer system 600 directs the robotic arm 501 to advance the capture mechanism 100 into contact with the launch adapter ring 502. It will be appreciated that if the servicer spacecraft is particularly maneuverable, an arm may not be required or needed at all and the spacecraft attitude and orbital control system (AOCS) could be used to manoeuvre the capture tool 100 into the proper relative position with respect to the client spacecraft launch adapter ring 502.

FIG. 1 shows a perspective view of the capture mechanism 100 of the present invention in the open position as if approaching a bracket such as a rail and or a flange feature on a free flying spacecraft, or any other part that can be grasped, collectively referred to as a capture feature located on a free flying spacecraft to be captured.

Figure 2:
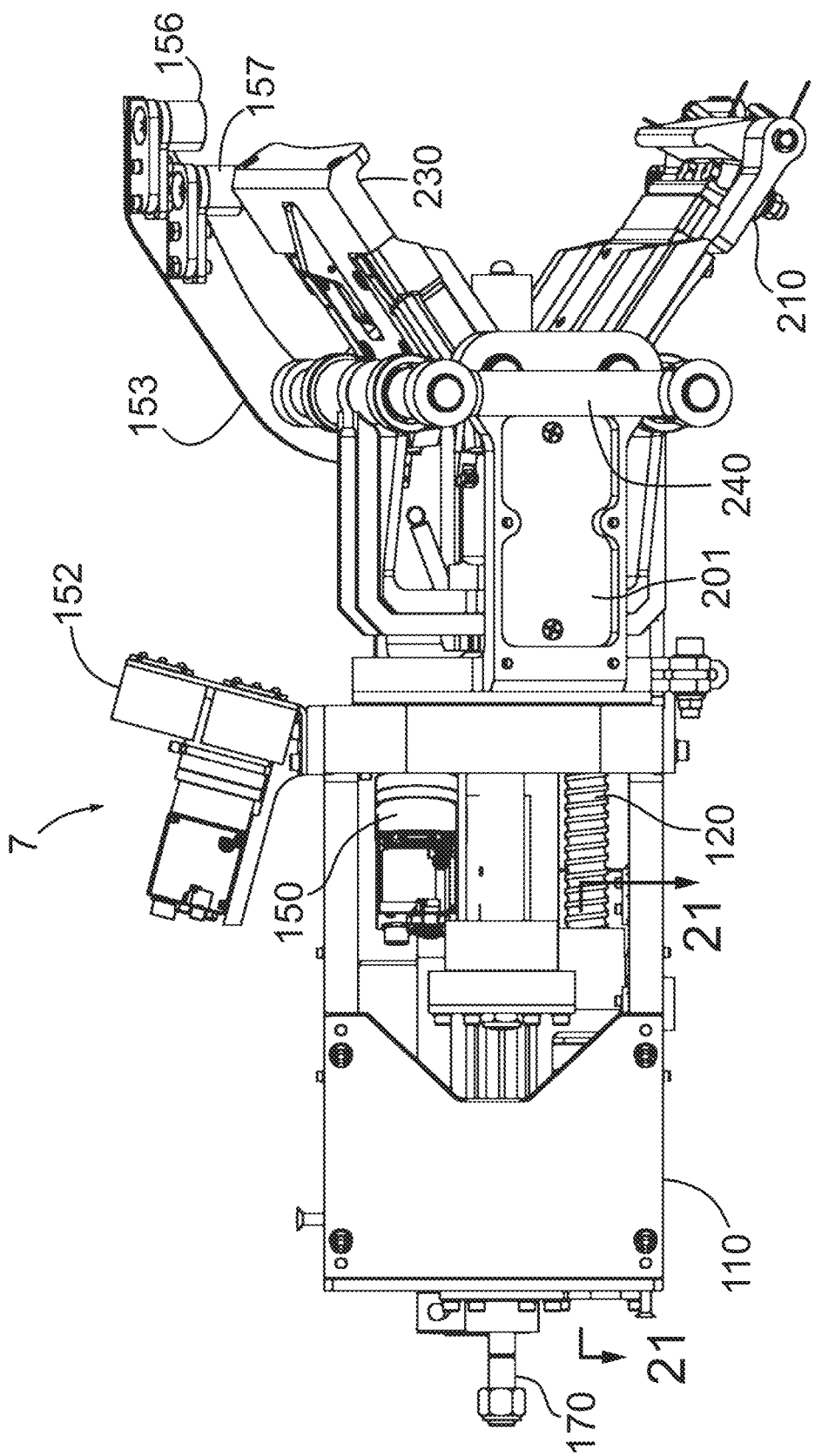
FIG. 2 is a side view of the capture mechanism of FIG. 1A in the open position.
Figure 3:
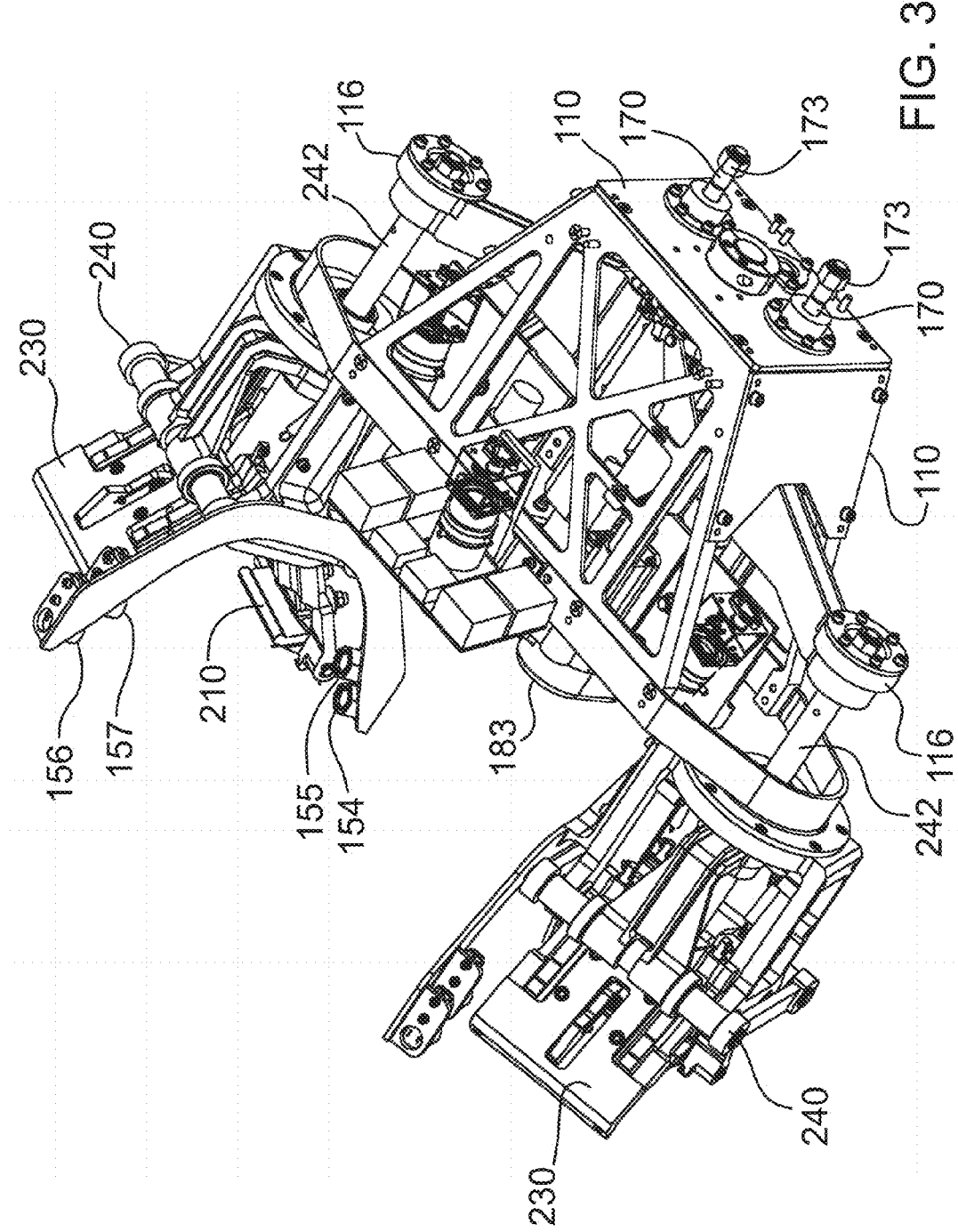
FIG. 3 shows a perspective view of the capture mechanism of FIG. 1 but from a different perspective than shown in FIG. 1.
Figure 4:
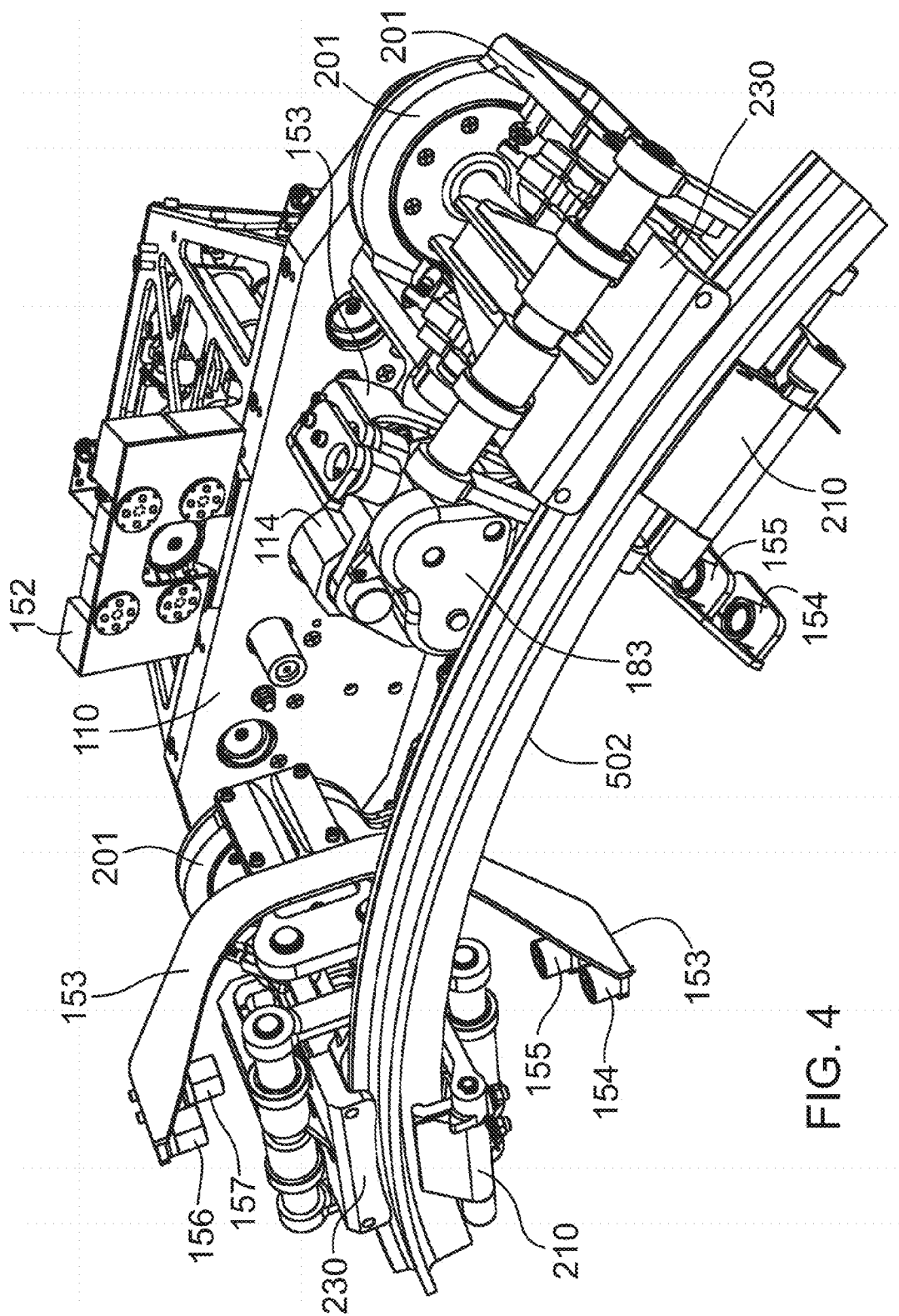
FIG. 4 is a perspective view similar to FIG. 1 but with the bracket being grasped by the capture mechanism which is in the closed position.

FIG. 2 is a side view of the capture mechanism of FIG. 1 in the open position. FIG. 3 shows a perspective view of the capture mechanism 100 of FIG. 1 but from a different perspective than shown in FIG. 1. FIG. 4 is a perspective view similar to FIG. 1 but with a capture feature (in this case a bracket, rail or launch adapter ring 502 located on the free flying spacecraft) being grasped by two clamp jaw assemblies 200 forming part of the capture mechanism 100, which is shown in the closed position. While FIGS. 1, 3 and 4 show a pair of clamp jaw assemblies 200 pivotally mounted on the main housing 110, it will be appreciated that the capture mechanism 100 may have only one clamp jaw assembly 200 or may have more than two clamp jaw assemblies 200.

As best seen in FIGS. 1 and 4, forward and rear light sources 154 and 155 respectively are mounted on one end of a light curtain support 153 and produce front and rear light beams 300 and 301 respectively. Front and rear detectors 156 and 157 are mounted on the other end of light curtain support 153 and located to receive the beams 300 and 301 respectively. The light sources 154 and 155 and their associated detectors 156 and 157 are positioned on light curtain supports 153 with respect to the clamp jaw assemblies 200 so that when capture feature 502 on the free flying spacecraft is in close proximity to the clamp jaw assemblies 200 the beams of light 300 and 301 are broken which triggers the clamp jaw assembly 200 to close around capture feature 502, discussed in more detail below. The collection of light sources and receivers and the appropriate circuitry (including in this embodiment the computer 600) comprise the optical initiator.

Each clamp jaw assembly 200 includes a variable jaw assembly 210 pivotally mounted with respect to a locking jaw assembly 230 which will be discussed in great detail hereinafter.

Figure 5:
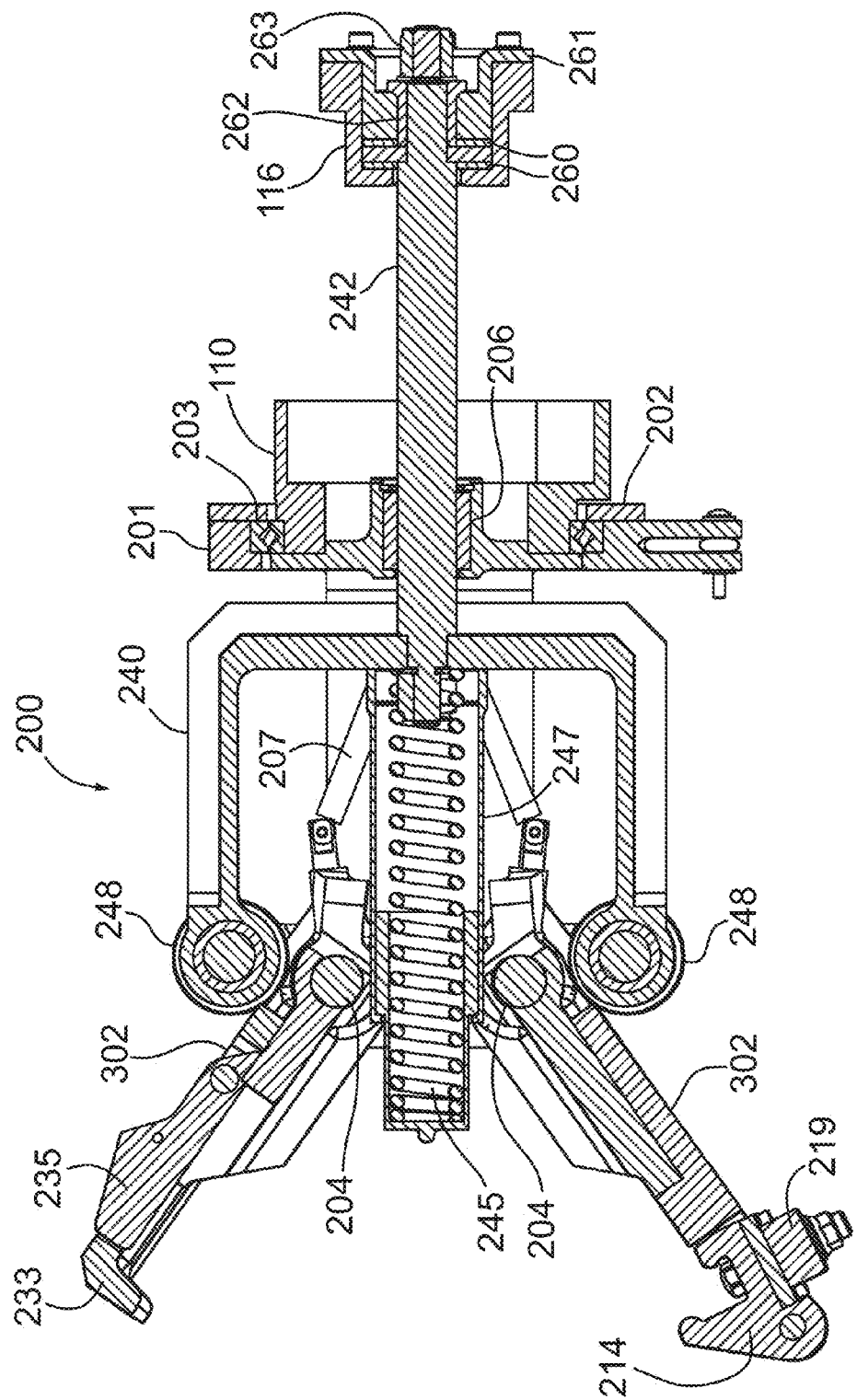
FIG. 5 is a partial cross sectional of the capture mechanism in the open position taken along line 5-5 of FIG. 8.
Figure 8:
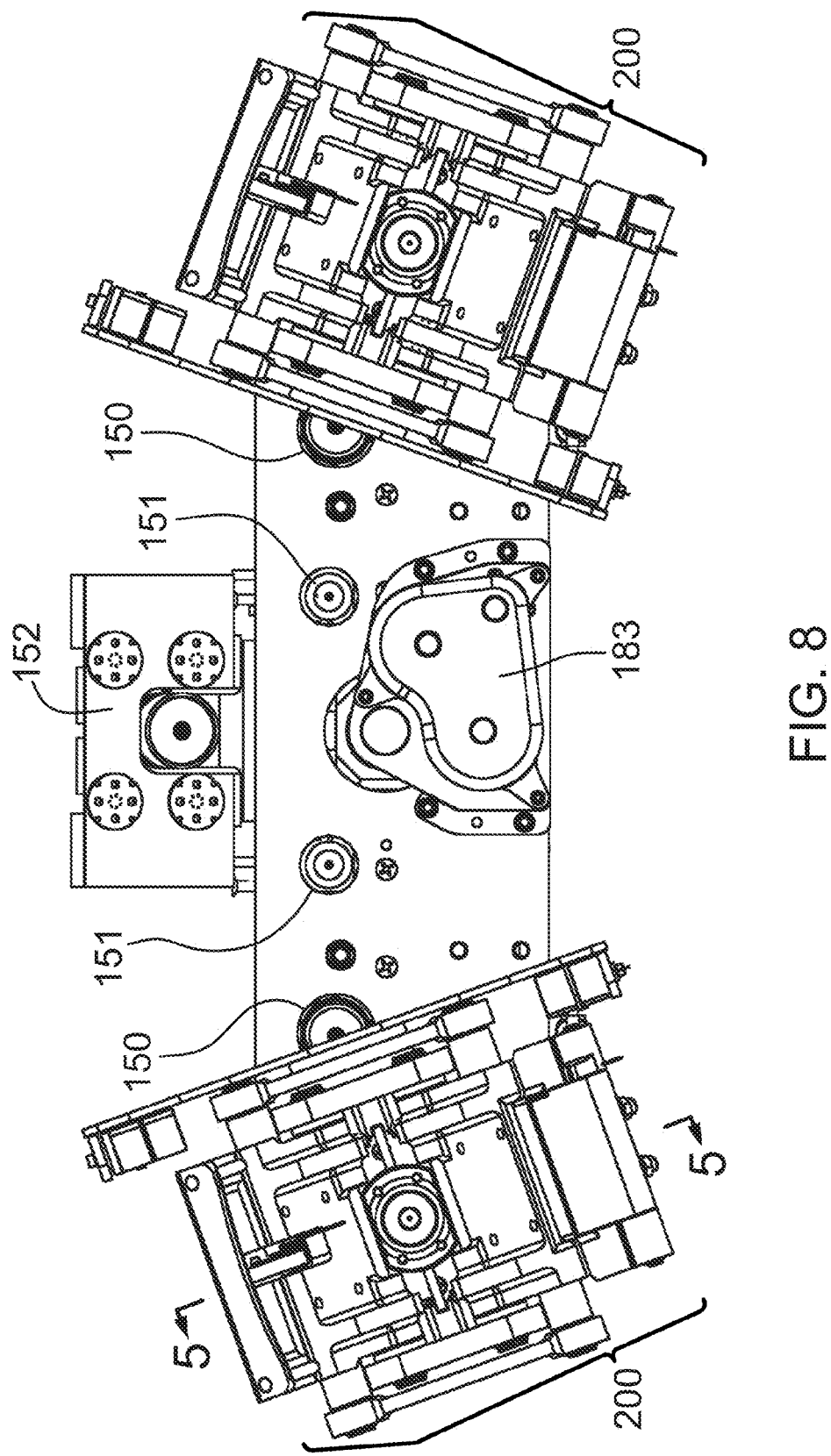
FIG. 8 is a view of the front of the capture mechanism with the clamping jaws in the open position.

FIG. 5 is a partial cross sectional view of the clamp jaw assembly 200 in the open position taken along line 5-5 of FIG. 8. The combination of the local shape of the jaw cam surfaces 302 and the location of the cam rollers 248 allow the variable jaw assembly 210 and the locking jaw assembly 230, rotating about hinge pins 204 to be biased apart by the jaw hinge springs 207.

Figure 6:
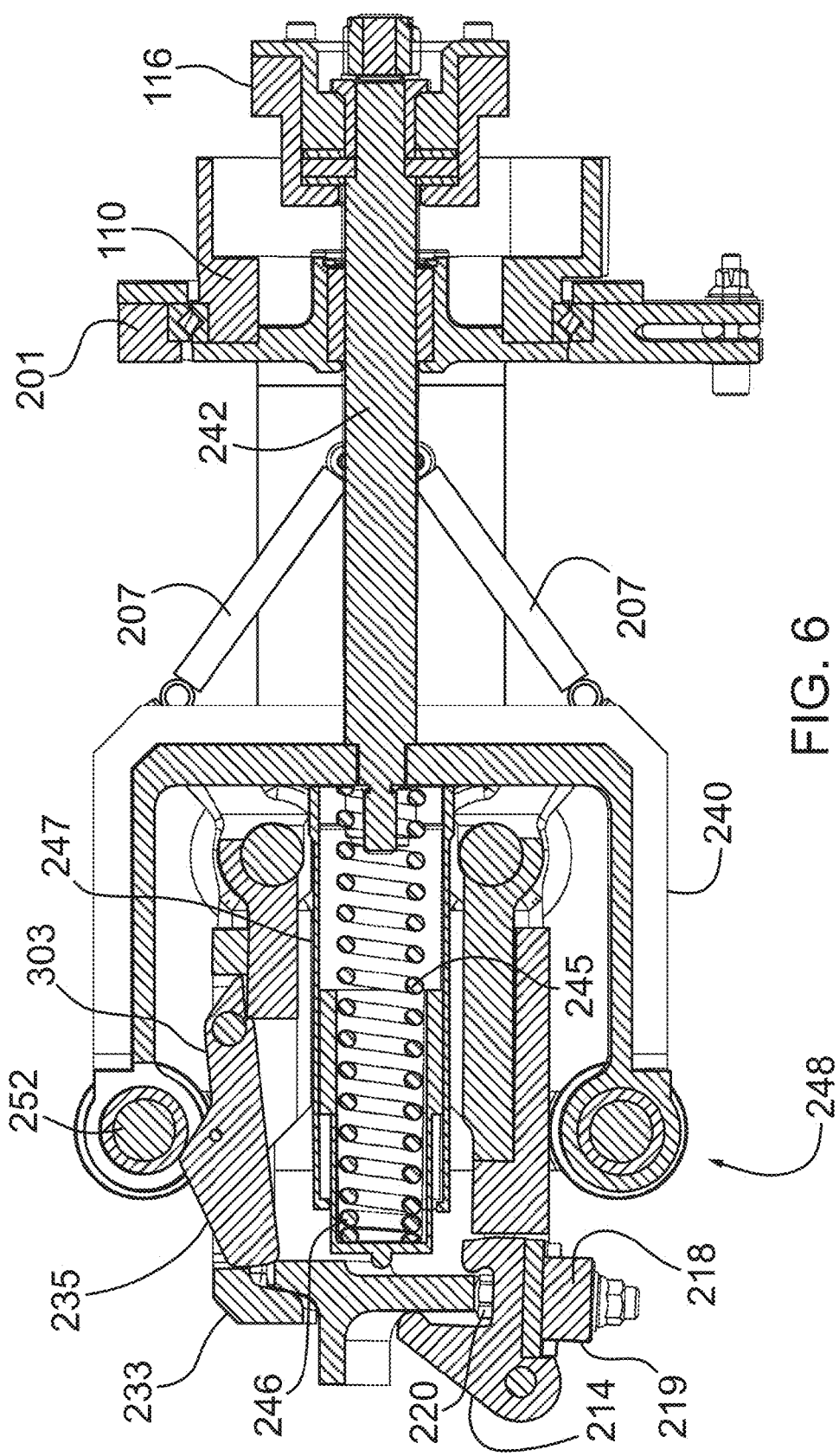
FIG. 6 is a partial cross sectional of the capture mechanism in the closed position taken along line 5-5 of FIG. 8 except the jaws are in the closed position.

FIG. 6 is a partial cross sectional view of the capture mechanism in the closed and locked position taken along line 5-5 of FIG. 8 except the jaws are in the closed position. In this view the cam follower assembly 240 has been moved forward (to the left in the figure) and as the cam rollers 248 move along the contours of the jaw cam surfaces 302, they force the variable jaw assembly 210 and the locking jaw assembly 230 together against the forces of the jaw hinge springs 207 (see also FIG. 5). The capture feature 502 has been pressed down into the contact plunger 217 compressing the contact spring 218 which is within the spring housing 219. At the same time, the contact feature 246 has been pressed into the face of the capture flange 502 compressing the contact spring 245 contained within the contact housing 247. The combination of compressed spring 245 and compressed contract spring 218 act together to hold the capture flange 502 against the fixed elements of the clamp jaw assembly 200 with the desired level of security or contact stiffness. The cam follower assembly 240 has advanced to its furthest forward limit and the lock roller 252 has forced the lock 235 inwards against the capture feature 502 thereby mechanically securing the capture flange 502 in place.

Figure 7:
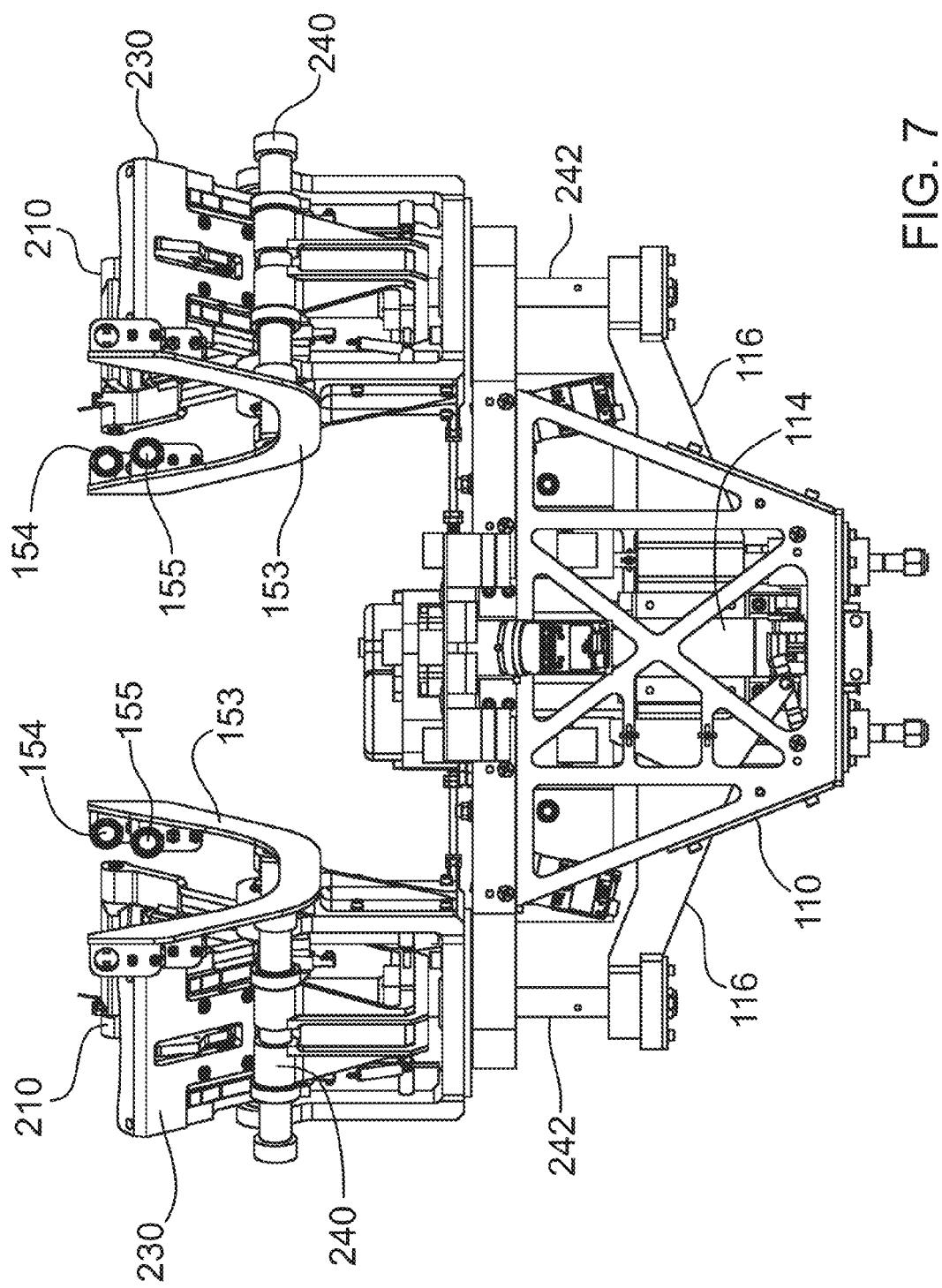
FIG. 7 is a top view of the capture mechanism taken along arrow 4 of FIG. 3.

FIG. 7 is a top view of the capture mechanism 100 taken along arrow 7 of FIG. 2. This view shows how the shuttle 114 is linked to the draw bars 116 which are flexibly connected to associated contact shafts 242 that serve to advance their associated cam follower assemblies 240.

FIG. 8 is a view of the front of the capture mechanism 100 with the clamping jaw assemblies 200 in the open position and illustrates the relative positions of the cameras 150, line-producing lasers 151 and the clamp jaw assemblies 200. It also shows how the situational camera assembly 152 can be positioned to oversee the operation of the capture mechanism 100.

Figure 9:
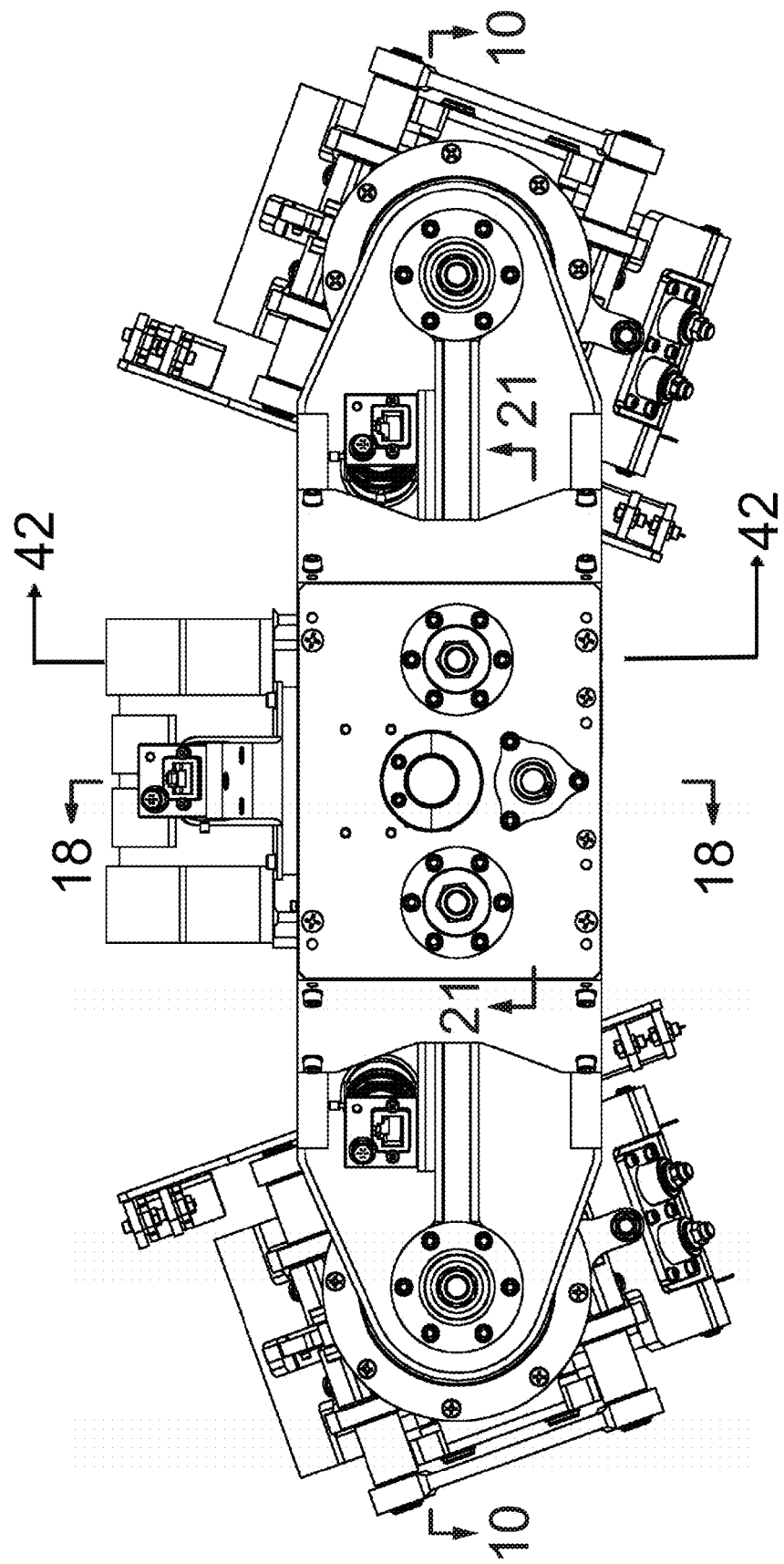
FIG. 9 is a view of the back of the capture mechanism with the clamping jaws in the open position.

FIG. 9 is a view of the back of the capture mechanism 100 with the clamping jaw assemblies 200 in the open position.

Figure 10:
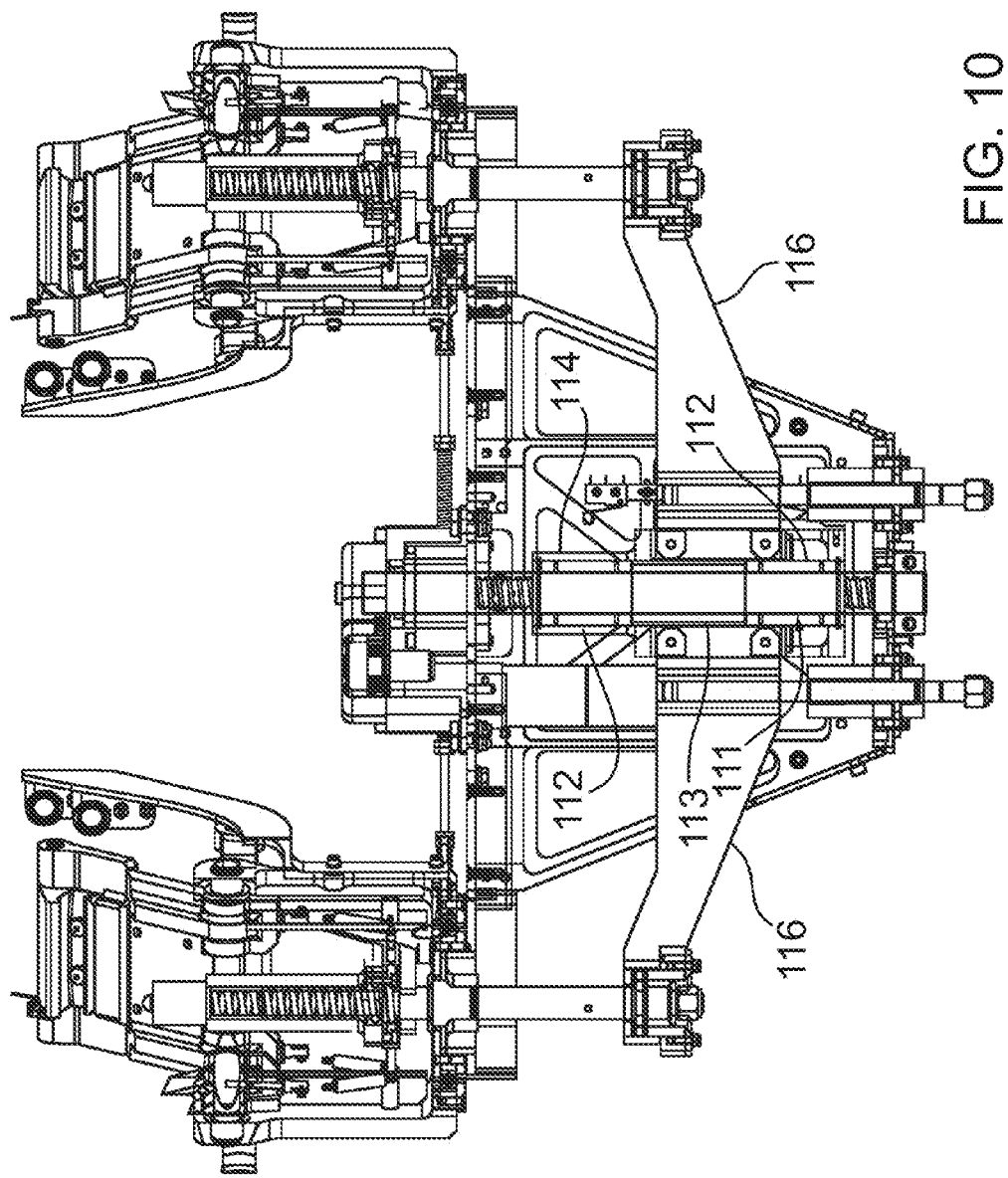
FIG. 10 is a section view of the capture mechanism taken along the line 10-10 in FIG. 9.

FIG. 10 is a section view of the capture mechanism taken along the line 10-10 in FIG. 9 and shows how the guide shaft bearings 112 and guide shaft bearing spacer 113 act to support the guide shaft 111. It also shows how the shuttle 114 is connected to the draw bars 116.

Figure 11:
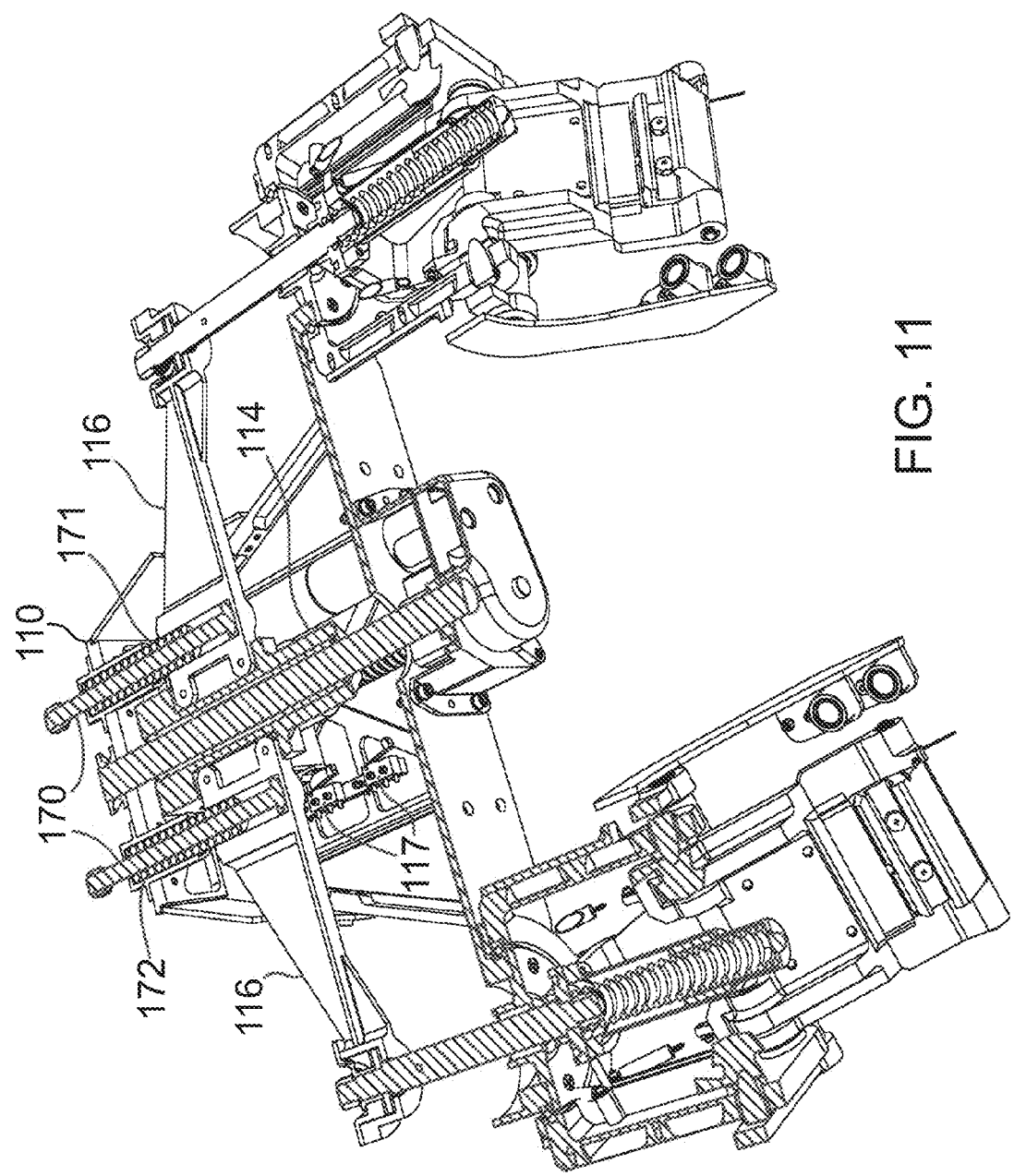
FIG. 11 is a perspective view of the cross sectional view in FIG. 10.

FIG. 11 is a perspective view of the cross sectional view in FIG. 10. It shows how the plunger springs 171 acts upon the spring housings 172 and the plungers 170 to force the draw bars 116 forward. The spring housings 172 are attached to the main housing 110.

Figure 12:
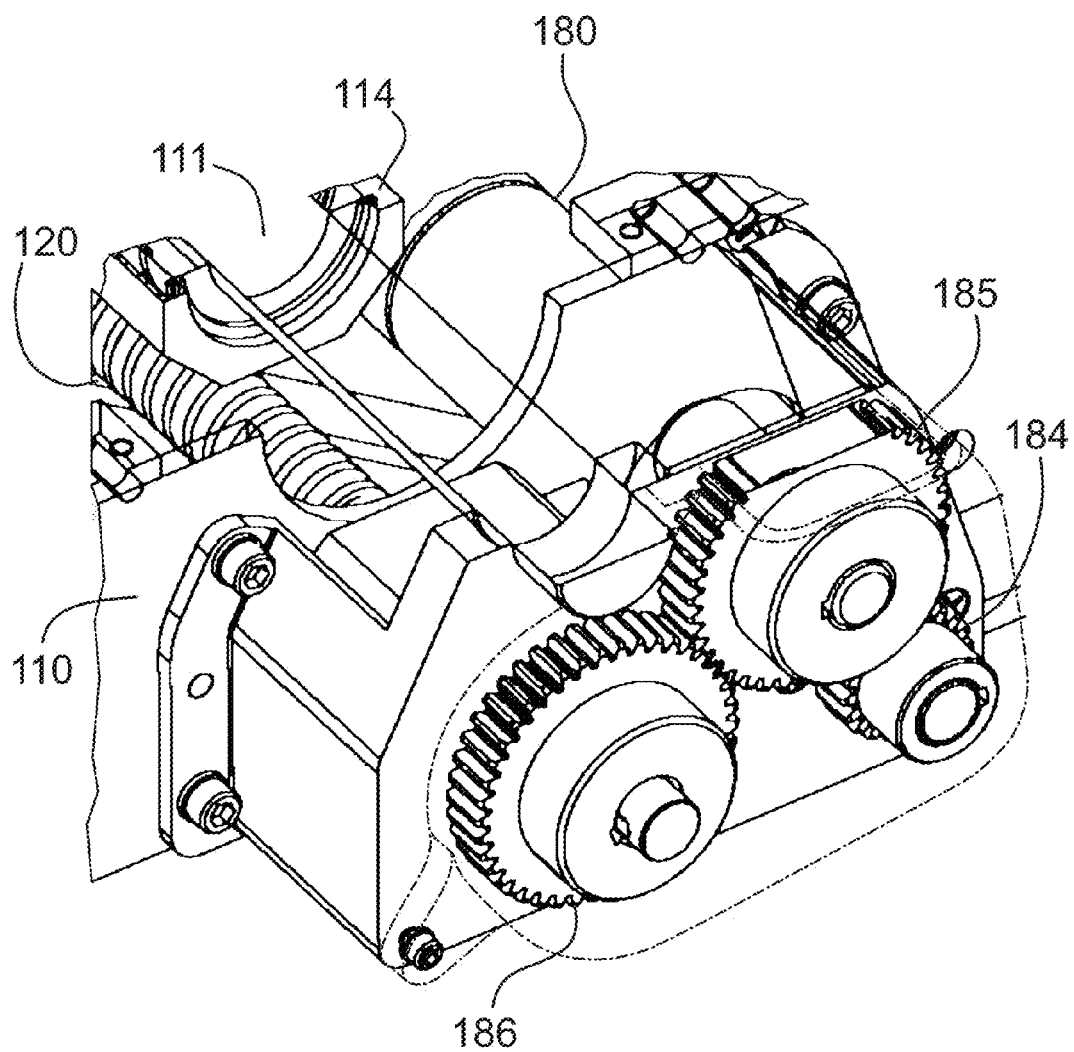
FIG. 12 is a close up of FIG. 11 showing the gear box drive for the lead screw.

FIG. 12 is a close up of FIG. 11 with gearbox cover 183 removed showing the arrangement of gears 184, 185 and 186 that transmit torque from the actuator 180 to the ball screw shaft 120.

Figure 13:
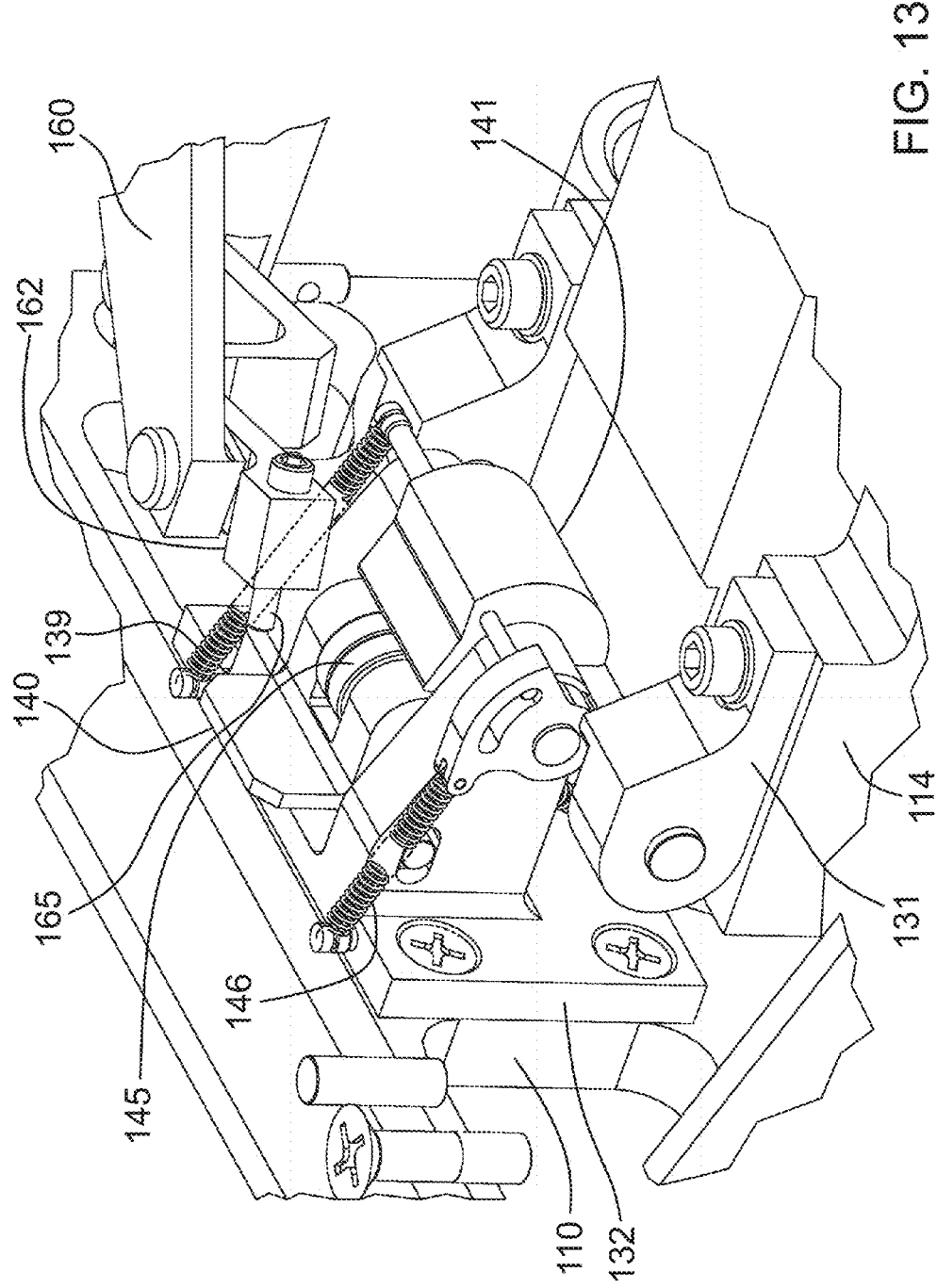
FIG. 13 is a close up of the trigger mechanism in the armed condition with several structural elements of the capture mechanism not shown for clarity.

FIG. 13 is a close up of the trigger mechanism in the armed condition with several structural elements of the capture mechanism not shown for clarity.

Figure 14:
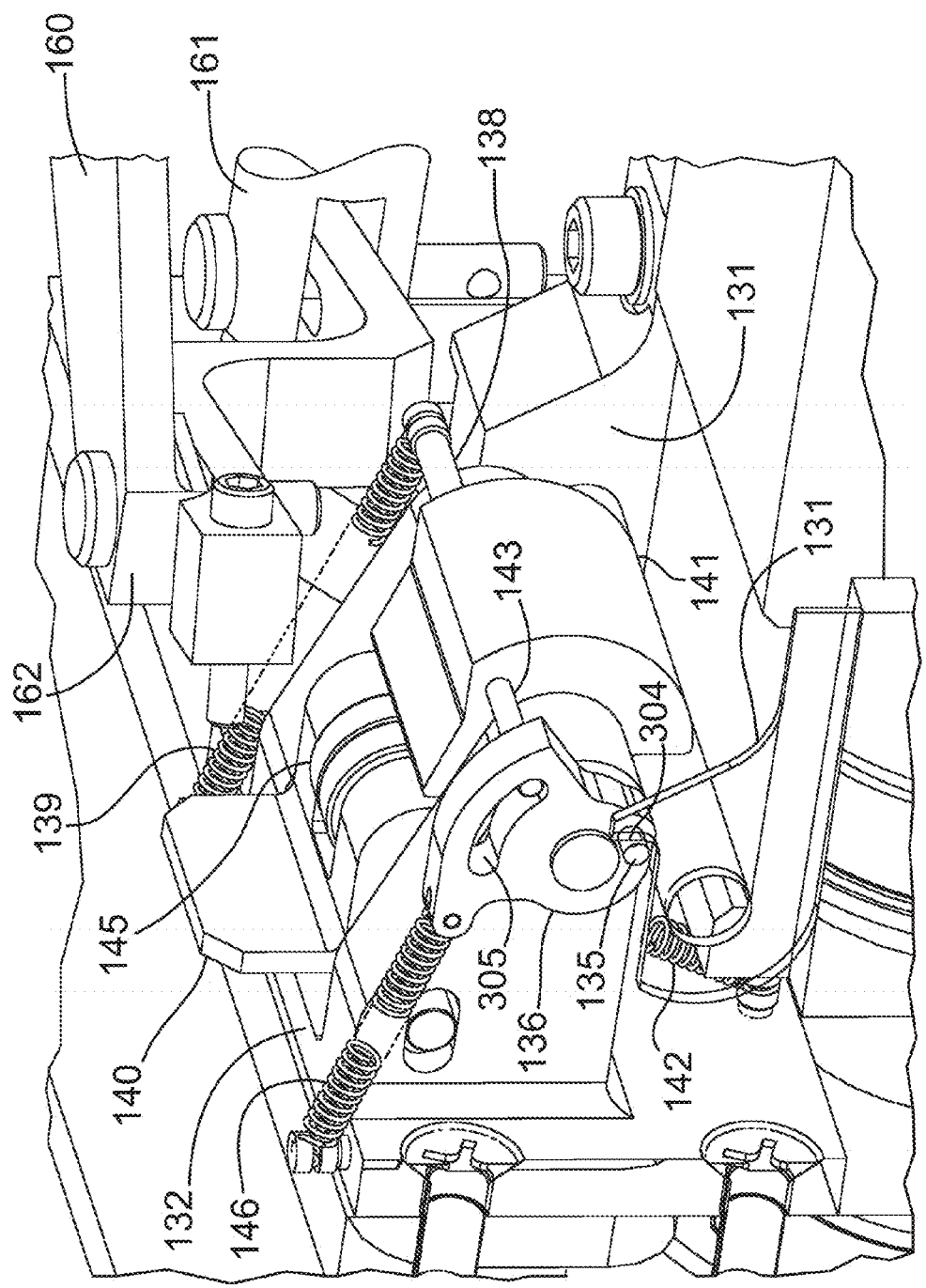
FIG. 14 is a repeat of FIG. 13 except showing a partial cross section of the trigger reset pawl and how it interacts with the trigger reset cam rod

FIG. 14 is a repeat of FIG. 13 except showing a partial cross section of the trigger reset pawl 135 and how it is mounted to the trigger reset lever 136 and how the trigger reset pawl relates to the trigger pawl surface 304 on the trigger bar support 131. It also shows how the trigger bar 130 sits within the trigger bar support 131 and how the sear 141 is biased by the sear spring 139 acting upon the spring retaining pin 138.

Figure 15:
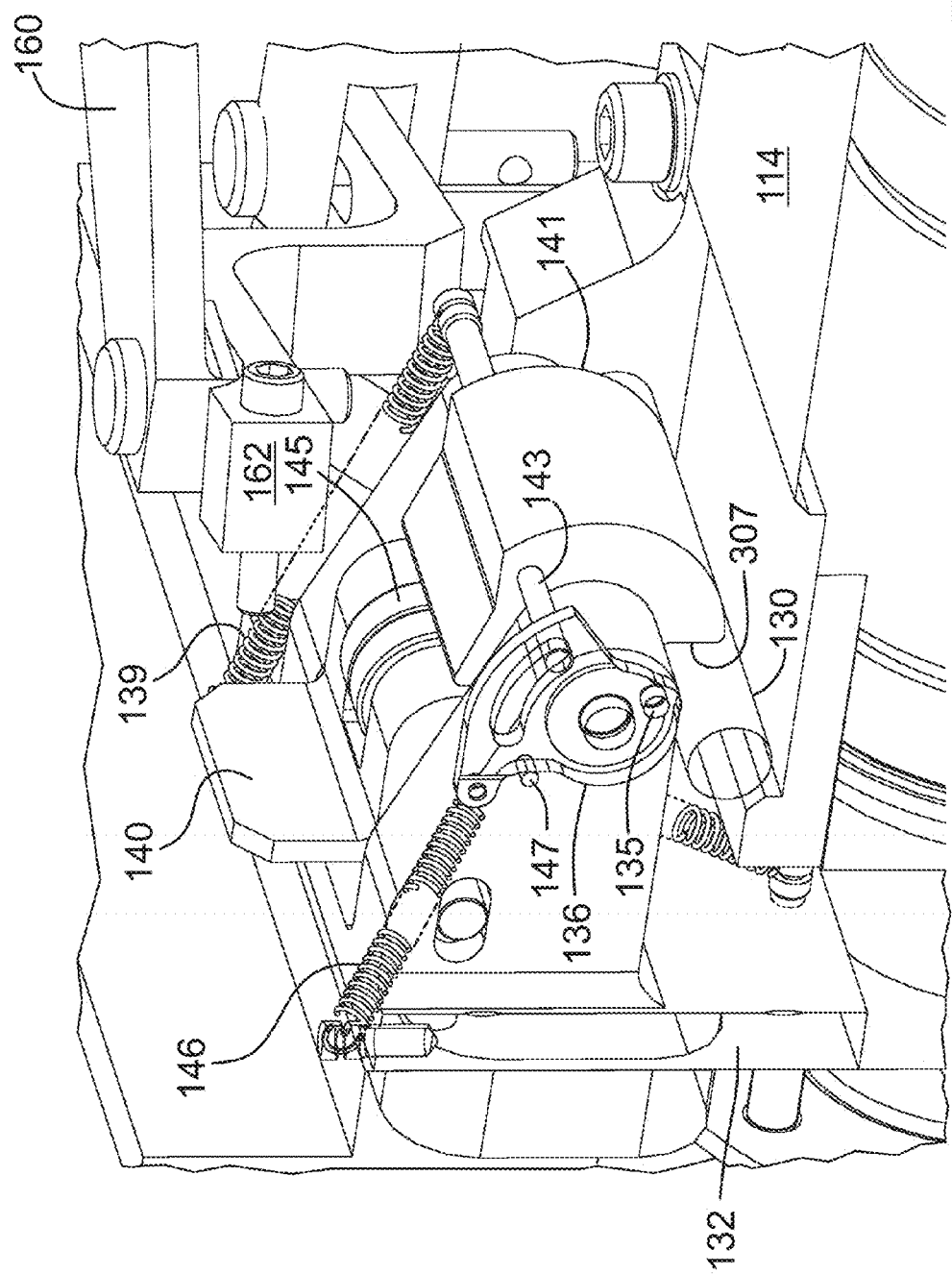
FIG. 15 is a repeat of FIG. 13 except showing a partial cross section of the trigger reset arrangement showing how the trigger reset cam transfers motion to the trigger reset rod.

FIG. 15 is a repeat of FIG. 13 except showing a further partial cross section of the trigger reset arrangement showing how, when the trigger reset lever 136 is rotated when the trigger pawl surface 304 moves the trigger reset pawl 135 it causes the sear reset rod 143 to rotate the sear 141. It also shows how the motion of the trigger reset lever 135 is limited in the aft direction by the trigger lever stop 147 and how the motion of the trigger bar 130 is restrained by the contact with the sear 141 along the trigger bar surface 307.

Figure 16:
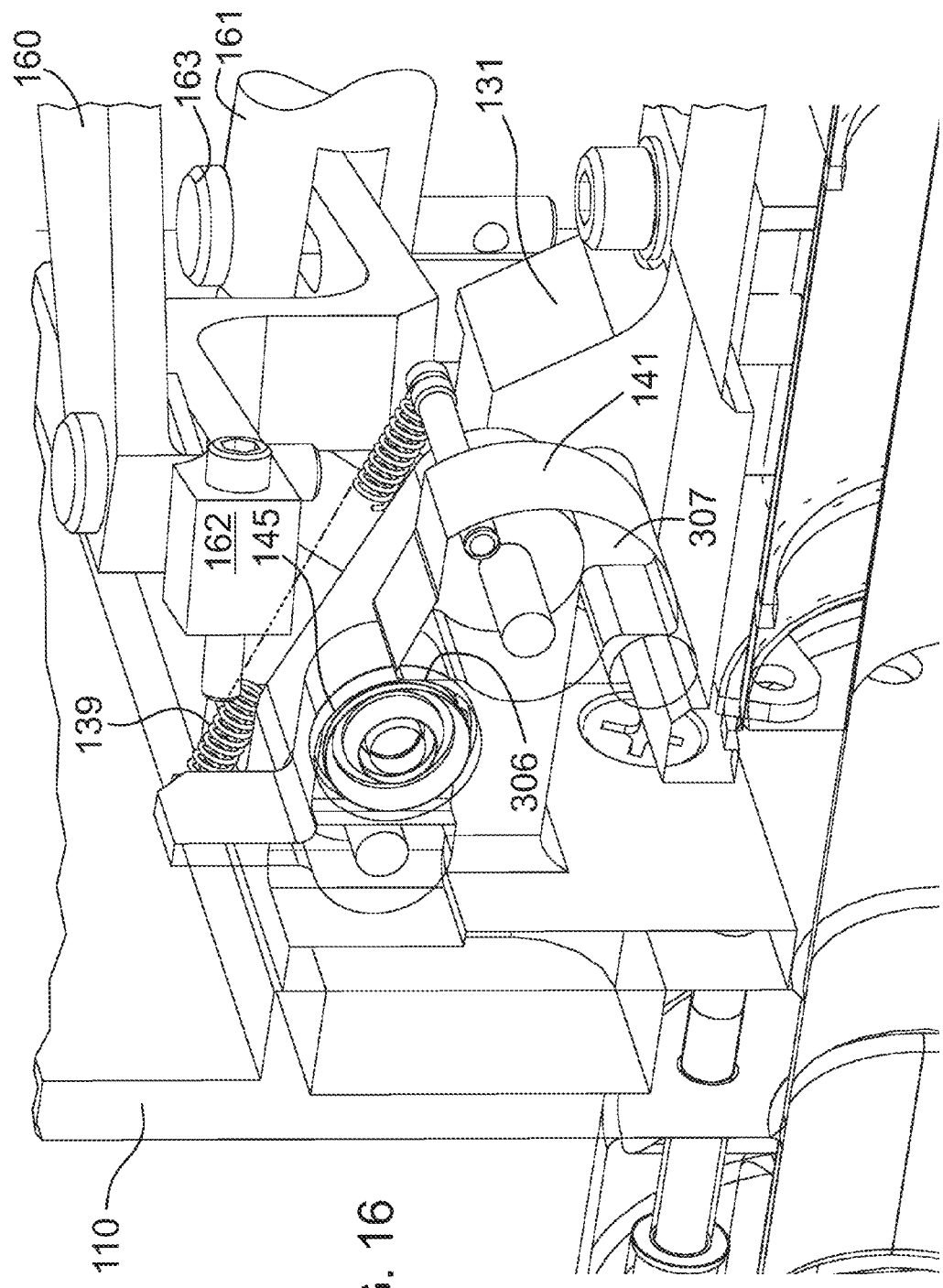
FIG. 16 is a repeat of FIG. 13 except showing a partial cross section of the trigger mechanism showing how the trigger bar rests upon the trigger cam and how the trigger roller holds the trigger cam in place.

FIG. 16 is a repeat of FIG. 13 except showing a further partial cross section of the trigger mechanism showing how the trigger bar 130 rests upon the sear 141 and how the trigger roller 145 holds the sear 141 in place.

Figure 17:
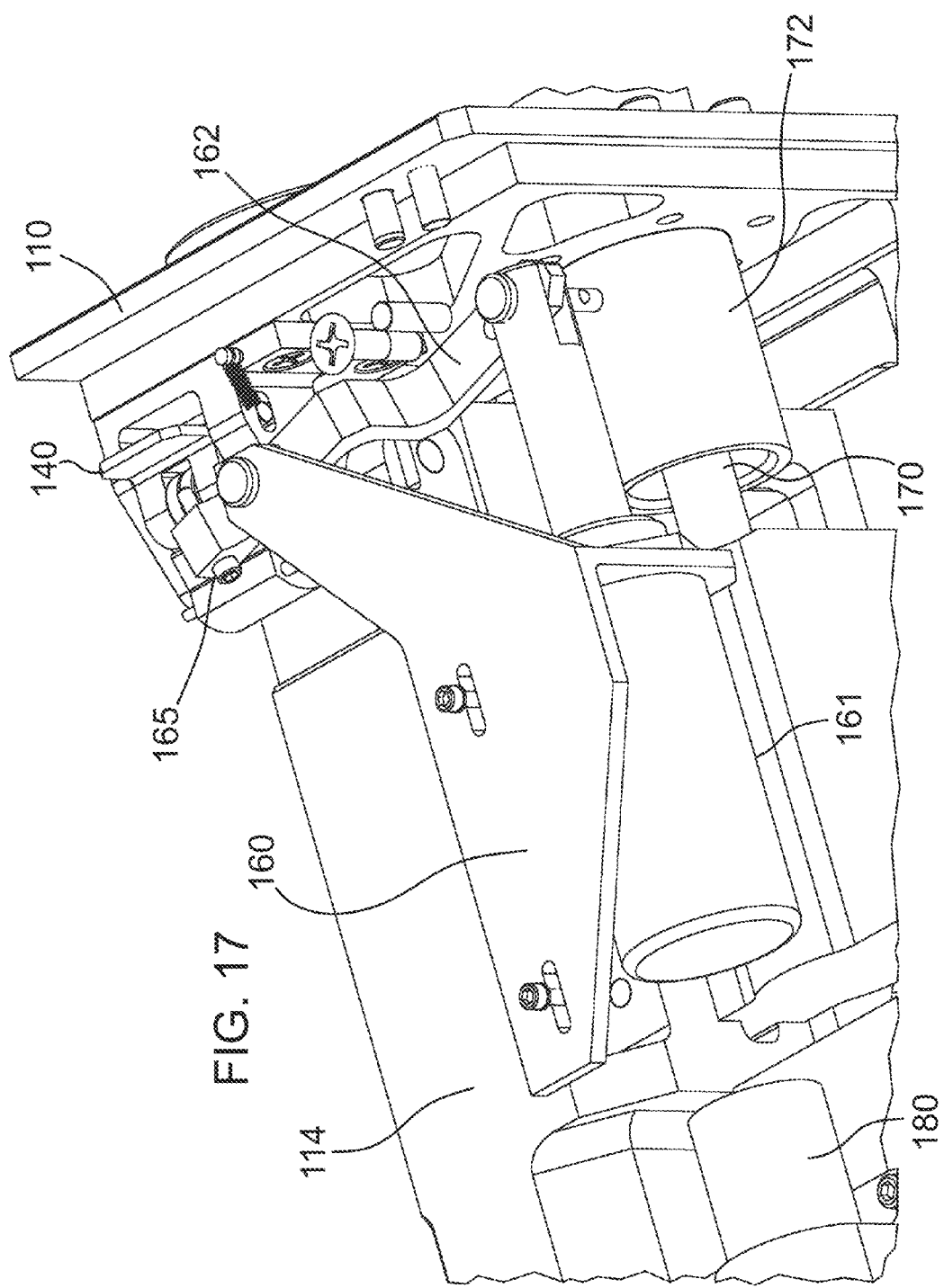
FIG. 17 is a close up of the electromagnetic solenoid trigger actuator and how it interacts with the trigger mechanism.

FIG. 17 is a close up of the solenoid 160 and how it interacts with the trigger mechanism with the reciprocating motion of the solenoid 160 being transmitted and the force amplified by the solenoid lever 162 which forces the trigger striker 165 into contact with the trigger 140 forcing it to rotate.

Figure 18:
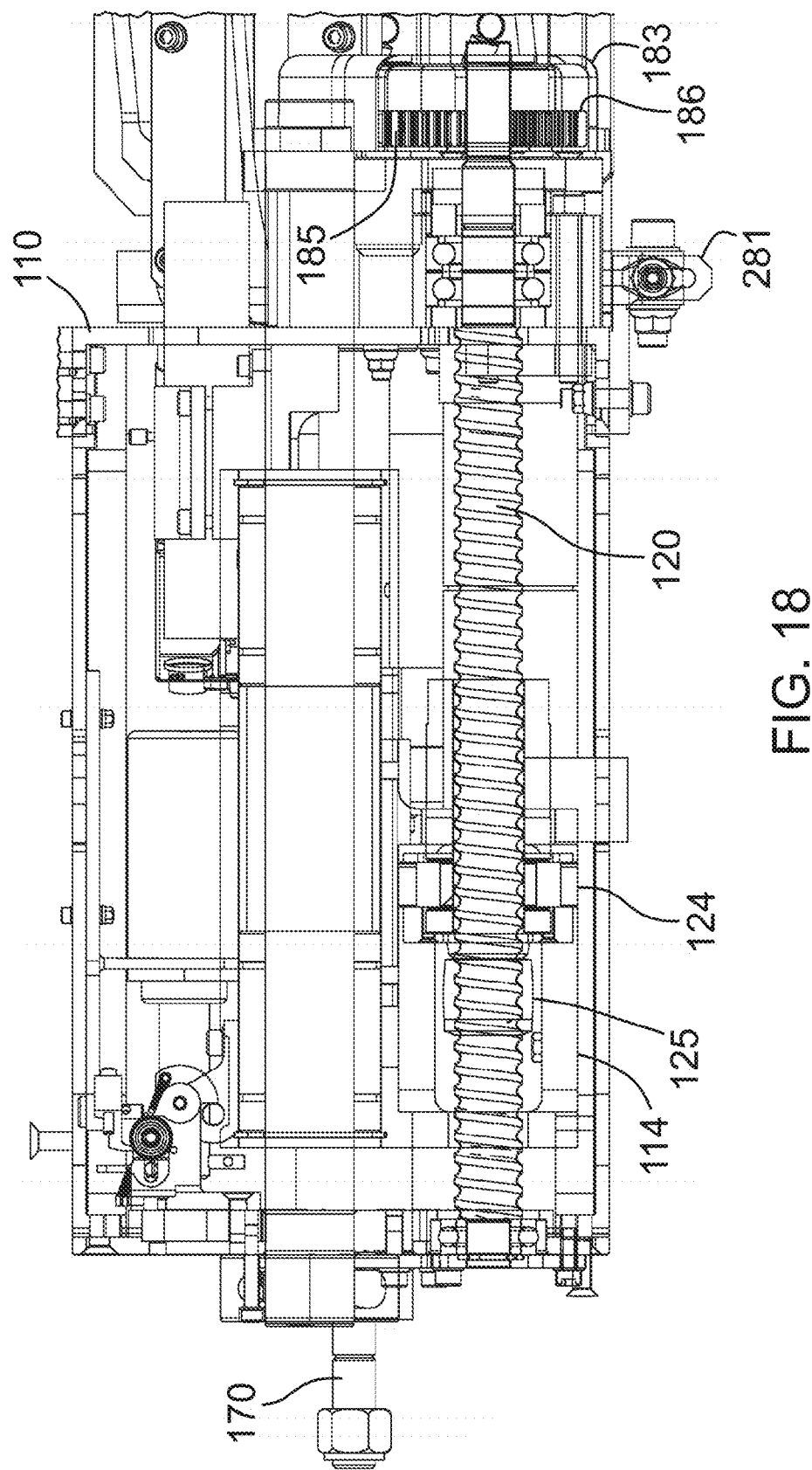
FIG. 18 is a sectional view through the lines 18-18 in FIG. 9 showing the guide shaft, carriage, trigger and how the ball screw interacts with the carriage to force the jaw rods forwards.

FIG. 18 is a sectional view through the lines 18-18 in FIG. 9 showing the guide shaft 111, shuttle 114, and how the ball screw shaft 120 interacts with the shuttle 114 via the ball screw nut 124 and shock absorber mount plate 126 to force the shuttle 114 and therefore the draw bars 116 and the contact shaft 242 forwards.

Figure 19A:
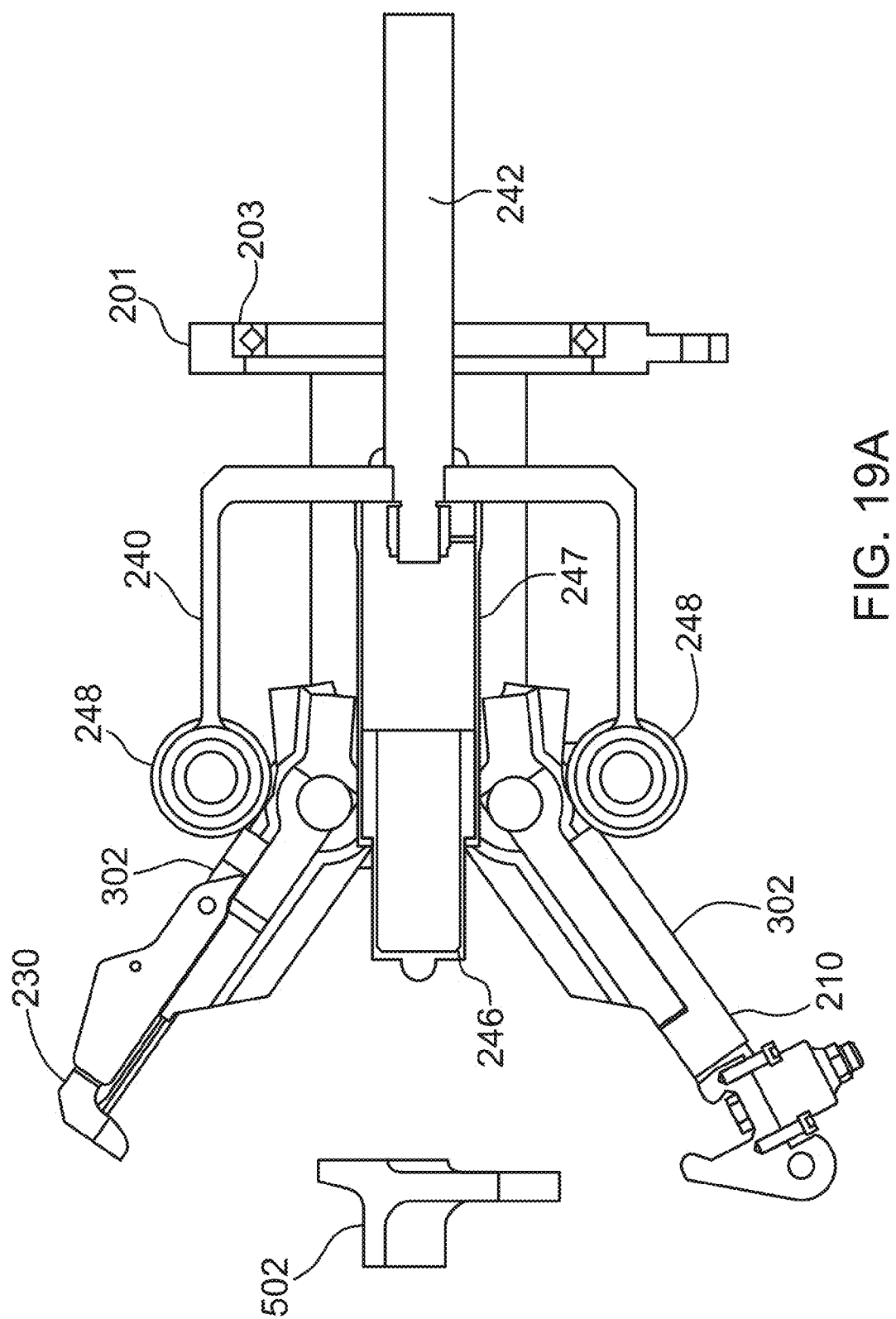
FIGS. 19A to 19E are partial sectional views similar to FIG. 5 illustrating the bracket capture sequence.
Figure 19B:
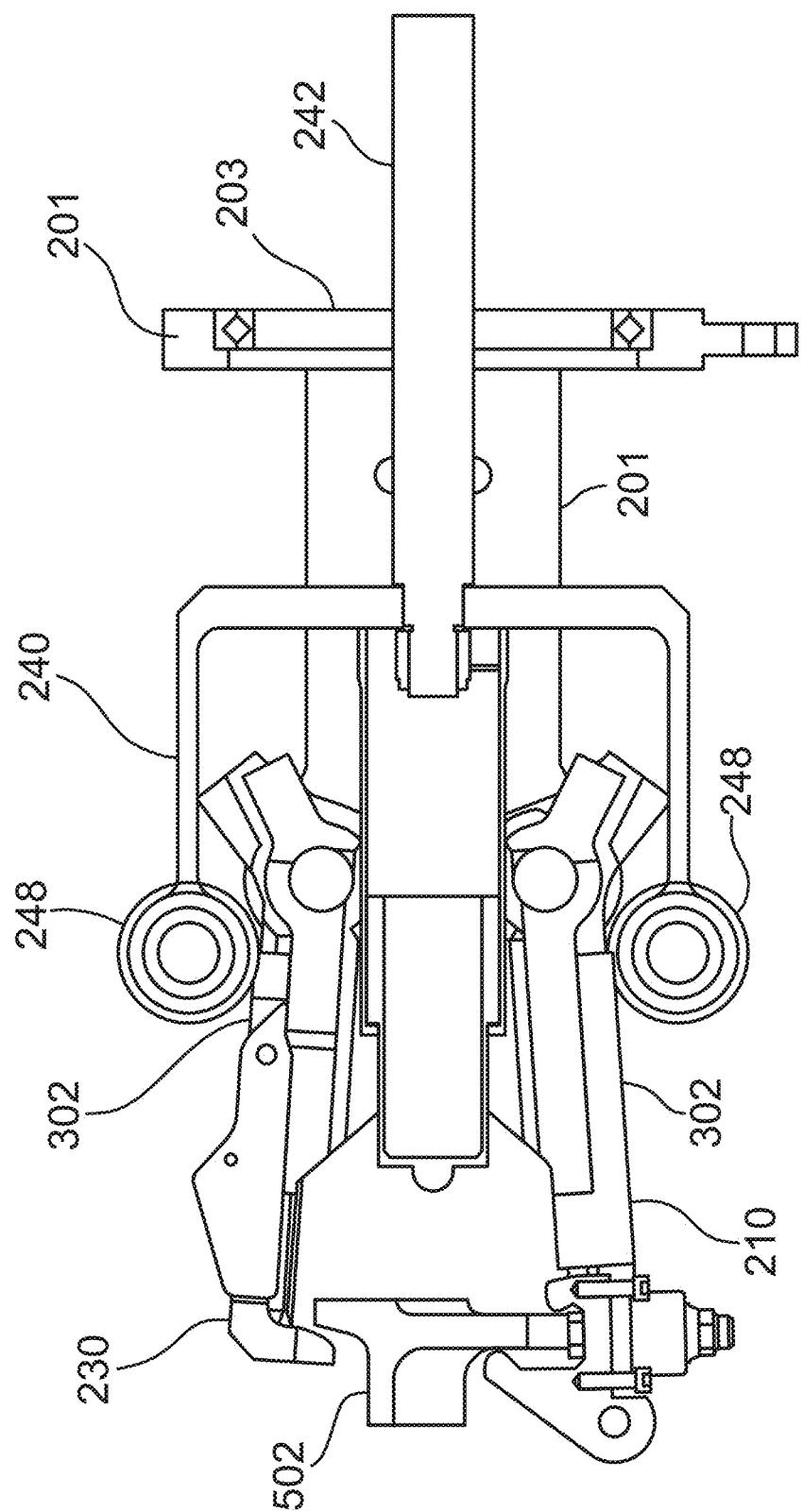
Figure 19C:
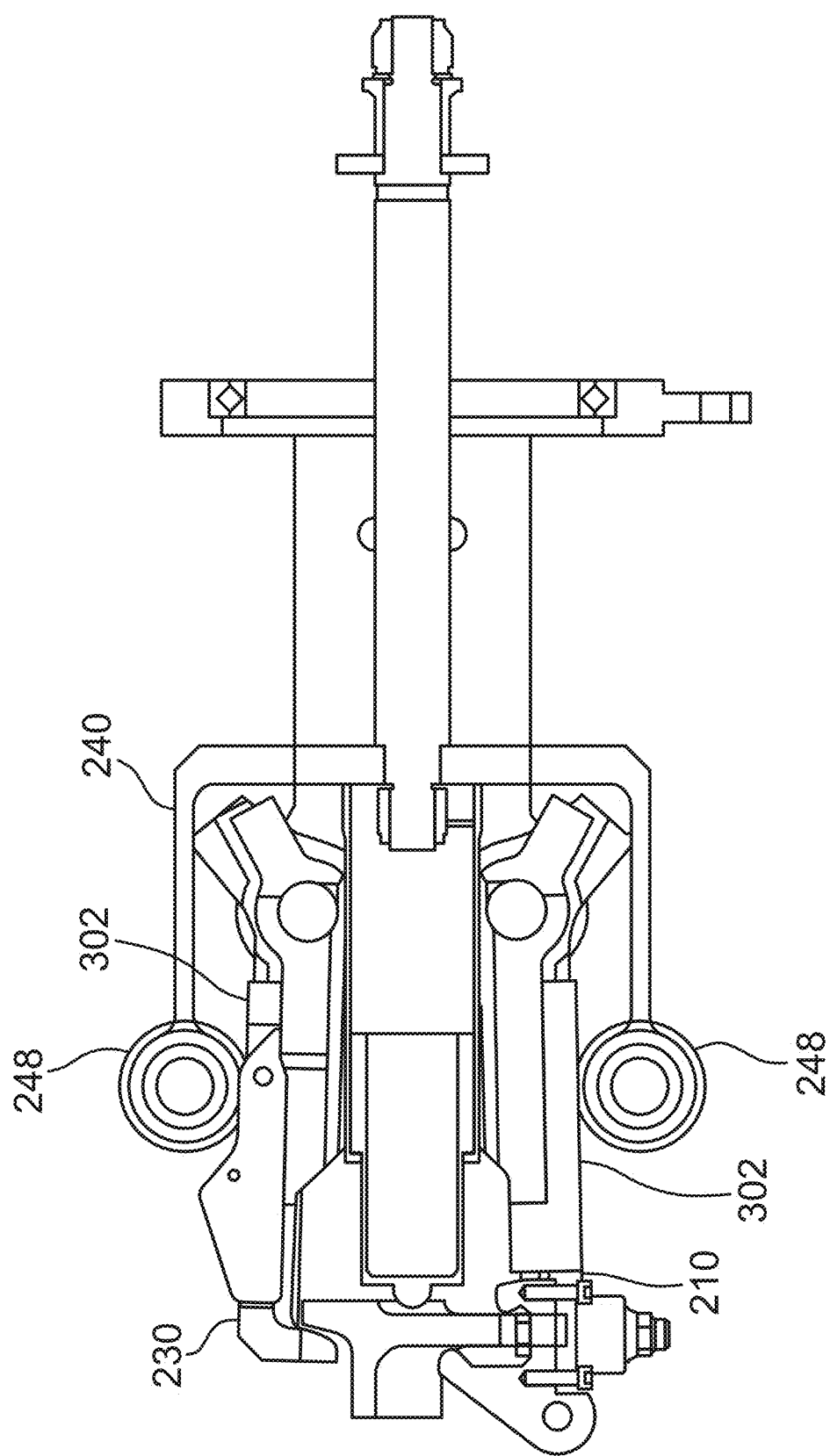
Figure 19D:
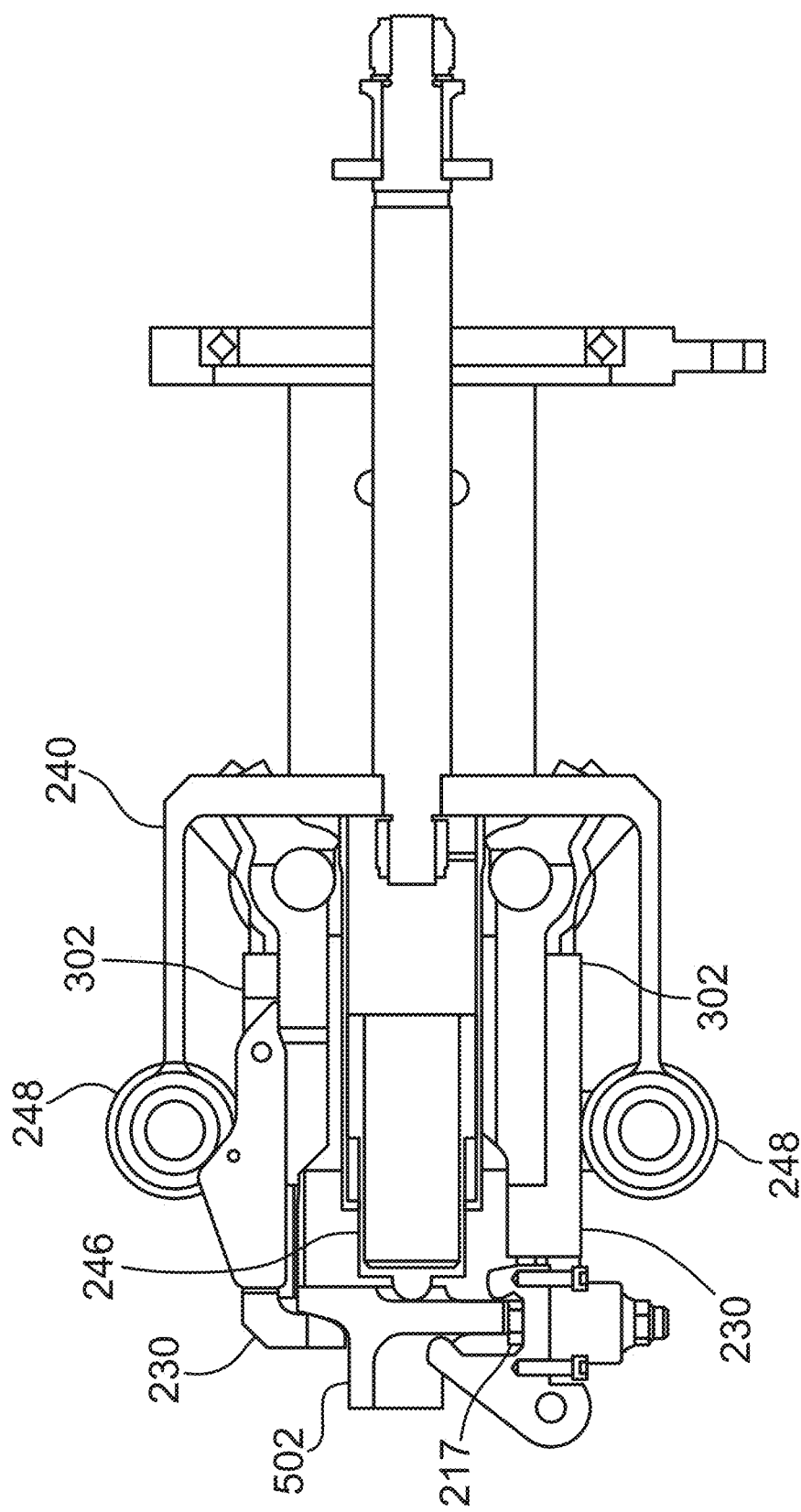
Figure 19E:
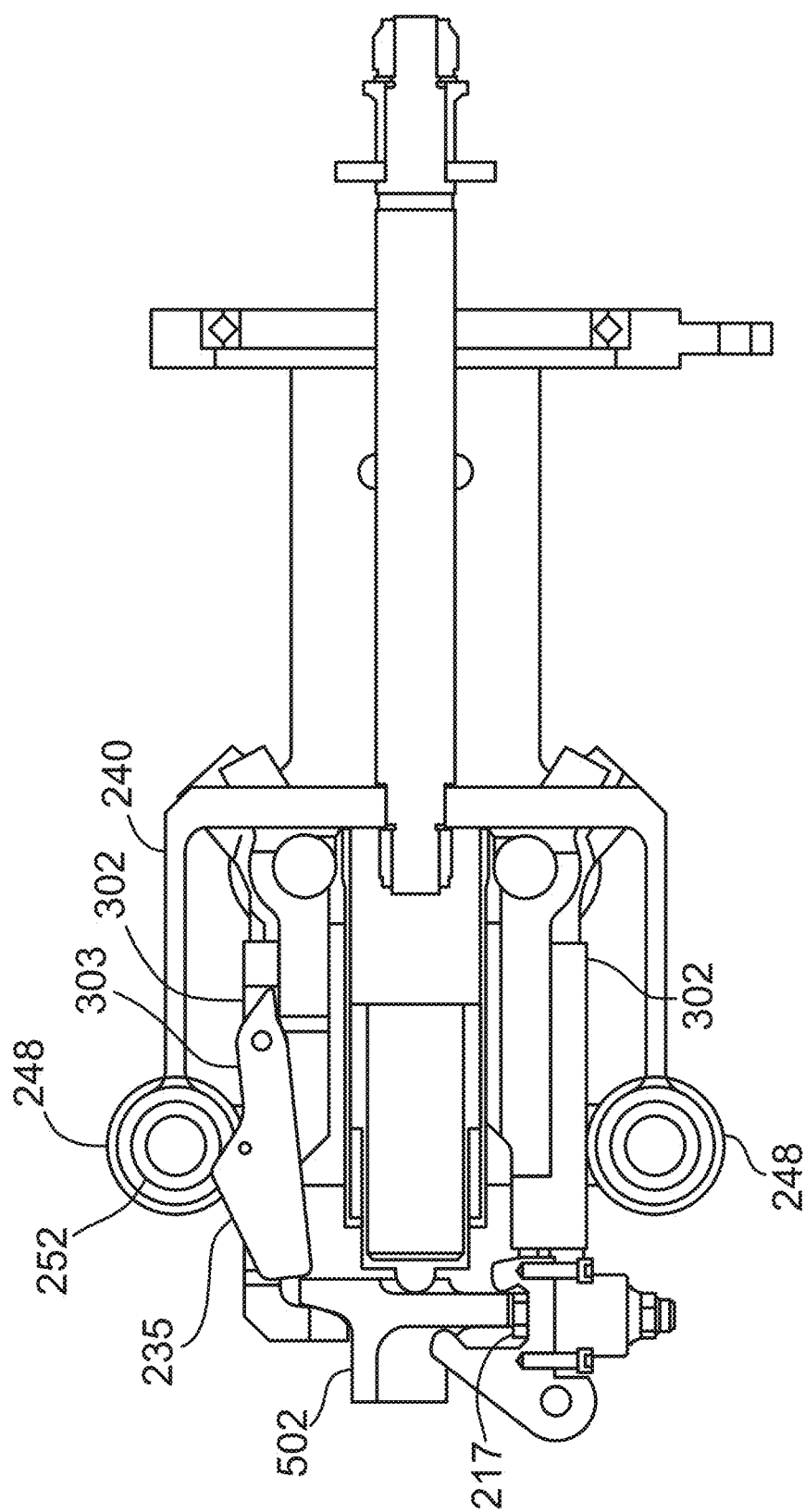

FIGS. 19A to 19E are partial sectional views similar to FIG. 5 illustrating the bracket 502 capture sequence when viewed in alphabetical order. FIG. 19A shows the capture mechanism 200 at the moment the trigger 140 is struck and the sear 141 is free to rotate releasing the trigger bar 130 allowing the shuttle 114 to move. FIG. 19B shows the jaw assembly 200 closed to the soft capture position just as the rigidisation starts. The plunger springs 171 are at minimum compression and, via the plungers 170, have driven the draw bars 116 and contact shafts 242 as far forward as they can. FIG. 19C shows the cam follower assembly 240 having been pushed further forward by the action of the ball screw shaft 120 on the ball screw nut 124 with the bracket 502 fully captured and seated within the jaws 210 and 230 but without any preload applied, FIG. 19D shows the clamp jaw assembly 200 fully preloaded with the forward motion of the cam rollers 248 forcing the jaw cam surfaces 302 together forcing the bracket 502 into the contact plunger 217 and the contact 246. This motion is resisted by spring 216 and contact spring 245 creating a connection of known rigidity between the bracket 502 and the capture mechanism 100. FIG. 19E shows the cam follower assembly 240 even further forward where the lock roller 252 has pushed the optional lock 235 into position against the bracket 502 to restrain the bracket 502 within the jaws 210 and 230.

Figure 20:
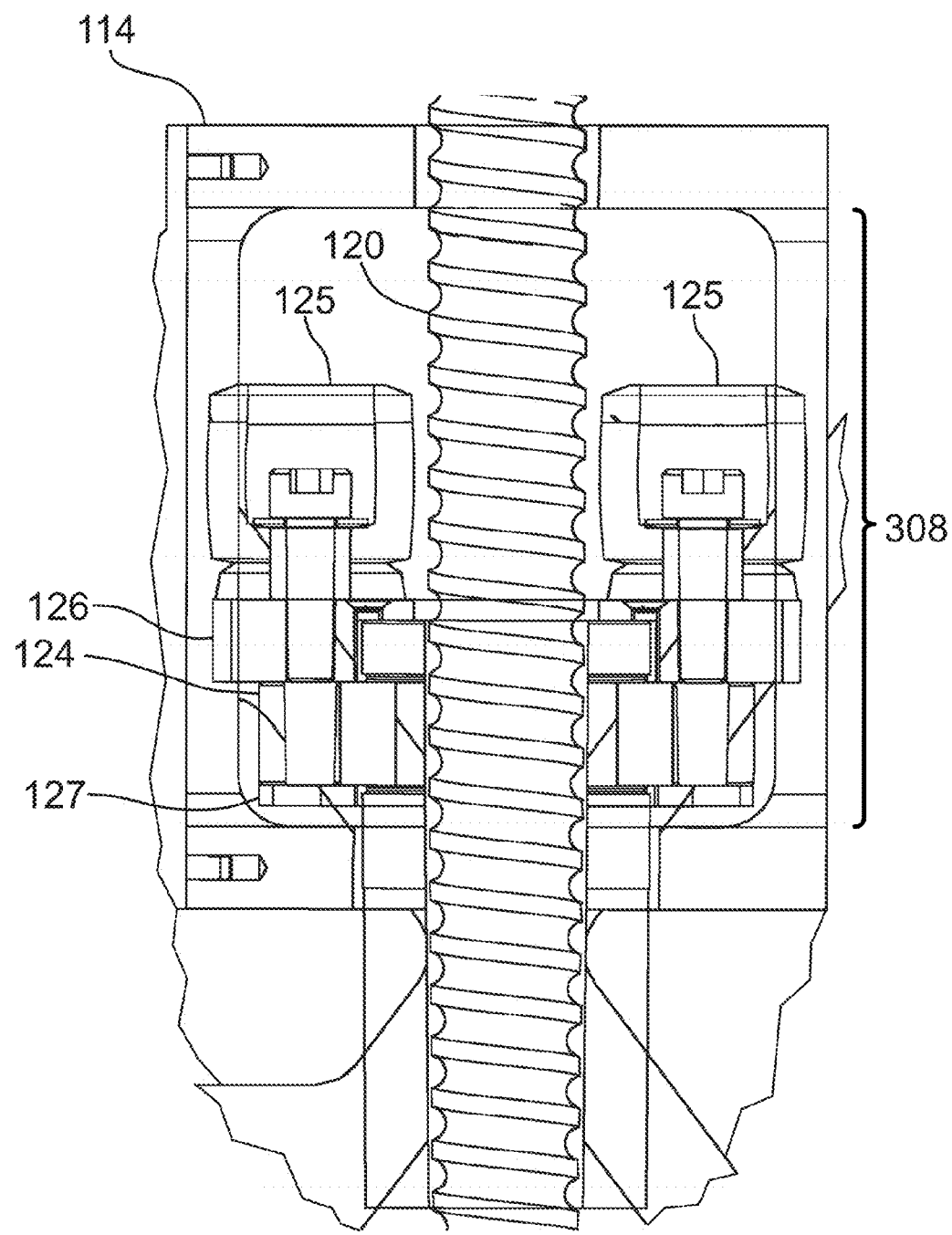
FIG. 20 is a partial sectional view along the line 11-11 of FIG. 9 showing the installation of the shock absorbers within the carriage.

FIG. 20 is a partial sectional view along the line 21-21 of FIG. 2 showing the installation of the shock absorbers 125 attached to the shock absorber mount plate 126 which is then attached to the nut plate 127 capturing the ball screw nut 124 between them. The three assembled items 125, 126 and 127 are then free to move within the ball screw nut slot 308 in the shuttle 114.

Figure 21:
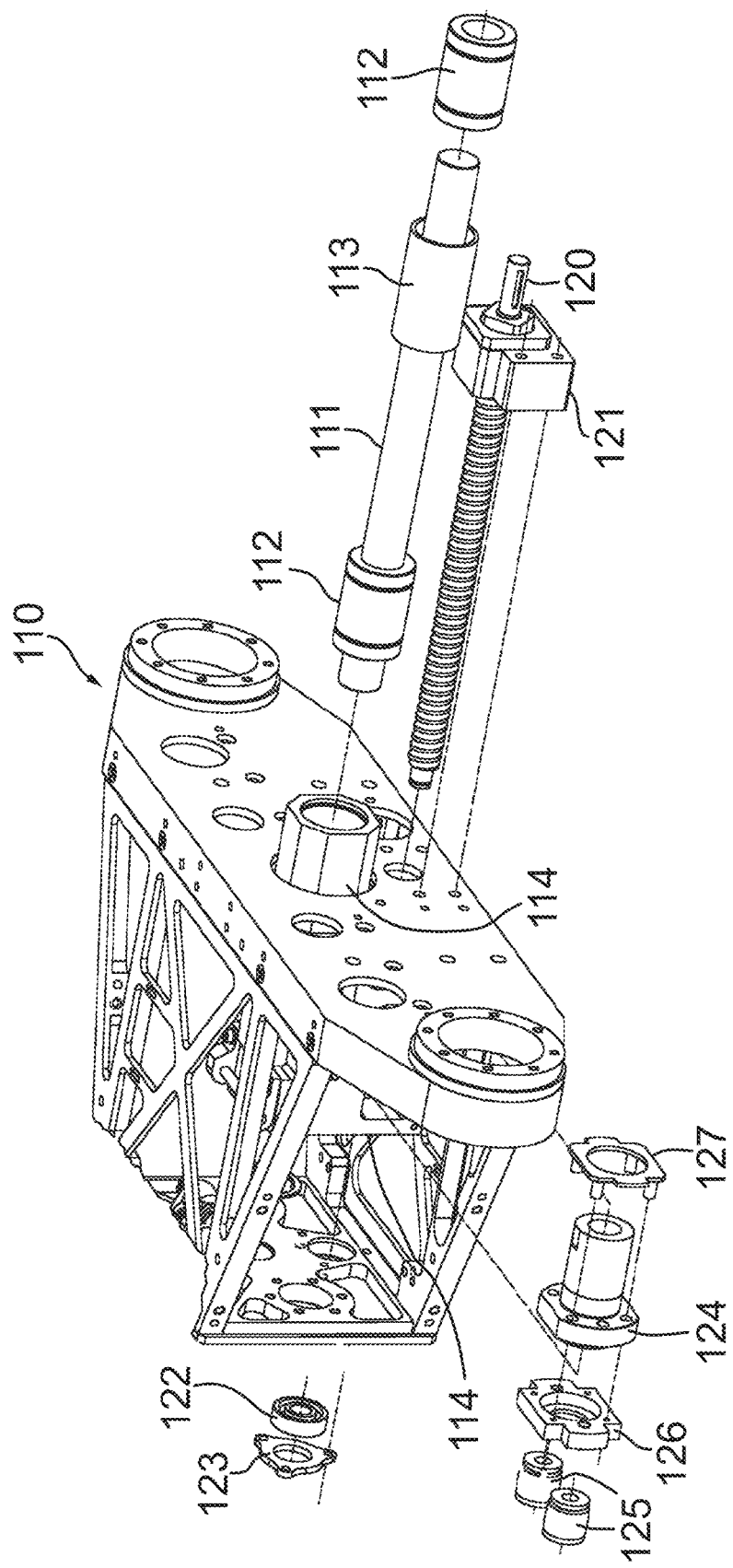
FIG. 21 is a partial exploded view of the main housing showing installation of the shaft 111 and ball screw 120.

FIG. 21 is a partial exploded view of the main housing 110 showing installation of the shaft 111 and ball screw 120. The shock absorbers 125 are attached to the shock absorber mount plate 126 which is then attached to the nut plate 127 capturing the ball screw nut 124 between them. The shuttle 114 moves back and forth guided by the guide shaft 111 with friction being reduced by the guide shaft bearings 112 that are spaced appropriately by the guide shaft bearing spacer 113. The ball screw shaft 120 is secured to the main housing 110 by the ball screw thrust bearing 121 and stabilised by the ball screw tail bearing 122 which is secured by the bearing cover 123.

Figure 22:
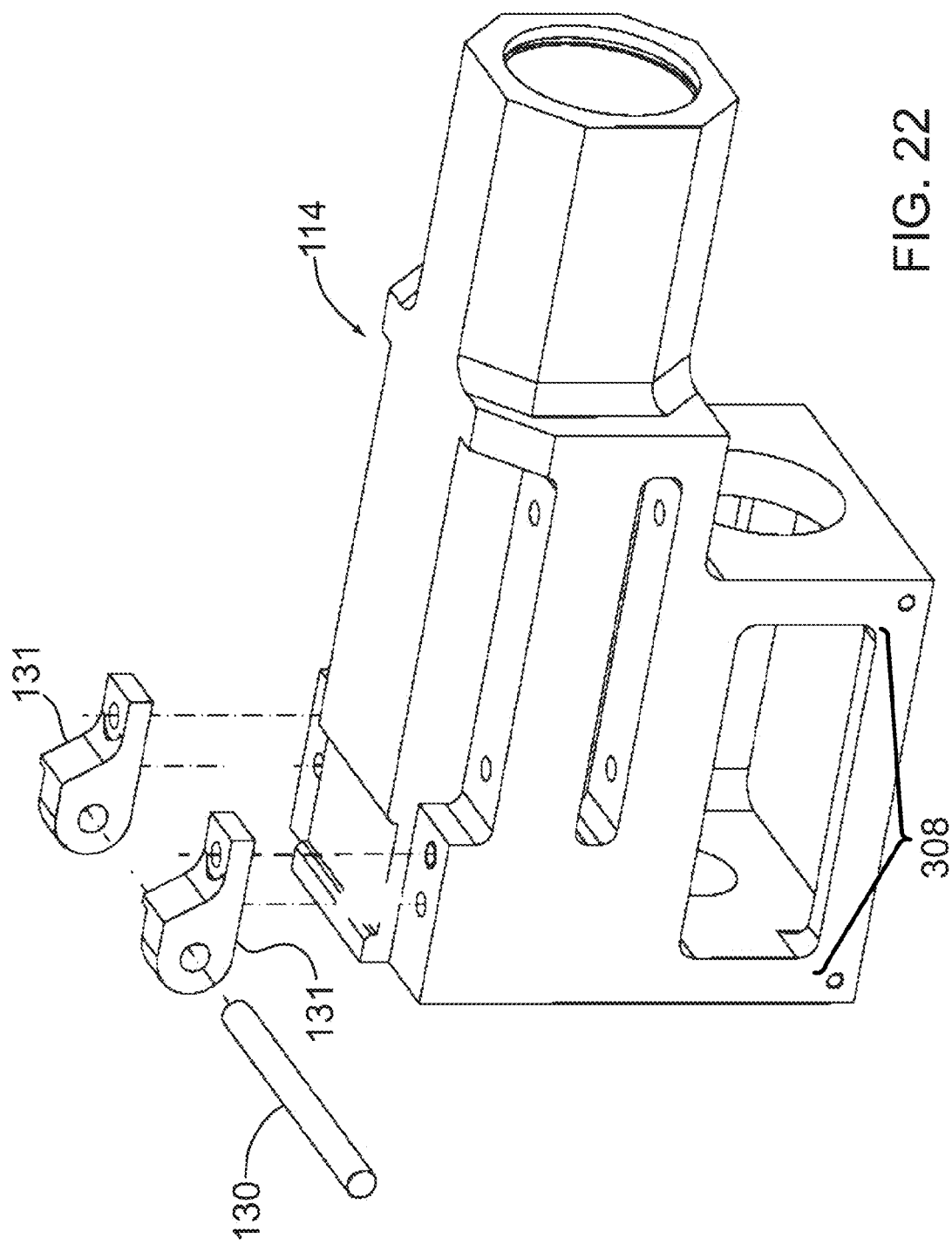
FIG. 22 showing details of the shuttle 114 and the trigger bar 130.

FIG. 22 shows details of the shuttle 114, the trigger bar 130 and the trigger bar supports 131 that secure the trigger bar 130 to the shuttle 114. The ball screw nut slot 308 is sized such that with the ball screw nut 124 in the ready-to-latch position as shown in FIG. 20, the free play in the slot permits the shuttle 114 to advance very rapidly under the influence of the plunger springs 171 without requiring the ball screw shaft 120 to rotate. This permits the rapid soft capture action of the capture mechanism 100.

Figure 23:
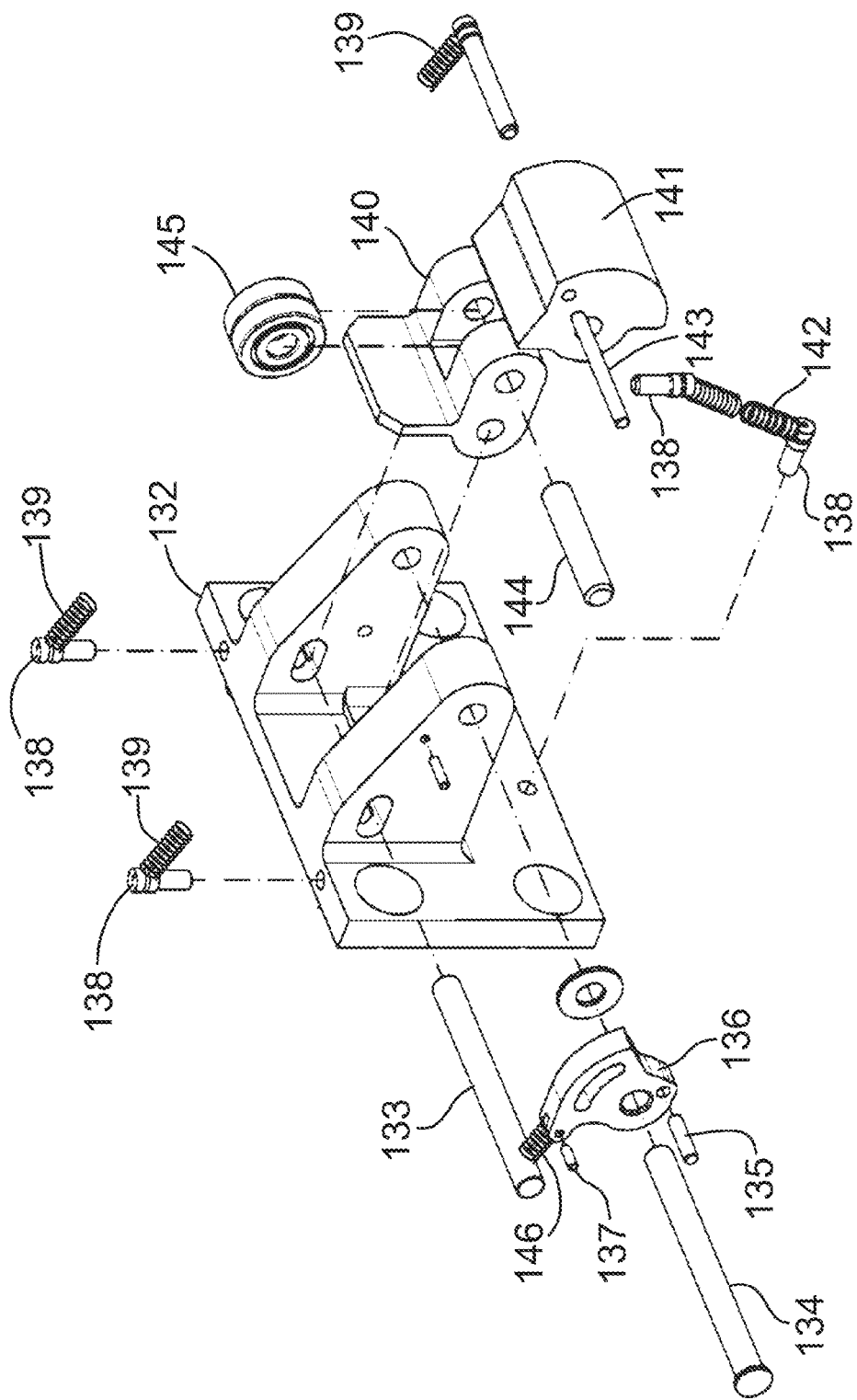
FIG. 23 showing details of the trigger mechanism.

FIG. 23 shows details of the trigger mechanism. The trigger mechanism is comprised of three parts, the trigger reset lever 136, the sear 141 and the trigger 140 all mounted such that they are free to rotate and yet biased into preferred positions by the trigger lever return spring 146, the sear spring 139 and the trigger spring 142, respectively. The trigger reset pawl 135 transmits motion from the trigger bar support 131 to the trigger reset lever 136, which then moves the trigger reset rod 143 which rotates the sear 141 out of the way permitting the trigger 140 to return to the armed position driven by the trigger spring 140.

Figure 24:
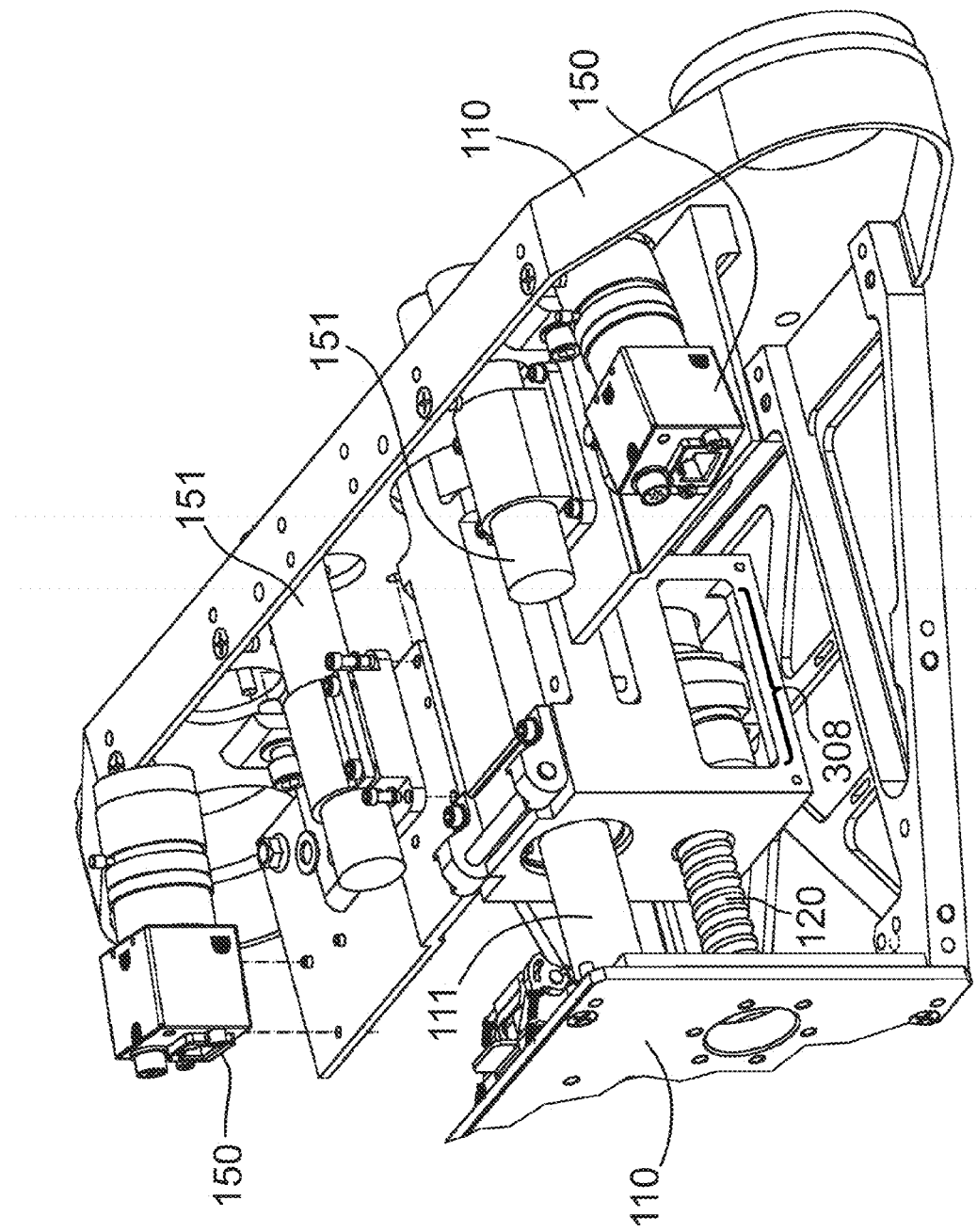
FIG. 24 is a partial exploded view showing elements of the vision system 602.

FIG. 24 is a partial exploded view showing the optical elements of the vision system 602 showing the positions of the cameras 150, and the line-producing lasers 151 mounted on the main housing 110.

Figure 25:
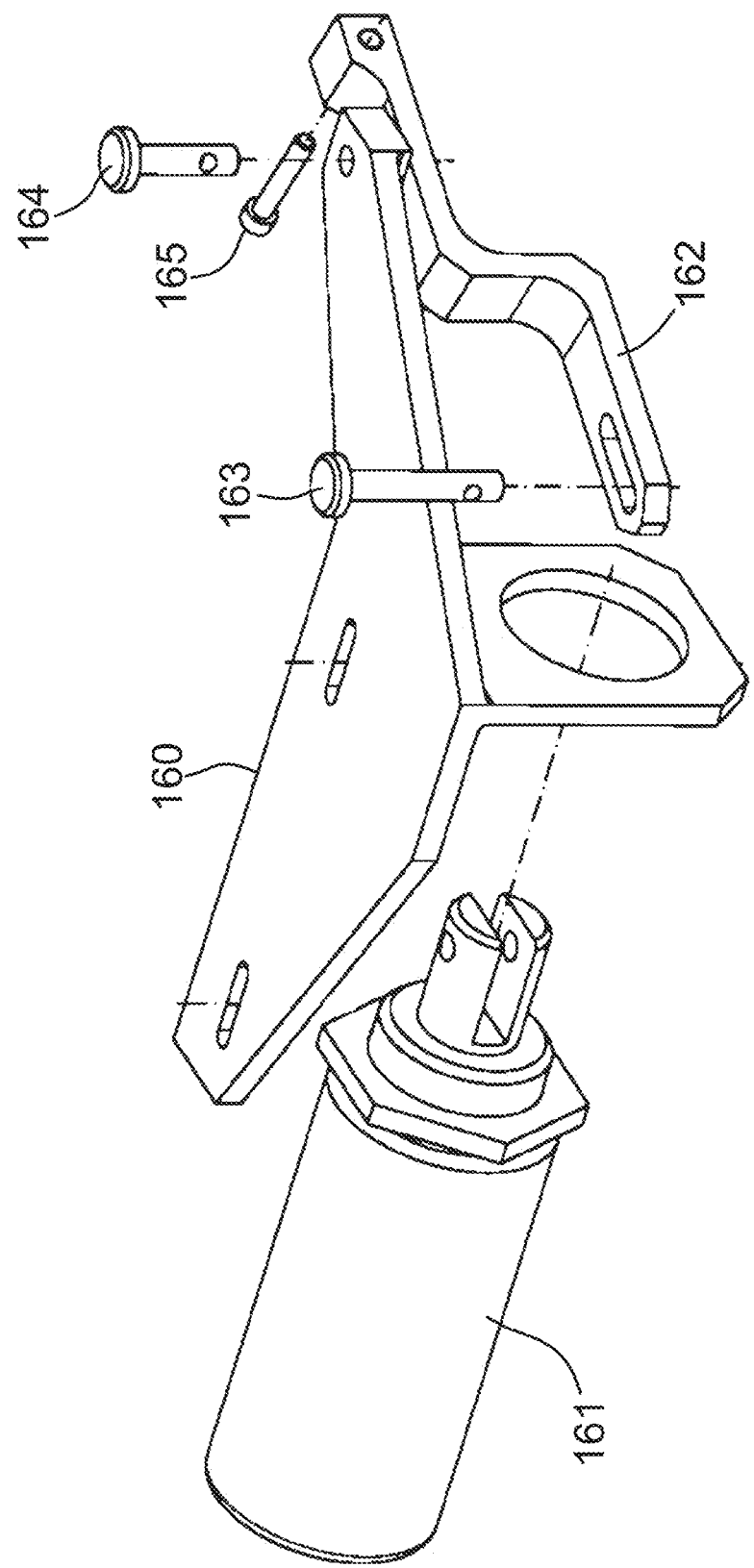
FIG. 25 showing details of the trigger-actuating solenoid 161.

FIG. 25 showing details of the trigger-actuating solenoid subassembly. The solenoid 161, mounted to the solenoid mounting plate 160, acts when commanded by the computing system 600. The shaft of the solenoid retracts into the body of the solenoid 161 when activated, which causes the solenoid lever 162 to rotate. This solenoid lever 162 is connected to the solenoid 161 by the solenoid pin 163 and to the solenoid mounting plate 160 by the lever pin 164. The trigger striker 165 is mounted to the solenoid lever 162 such that it forces the trigger 140 to rotate sufficiently to activate the capture mechanism 100.

Figure 26:
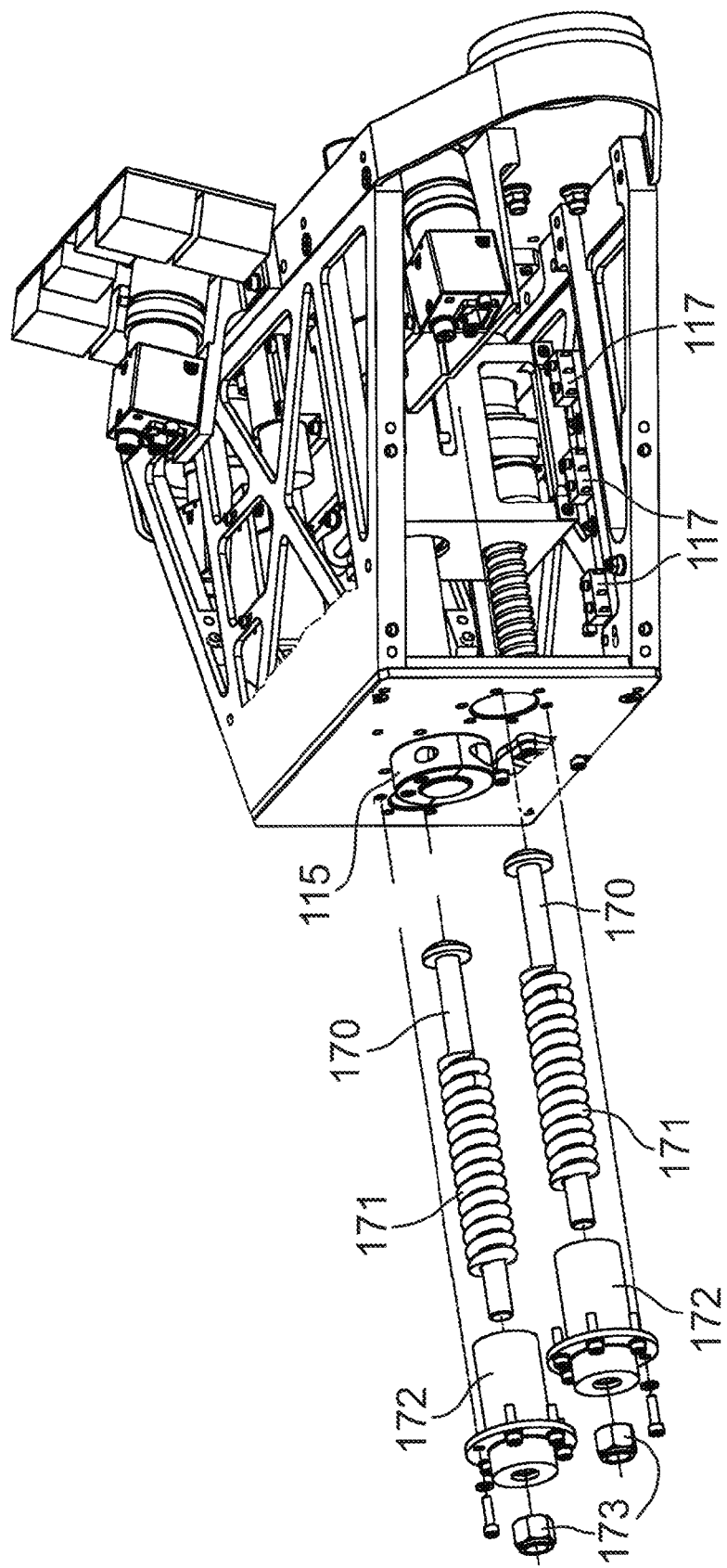
FIG. 26 is a partial exploded view showing installation of the shuttle plungers 170.

FIG. 26 is a partial exploded view showing installation of the shuttle plungers 170. Microswitches 117 are mounted to the main housing 110 such that as they open or close, they provide desired information on the location of the shuttle 114 to the computer system 600. Guide shaft retainer 115 secures the guide shaft 111 to the main housing 110. The plungers 170 are free to move reciprocally within the spring housings 172 which are secured to the main housing 110. The forward end of the plungers 170 butt against the aft face of the draw bars 116 (not shown). The aft motion of the plungers 170 is constrained by the plunger springs 171, which in the armed condition, are compressed sufficiently to propel the plungers 170 forward forcing the draw bars 116 and cam roller assemblies 240 to complete the soft capture action. The plungers 170 are contained within the spring housings 172 by the retainer nuts 173.

Figure 27:
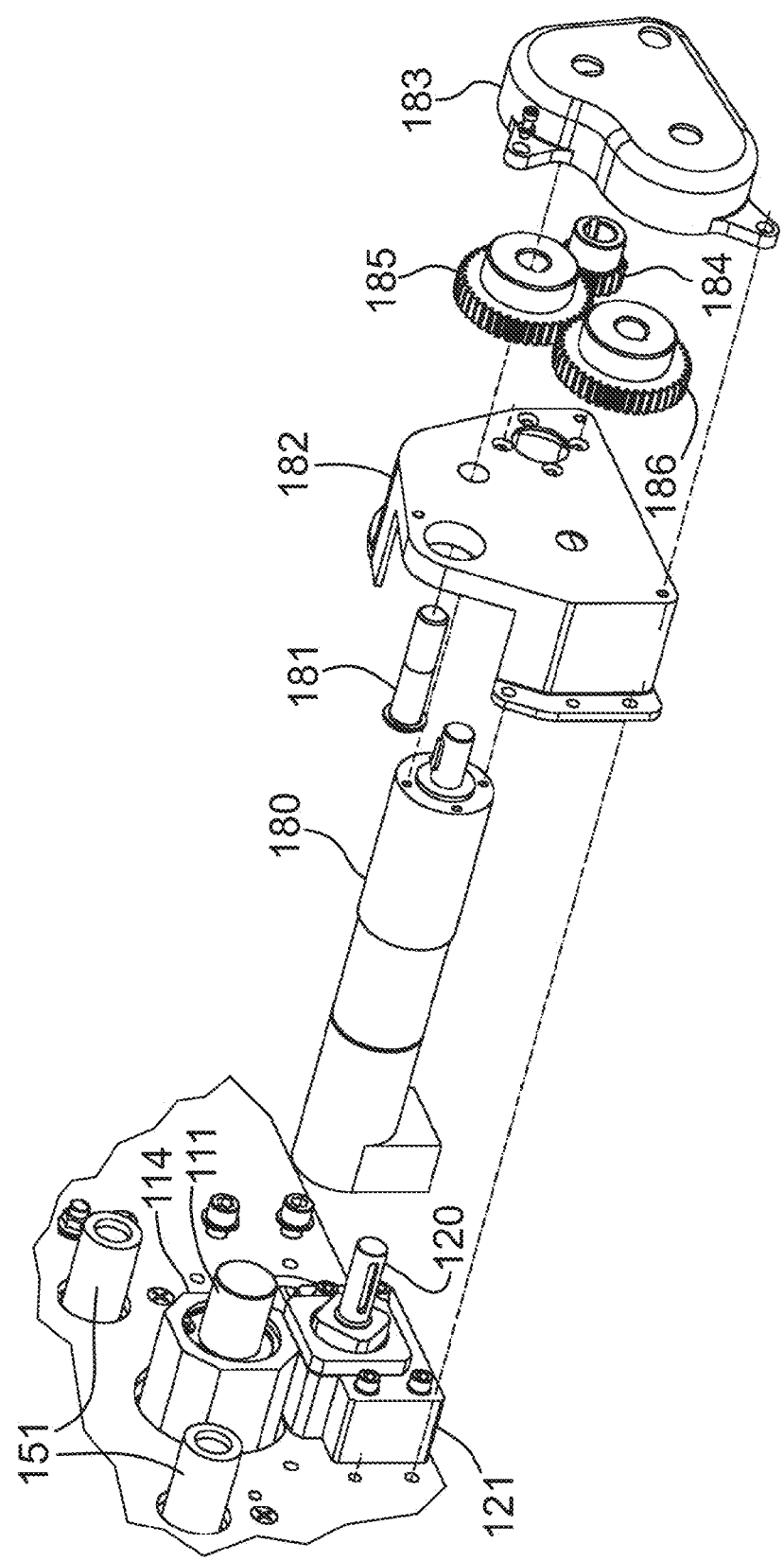
FIG. 27 showing details of the actuator 180 and associated gearing.

FIG. 27 shows details of the actuator 180 and associated gearing. The actuator 180 is secured to the motor output gear 184 which rotates the idler gear 185, secured by the idler axle 181 to the actuator mounting 182 which is attached to the main housing 110. The idler gear 185 rotates the ball screw input gear 186 which is secured to the ball nut shaft 120 rotating the ball nut shaft 120 and transmitting the actuator 180 torque to the ball nut shaft 120.

Figure 28:
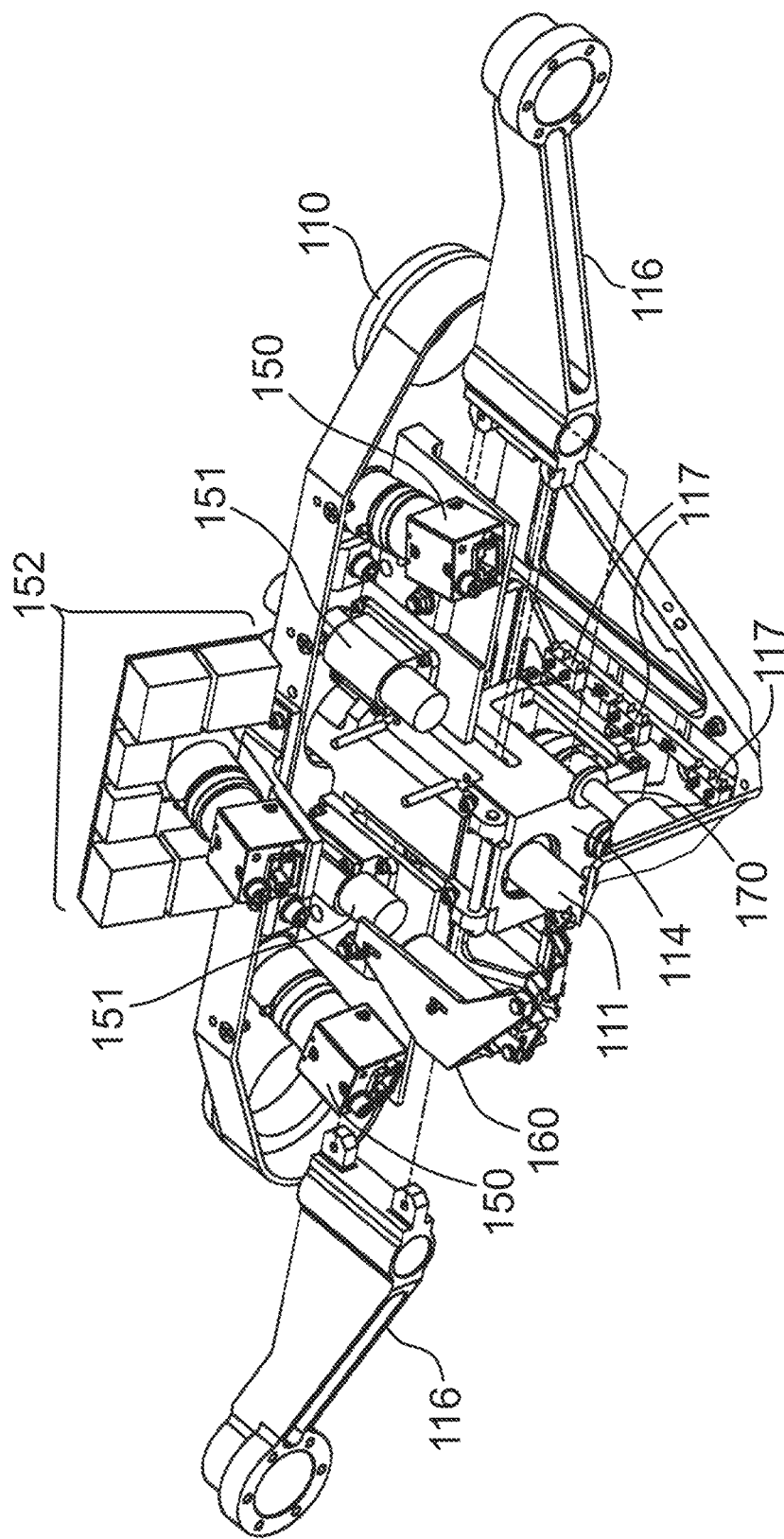
FIG. 28 showing details of the draw bars 116.

FIG. 28 shows how the draw bars 116 assemble into the shuttle 114 and how the plungers 170 interfaces with the draw bars 114. It also shows the relationship between the stereo pair of cameras 150, situational cameras 152, the solenoid mounting plate 160, the microswitches 117 and the main housing 110.

Figure 29:
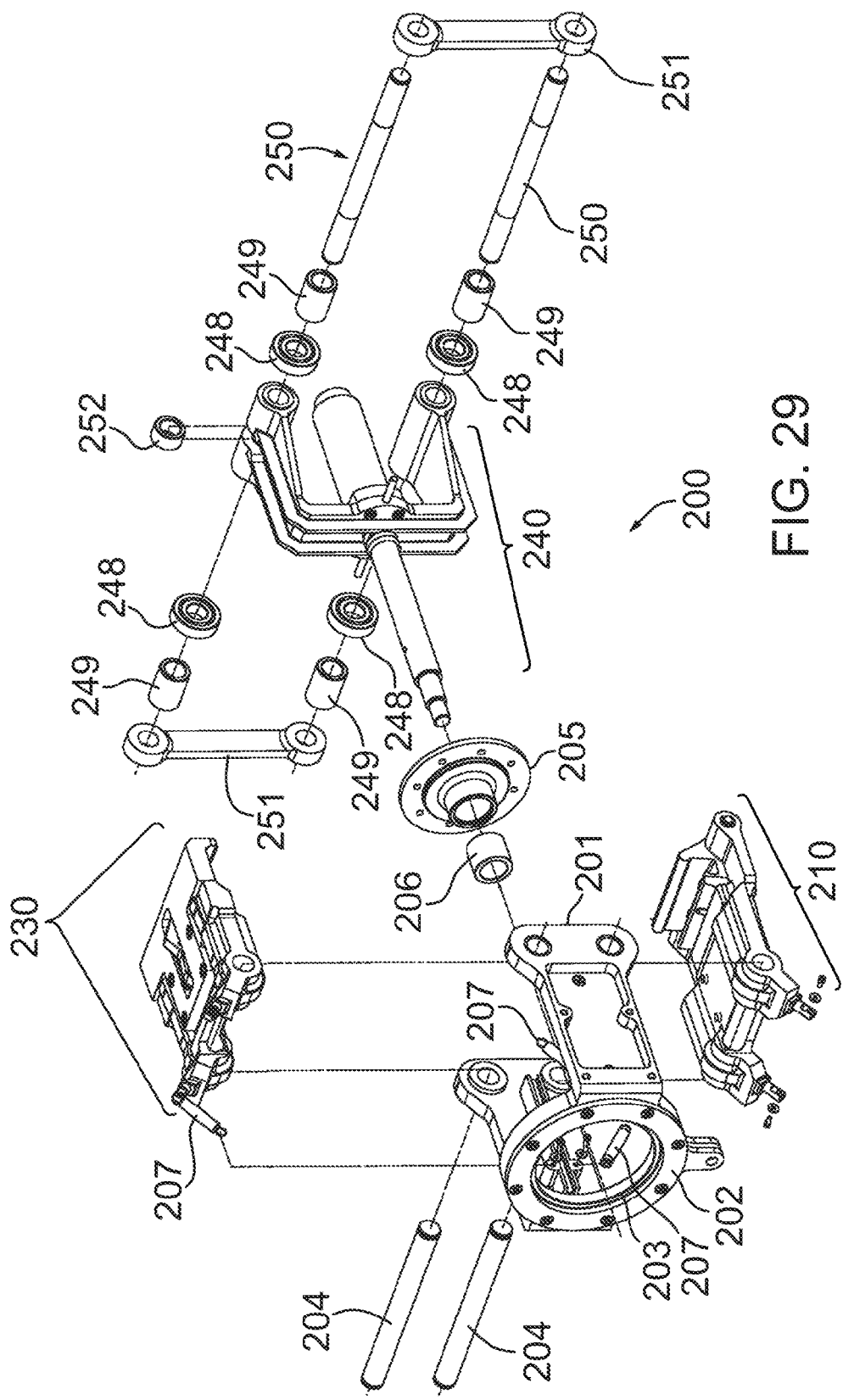
FIG. 29 showing details of the clamp jaw assembly 200.

FIG. 29 is an exploded view showing details of the clamp jaw assembly 200. The variable jaw assembly 210 and the locking jaw assembly 230 are flexibly mounted to the clamp housing 201 by hinge pins 204 and biased to a preferred position by jaw hinge springs 207. Bearing cover plate 202 secures the clamp housing bearing 202 to the clamp jaw assembly 200. The cam rollers 248 and lock roller 252 are secured to the cam follower assembly 240 but free to rotate by the roller axles 250 and located by the spacers 249. The links 251 maintain the correct spacing between the cam rollers 248 when under load during the rigidising action. The jaw bearing plate 205, in conjunction with the clamp housing bearing 203, permits the clamp jaw assembly 200 to rotate with respect to the main housing 110 while being axially and laterally supported in the main housing 110. The journal bearing 206 permits the cam follower assembly to move axially with respect to the rest of the clamp jaw assembly 200.

Figure 30:
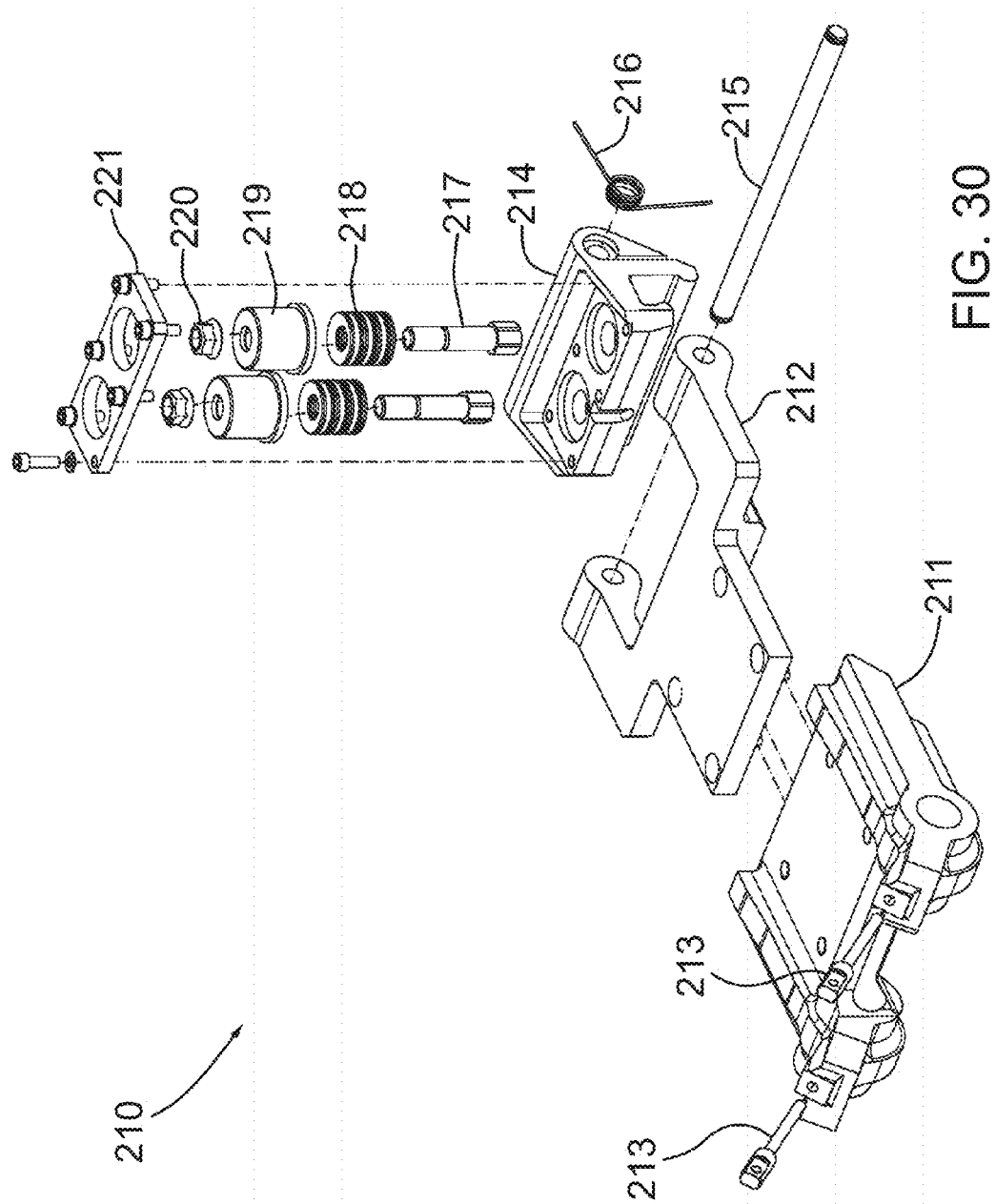
FIG. 30 showing details of the variable clamp jaw assembly 210.

FIG. 30 showing details of the variable clamp jaw assembly 210. The clamp hinge plate 212 is secured to the jaw hinge 211. The spring mounts 213 permit jaw hinge springs 207 (not shown) to be mounted to the assembly. The variable jaw 214 is attached to the clamp hinge plate 212 by the clamp hinge pin 215, but is free to rotate. The position of the variable jaw 214 is biased to a preferred position by the spring 216. The contact plungers 217 are secured to the spring housing 219 by the plunger retaining nuts 220 such that they may move axially and trap the contact springs 218. The spring housings 219 are attached to the variable jaws 214 by the plunger mounting plate 221.

Figure 31:
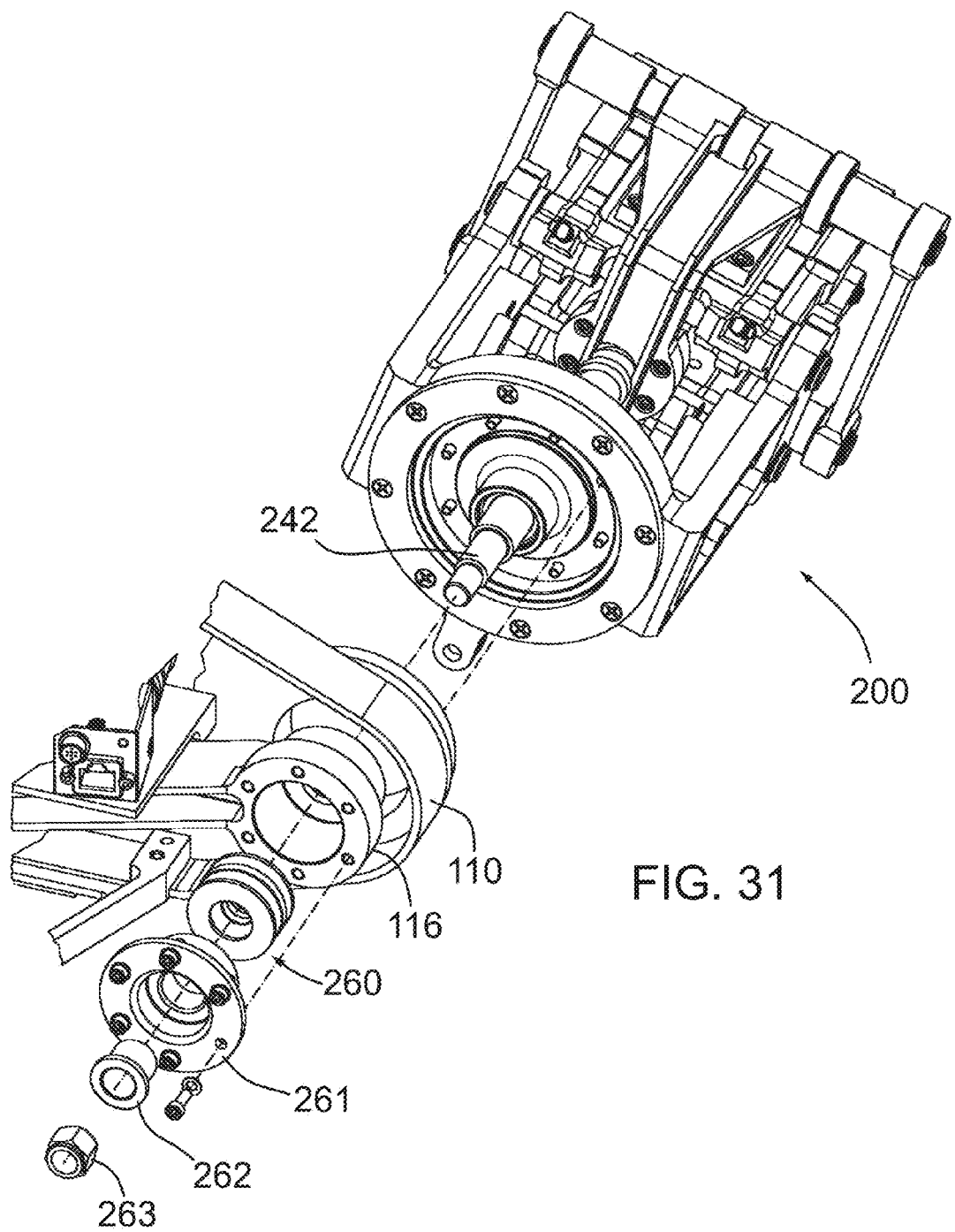
FIG. 31 showing details of how the clamp jaw assembly 200 is free to move within the main housing 110.

FIG. 31 shows details of how the clamp jaw assembly 200 is free to move within the main housing 110. The jaw bearing plate 205 is fastened to the main housing 110 which, in concert with the clamp housing bearing 203 permits the clamp jaw assembly 200 to rotate with respect to the main housing 110. The contact shaft 242 is secured to the draw bar 116 using the clamp retainer 261. The compliance spring 260 and the journal bearing 262 permit the draw bar 116 to move axially with respect to the clamp jaw assembly 200 reducing the chances of damage at the end of draw bar 116 travel.

Figure 32:
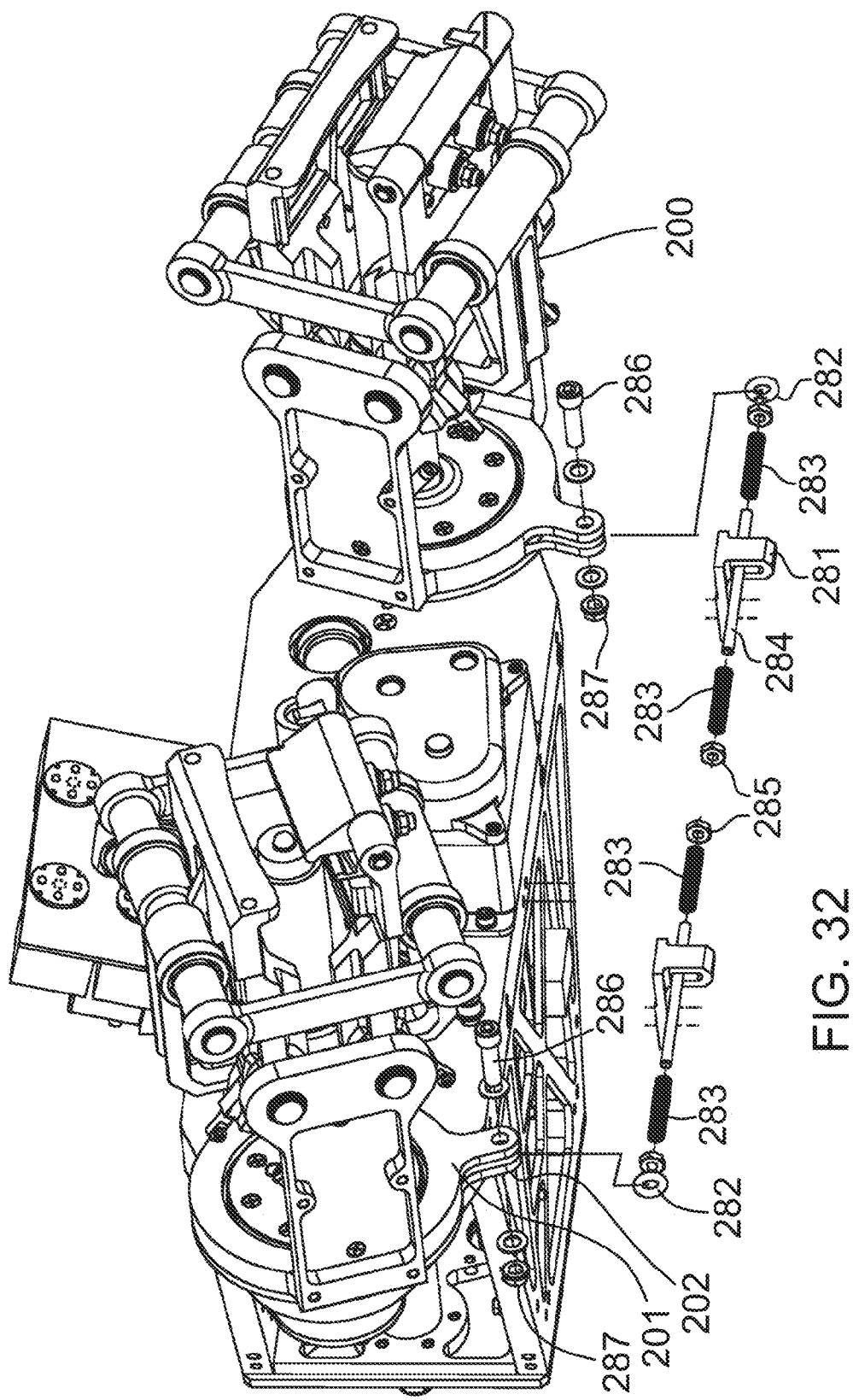
FIG. 32 showing details of the mechanism that restrains rotary motion of the clamp jaw assembly 200.

FIG. 32 shows details of the mechanism that restrains rotary motion of the clamp jaw assembly 200. With the brackets 281 secured to the main housing 110, the torque rod 284 is placed with a slot in the bracket 281. A spring 283 is placed over each end of the torque rod 284 such that the bracket 281 is sandwiched between them. The springs 283 are secured by a rod retainer nut 285 on the interior end and by a link 282 on the external end. The hole in the link 282 is secured to a clevis in the clamp housing 201 by a link pin 286 and a link pin nut 287. The torque rod 284 is free to move within the slot in the bracket 281 yet is centred by the opposing actions of the springs 283 thus centring the position of the clamp jaw assembly 200 with respect to the main housing 110.

Figure 33:
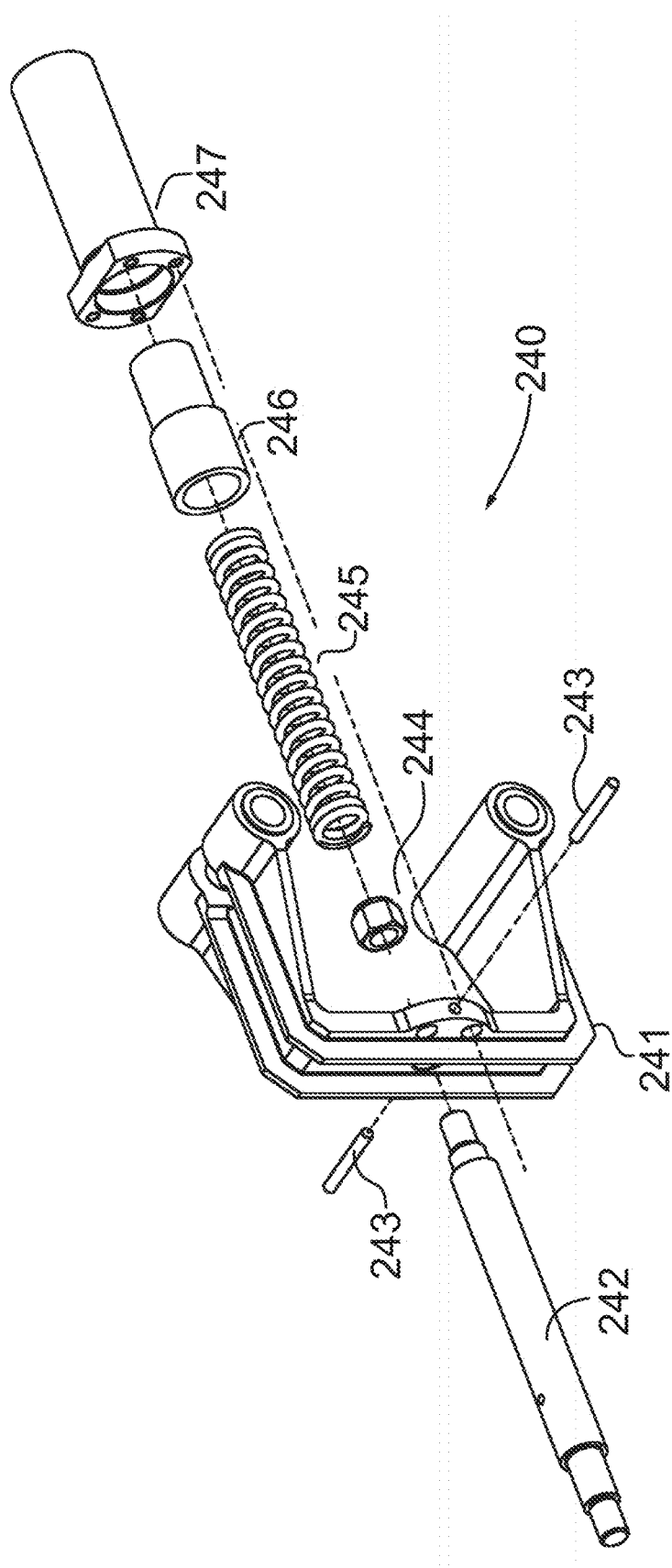
FIG. 33 showing details of the cam follower assembly 240.

FIG. 33 shows details of the cam follower assembly 240. The contact shaft 242 is attached to the housing 241 by the shaft retaining nut 244. The contact housing 247 is fastened to the housing 241 permitting the contact 246 to move axially within it constrained by the contact spring 245. Guide pins 243 are fastened to the housing 241 and engage axial slots on the clamp housing 201 to prevent the cam follower assembly 240 from rotating about the axis of the clamp shaft 242 while permitting it to move freely axially with respect to the clamp housing 201.

Figure 34:
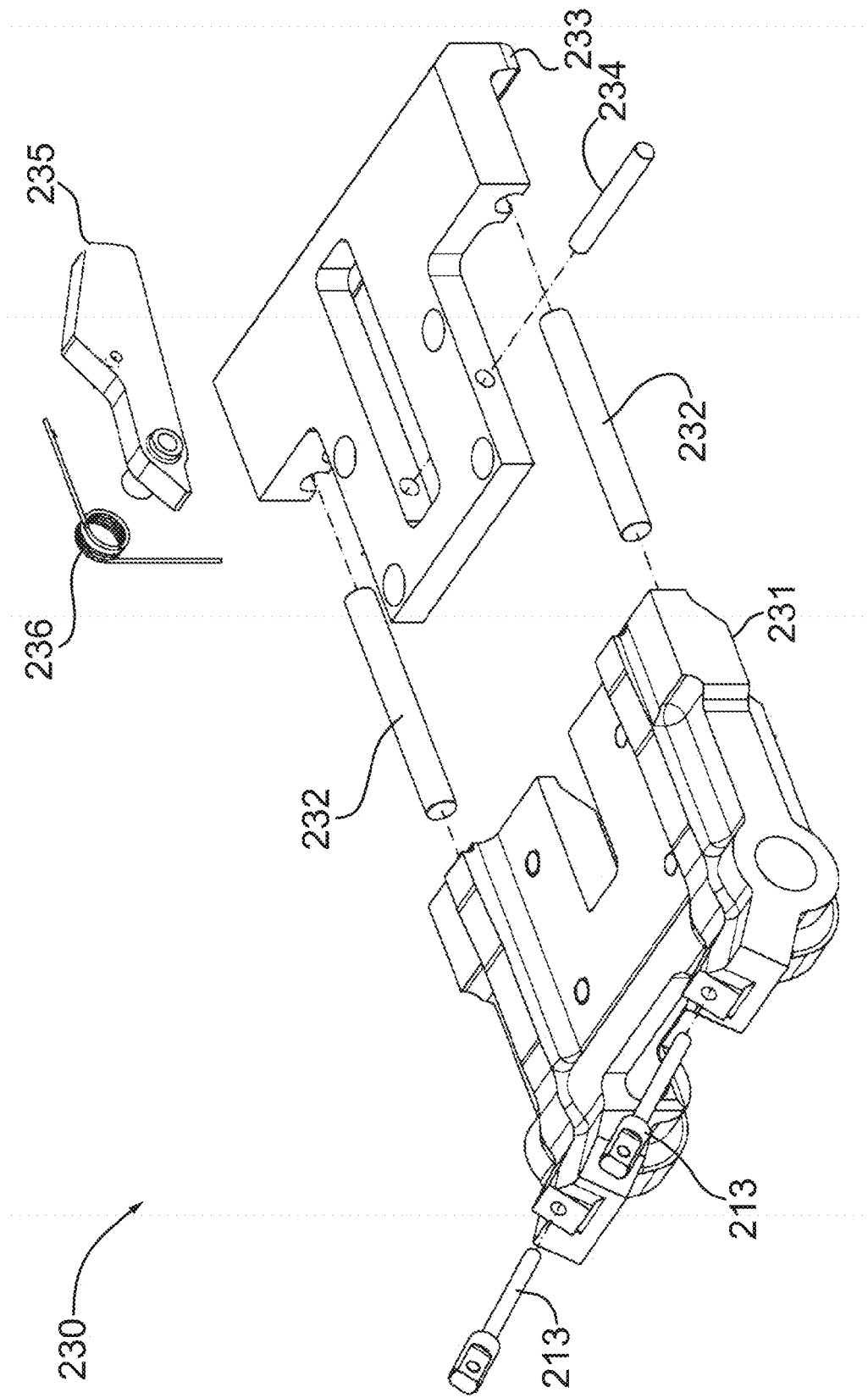
FIG. 34 showing details of the locking jaw assembly 230.

FIG. 34 showing details of the locking jaw assembly 230. The clamp plate 233 is secured to the jaw hinge 231. The spring mounts 213 permit jaw hinge springs 207 to be mounted to the assembly. The lack 235 is attached to the clamp plate 233 by the lock hinge pin 234, but is free to rotate. The position of the lock 235 is biased to a preferred position by the lock spring 236. Contact rods 232 are secured to the clamp plate 233 and the jaw hinge 231 and provides a hard contact surface that the feature 502 can abut to.

Figure 37:
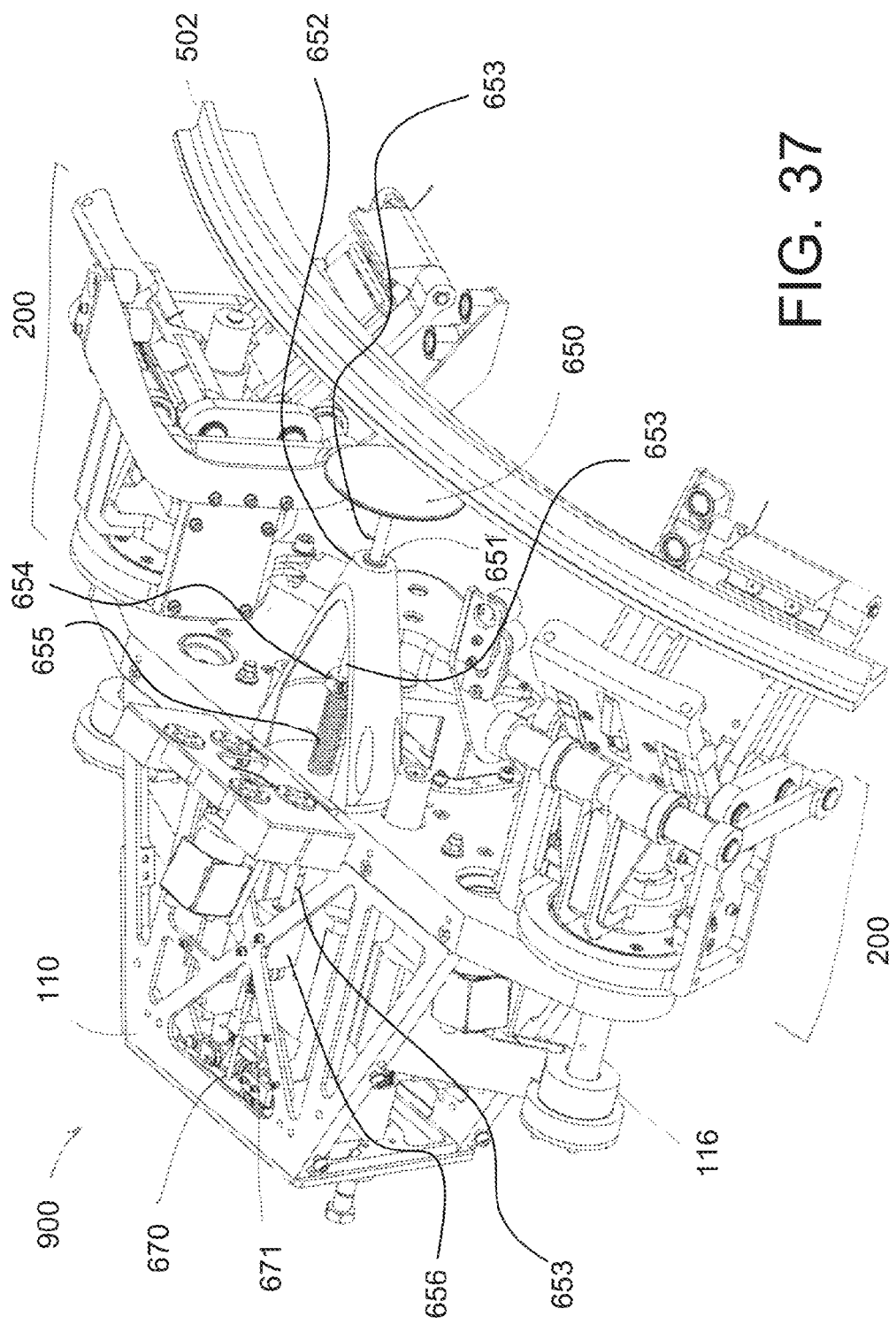
FIG. 37 is an overall view of an alternate embodiment of the tool that has been fitted with a mechanical trigger for the mechanism in addition to the solenoid trigger method shown in FIGS. 13 and 17.

FIG. 37 is an overall view of an alternate embodiment of the tool 900 that has been fitted with a mechanical trigger for the mechanism in addition to the solenoid trigger method shown in FIGS. 13 and 17. In this embodiment a pusher plate 650 has been arranged such that it is a back-up activating method and thus is not engaged unless the electronic triggering method fails. It will be understood that should it be required, this arrangement can be reversed so that the mechanical trigger is the primary method and the electronic triggering method is the back-up method.

Figure 39:
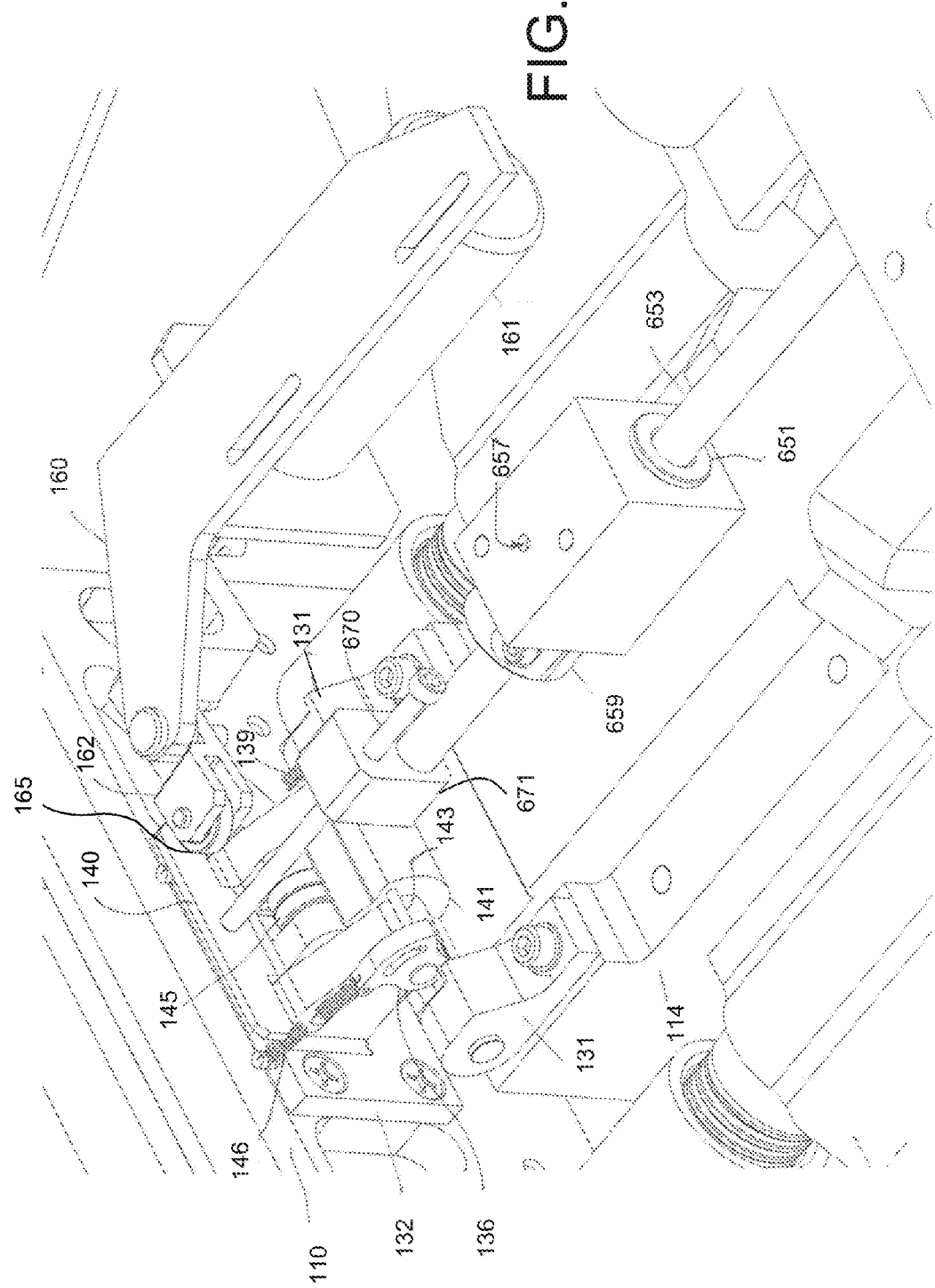
FIG. 39 is a detail showing how the trigger pin 670 acts to contact the trigger 140 and release the sear 141 to activate the mechanism.

The pusher plate 650 is connected to a rod 653 that transmits the contact force via the trigger pin 670 to the trigger 140 (best seen in FIG. 39). The rod 653 is supported at the front by support 652 and at the rear by bushing block 656 which is fastened to the main housing 110. The rod 653 is guided by bushings 651 and terminates in a pin support 671.

Figure 38:
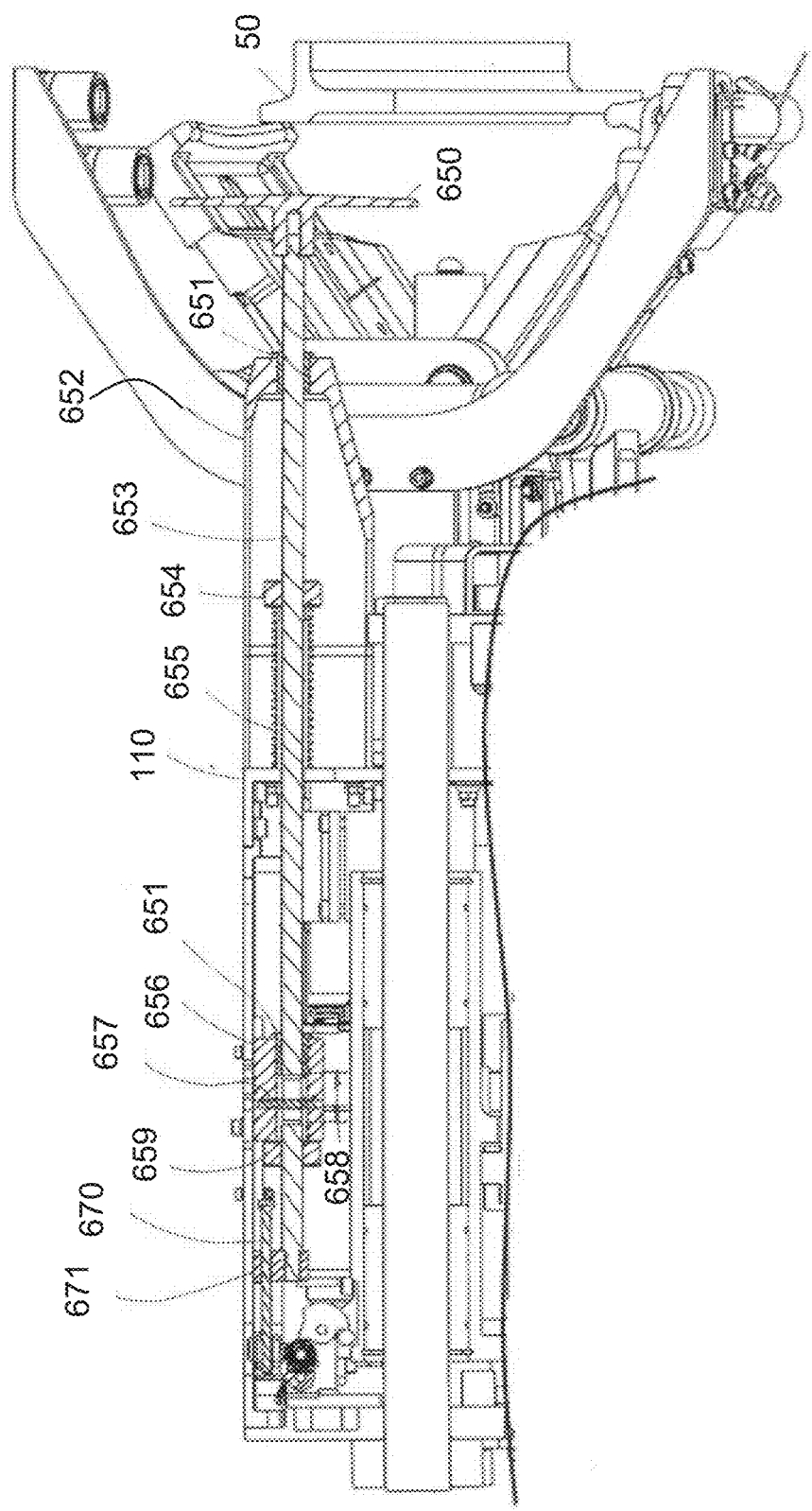
FIG. 38 is a sectional view taken in the same plane as the section for FIG. 18 as shown in FIG. 9. It shows how the pusher plate 650 is connected by rod 653 to the trigger pin 670 which then contacts the Trigger 140.

FIG. 38 is a sectional view taken in the same plane as the section for FIG. 18 as shown in FIG. 9. It shows how the pusher plate 650 is connected by rod 653 to the trigger pin 670 which then contacts the trigger 140. The motion of the pusher plate 650 and rod 653 are controlled by spring 655, the effect of which is adjusted by securing collar 654 at various points along the rod 653. A second collar 654 prevents the rod 653 from extending too far out of the tool 900. Depending upon the final purpose to which the tool 900 will be put, the adjustability of the securing collar 654 may be limited to establishing the correct performance of the tool 900 by being adjusted only during manufacture or, in an alternate embodiment not shown, by the use of an additional actuator(s) to vary the position of the securing collar 654 on the rod 653 thus varying the performance of the spring 655 and the performance of the mechanical triggering portion of the tool 900 as a whole.

A slot 658 in rod 653 is engaged by a pin 657 that is secured within the bushing block 656 and keeps the trigger pin 670 properly aligned by preventing the rod 653 from rotating around its long axis.

FIG. 39 is a detailed view showing how the trigger pin 670 acts in parallel with and independently of the trigger striker 165 to contact the trigger 140 and release the sear 141 to activate the mechanism. Aftward motion of the rod 653 forces the trigger pin 670 against the surface of trigger 140. Pin support 671 is threaded for trigger pin 670 and the exact timing of when the trigger pin 670 strikes the trigger 140 is set by advancing or retarding the position of the trigger pin 670 within the pin support 671.

Figure 40:
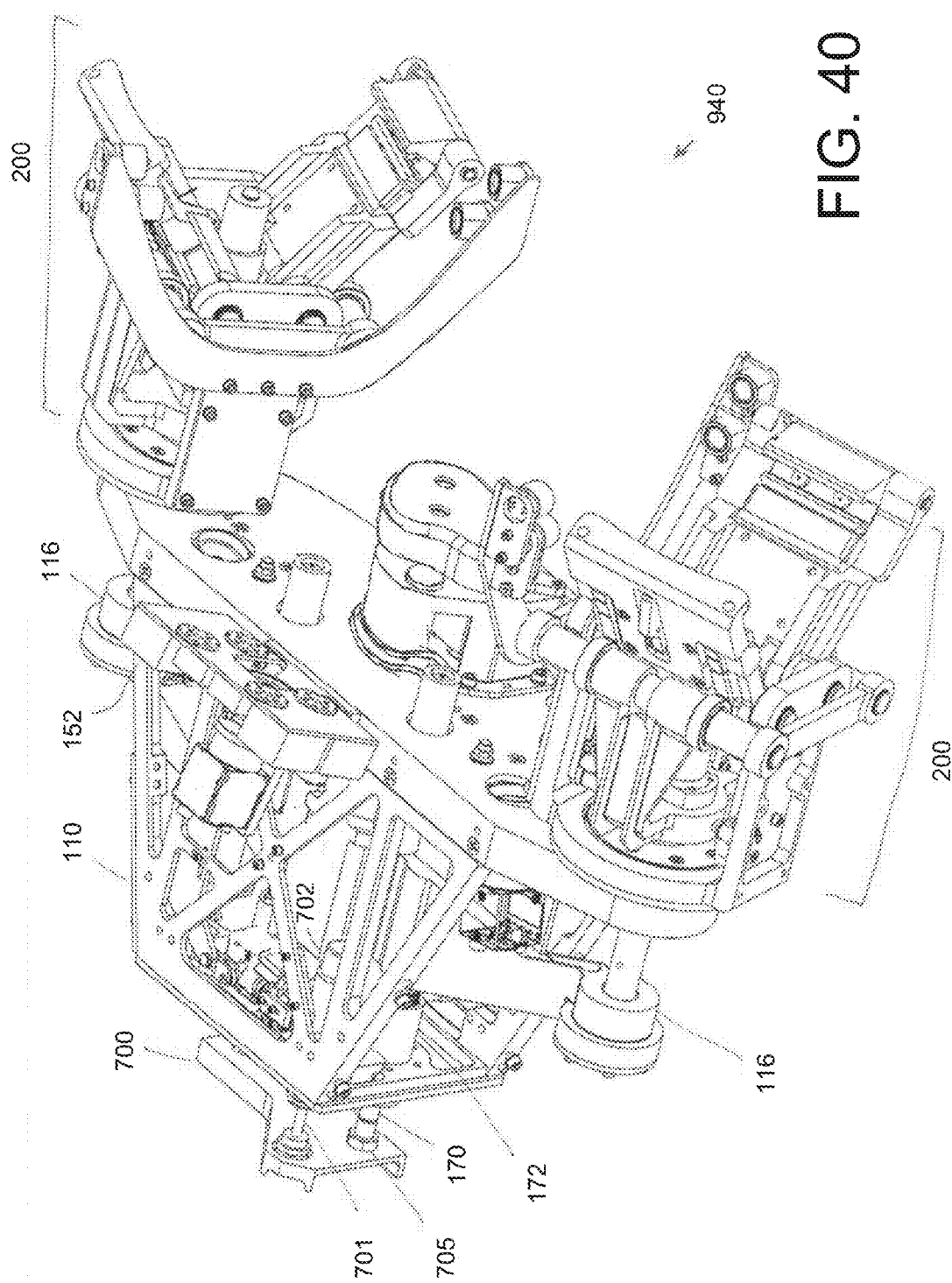
FIG. 40 is an overall view of an alternate embodiment of the tool showing the general arrangement of the shock absorber system from the front of the tool.

An alternate embodiment of the tool, as shown generally at 940 in FIG. 40, includes a shock absorber system to reduce the internal forces generated by the powerful plunger spring 171 when the mechanism is activated. These forces can cause damage to tool or impose shock loads on the servicer spacecraft 500 or the client spacecraft 503.

Figure 41:
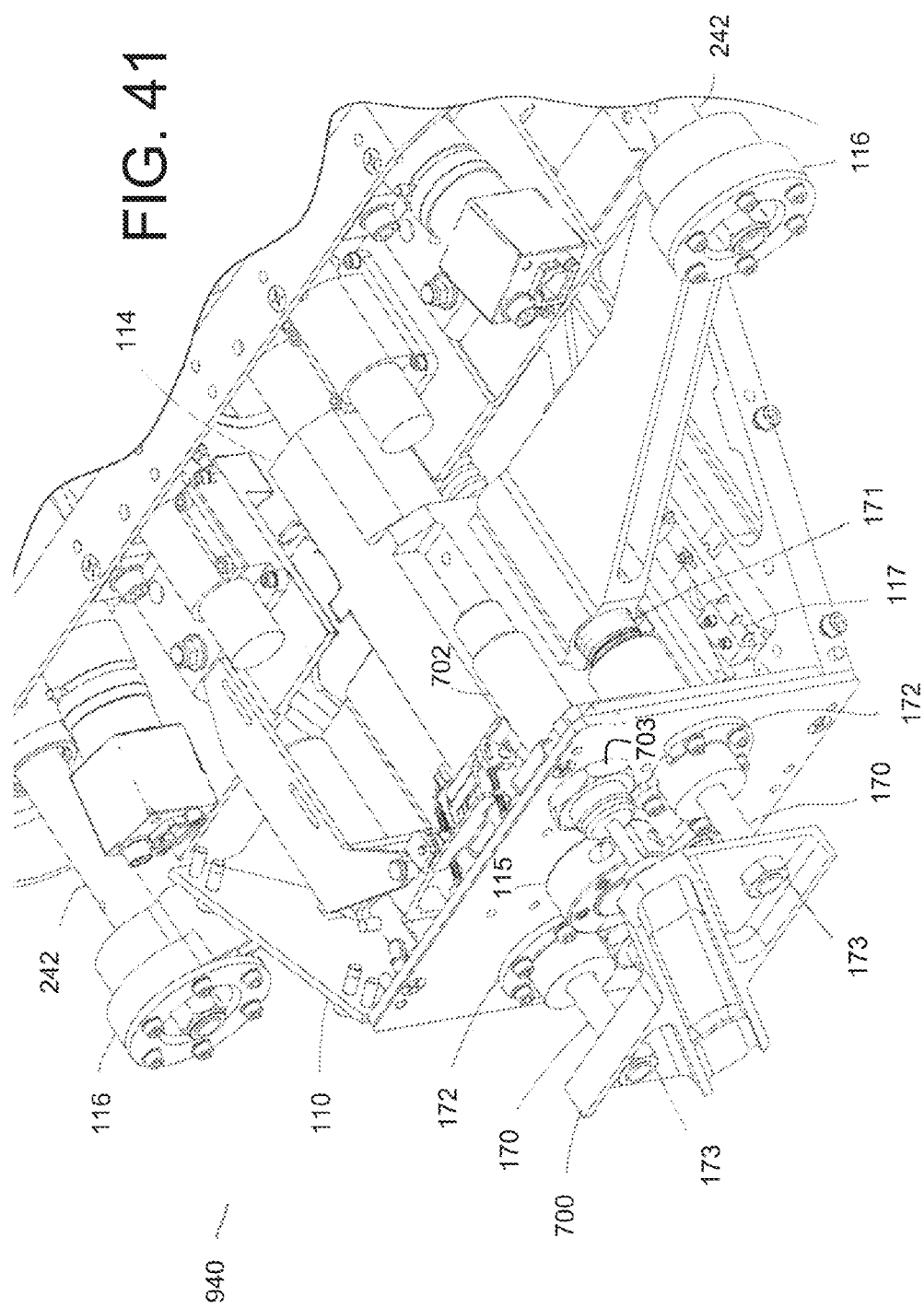
FIG. 41 is an overall view of an alternate embodiment of the tool showing the general arrangement of the shock absorber system from the back of the tool.

FIG. 41 is an overall view of the alternate embodiment of the tool 940 fitted with a shock absorber system 702 showing the general arrangement from the back of the tool. When the mechanism is activated the draw bars 116 are forced forward by the plunger springs 171 acting upon the plungers 170. In this embodiment the plungers 171 are connected together by the connector plate 700 which transfers some of the plunger spring 171 forces to the shock absorbers 702 through the pistons 701 (best seen in FIG. 42). The shock absorbers 702 slow the motion of the draw bars 116 and reduce the internal forces acting upon the housing 110 to decelerate the mechanism at the end of its stroke. The drag caused by the shock absorbers 702 and the spacing 707 (shown in FIG. 42) between the connector plate 700 and the pistons 701 can be varied to fine tune the timing and forces required by the tool 100 to perform successfully.

Figure 42:
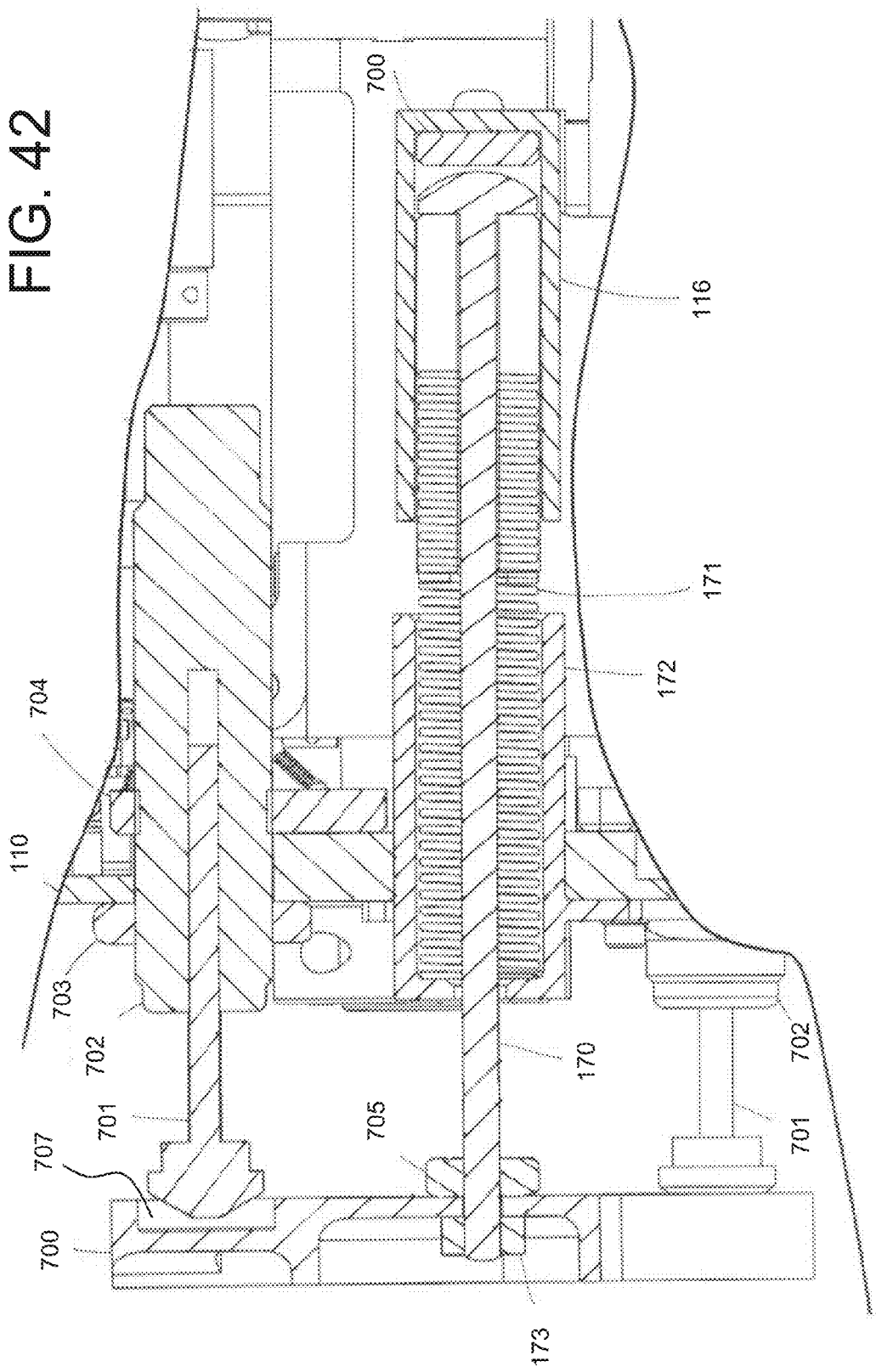
FIG. 42 is a section showing the arrangement of the shock absorber system taken along the line 42-42 of FIG. 9.

FIG. 42 is a section showing the arrangement of the shock absorber system taken along the line 42-42 of FIG. 9. The shock absorber 702 is secured to the housing 110 by mounting plate 704. Both mounting plate 704 and the exterior of the shock absorbers 702 are threaded such that the axial position of the shock absorber 702 can be varied to set the spacing 707. Once located correctly, nut 703 is tightened securing the shock absorber 702 in the correct position. Bumper 706 acts to spread the load from plunger 170 to the draw bars 116.

Figure 43:
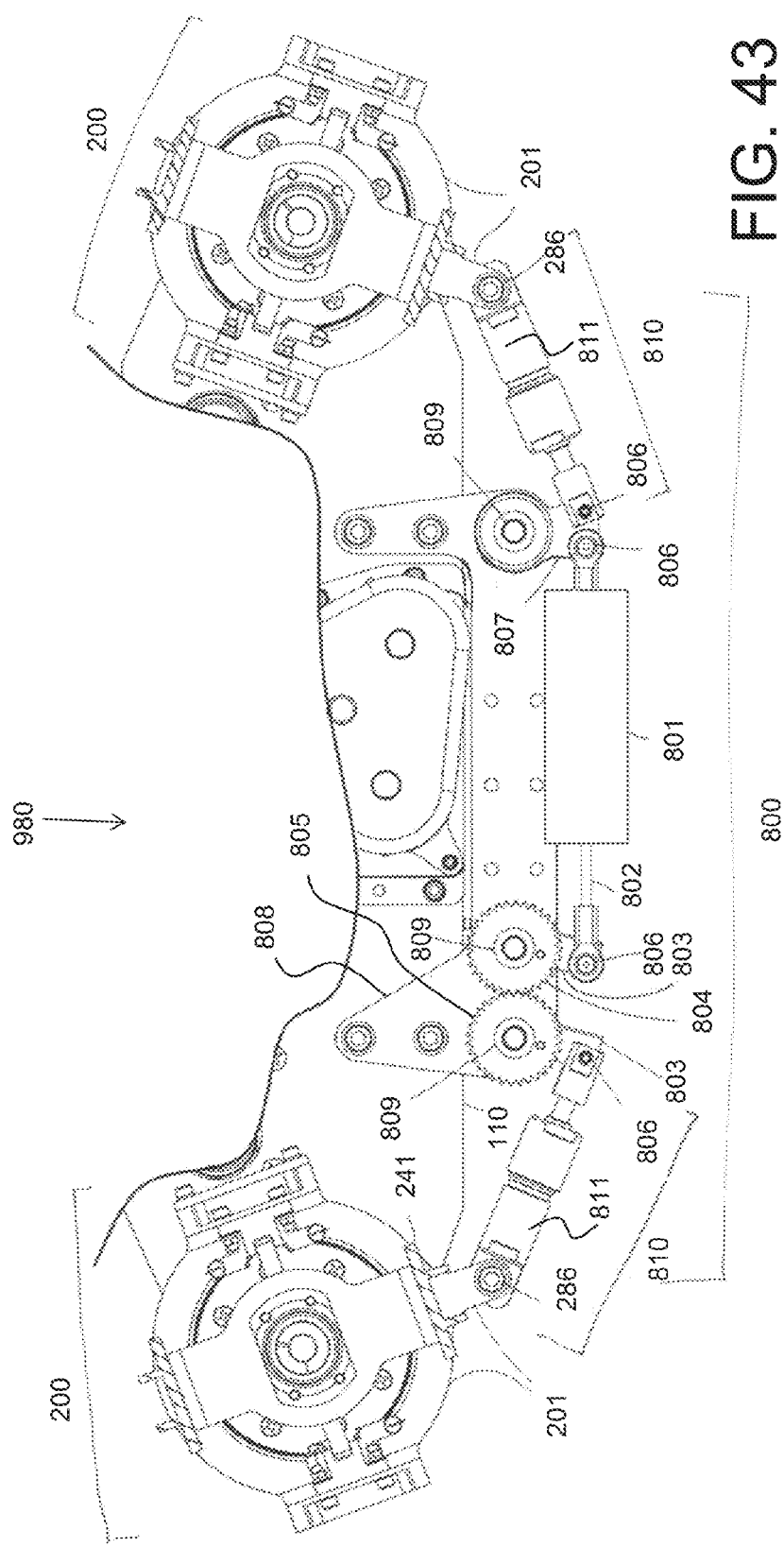
FIG. 43 is a general arrangement an alternate embodiment of the tool equipped with a jaw adjustment system 800 that both coordinates the motion of the two clamp jaw assemblies 200 and allows the clamp jaw assemblies 200 to be adjusted to capture launch adapter rings 502 or other features of varying diameters.

An additional alternate embodiment of the tool 980 equipped with a jaw adjustment mechanism 800 for altering the angular position, also known as the pose, of the clamp jaw assemblies 200 is shown in FIG. 43. The jaw adjustment system 800 both coordinates the motion of the two clamp jaw assemblies 200 and allows the clamp jaw assemblies 200 to be adjusted to capture launch adapter rings 502, or other features, of varying diameters. The jaw adjustment system 800 also incorporates features that provide compliance to the individual clamp jaw assemblies 200 to accommodate small misalignments and client satellite 503 movements.

The coordinated motion function is accomplished by the combination of components, drive gear 809, idler gear 805 and bell crank 807. A rotational input, in this case affected by the linear actuator 801, to one clamp jaw assembly 200 (the left side, for example) will cause the clamp jaw assembly 200 to rotate about the clamp housing bearing 203 (best seen in FIG. 5). This will move the arm securing the link 282 (best seen in FIG. 32) or jaw compliance mechanism 810 to the link pin 286. The jaw compliance mechanisms 810 are free to rotate about either the link pin 286 or the pin 806 at either end. Movement of the jaw compliance mechanism 810 moves the moment arm 803 connected to the idler 805. Rotation of the idler 805 rotates the drive gear 804, but in the opposite direction, which then moves the connected moment arm 803. That moment arm 803 is connected to the shaft 802 and the linear actuator 801 each of which has a pin that is free to rotate at the end. For embodiments where varying the nominal capture radius of the tool is unnecessary, the linear actuator 801 and shaft 802 may be replaced with a single rigid component fitted with free rotating pins on either end (not shown in this embodiment). Rigid motion of the linear actuator 801 causes the bell crank 807 to rotate about axle 809 causing the second jaw compliance mechanism or link to be rotated and then transfer the rotation to the sending clamp jaw assembly 200, but with an opposite and coordinated rotation.

FIG. 44 is a detail view showing how a linear actuator 801 is integrated within the jaw adjustment system 800 of FIG. 43. When it is desired to vary the radius of curvature that the clamp jaw assemblies 200 can accommodate the linear actuator 801 can extend or contract the shaft 802. As configured in FIG. 43, extending the shaft 802 will enable the clamp jaw assemblies 200 to grasp a smaller radius feature through the motion of the gears 804 and 805, bell crank 807 and compliance mechanisms 810 as described above. Retracting the shaft 802 will enable the clamp jaw mechanisms to grasp a larger radius feature, adjusting their pose or rotational position relative to their link pin axes 286 on the main housing 110. The axles 809 are mounted rigidly to the bracket 808 which is rigidly mounted to the housing 110. Different arrangements of gears 804 and 805 and bell cranks 807 can be created to change the motion parameters of the system.

In addition, as an alternate method of adjusting the grasp radius, the linear actuator 801 can be replaced by a rigid shaft and a rotary actuator or motor connected rigidly to the axle 809 of either gear 804 or 805.

FIG. 45 is a detail that shows how the jaw compliance mechanism 810 (FIG. 43) is integrated within the jaw adjustment system 800 (FIG. 43). Undesirable motion variances of the individual clamp jaw assemblies 200 can be accommodated through the introduction of compliance between the two clamp jaw assemblies 200 and between the two clamp jaw assemblies 200 and any actuator 801 used to adjust the nominal clamping radius of curvature. An uncommanded motion of the clamp housing 201 will apply a force on one end of the housing 811 of the jaw compliance mechanism 810 through link pin 286. Springs 814 within the jaw compliance mechanism 810 (see FIG. 45) permit the exterior components of the jaw compliance mechanism 810 to move relative to the compliance shaft 813 which is connected to the rest of the jaw adjustment system 800. The strength and configuration of the springs 814 within the jaw compliance mechanism 810 determine the compliance performance of the jaw compliance mechanism 810.

FIG. 46 is a section through the jaw compliance mechanism 810. In this example, the jaw compliance mechanism consists of housing 811 connected by a link pin 286 to the clamp housing 201 part of the clamp jaw assembly 200. The parts internal to the jaw compliance mechanism 810 are secured by a cap 812. The housing 811 contains a piston 813 with a central stop 815 and springs 814 that act upon the central stop and upon the housing 811 at one end and upon the cap 812 on the other end. The opposing springs 814 act to centralise the piston 813, returning the mechanism to a preset neutral position if perturbed. The details of each spring 814 may be varied to provide specified piston performance to suit the desired overall requirements of the tool. In addition, a damping element, not shown in this embodiment, may be added to the mechanism to further customise its performance. Piston 813 is then connected to the rest of the jaw adjustment system 800 through pin 806 connected to moment arm 803.

An alternate embodiment, not shown, may omit the actuator 801 and any linkage between the bell crank 807 and the idler gear 805 and add actuators to drive the bell crank 807 and idler gear 805 independently of one another. This would further increase the capability of the tool 980 to grasp capture features of varying shapes.

It will be understood that the alternate embodiments described above may be incorporated in the tool 100 of FIG. 1 singly or in any combination depending upon the demands of the purpose for which the tool 100 is being used. The exact alternate embodiments described above are also exemplary, there being other arrangements of mechanical triggers, shock absorbers and actuators that will perform the same functions as those listed above.

The operation of clamping mechanism 100 of FIG. 1 will now be described but it will be understood that this description applies also to the embodiments shown in FIGS. 37 to 46, noting that the operation of the additional features shown in these Figures have been largely described above.

In operation, referring to FIGS. 1 and 4, when the launch adapter ring 502 breaks the forward light beam 300 formed between the forward light 154 and the forward receiver 156 a signal is sent to and interpreted by the computer system 600. Any differences in the signals sent by the forward receivers 156 on each clamp jaw assembly 200 (shown in more detail in FIG. 29) are interpreted as errors by the computer system 600 and may be used, as part of a broader control system, to correct the position of the capture mechanism 100 in real time.

The capture mechanism 100 continues to be advanced over the launch adapter ring 502 until the aft light beams 301 formed by the aft lights 155 and the aft receivers 157 are broken by the launch adapter ring 502. If the two forward light beams 302 remain broken and at least one of the aft light beams 301 is broken, the capture mechanism is configured to be in an acceptable position to grasp the launch adapter ring 502. This prompts the optical initator's activation of the trigger 140 whereby the computer system 600 generates a signal that causes the solenoid 161 (FIG. 17) to activate, causing the solenoid lever 162 (FIGS. 17 and 25) to rotate and forcing the trigger striker 165 to contact the trigger 140 causing it to rotate. FIG. 25 shows an exploded view of the solenoid assembly which includes solenoid 161, solenoid lever 162, trigger striker 165, a lever pin 164, solenoid pin 163 and solenoid mounting plate 160.

An alternate embodiment to initiating the motion of the trigger 140 would be to introduce a mechanical initiator that is activated by physical contact of the capture mechanism with the launch adapter ring 502 or other bracket to be grasped. This mechanical initiator would include a contact rod secured to the main housing 110 in such a way that the contact force as the rod strikes the client bracket is transmitted directly to the trigger 140. The use of sliding bearings, bell cranks and other methods of mechanical force transmission well known in the art, permit the location of the contact rod to be optimised to the client bracket and the design of the rest of the capture mechanism 100. This mechanical contact means of initiating the trigger 140 could be the primary trigger initiation method or act as a secondary or back-up to the electromechanical trigger initiation method.

A second alternative embodiment for initiating the rotation of the trigger 140 would involve replacing the optical light curtain with inductive sensing means which detected when the launch adapter ring 502 is sufficiently aligned over the inductive sensors.

Once the trigger 140 rotates, the trigger roller 145 (FIGS. 13, 14, 15 and 17) rolls up the face of the sear 141, the trigger roller 145 acting to reduce friction and ensuring a smooth and repeatable release. FIG. 26 is a partial exploded view showing installation of the shuttle plungers 170. Referring to FIGS. 11 and 26, the plunger springs 171 and plungers 170 push against the draw bars 116 attached to the shuttle 114 and apply a force that attempts to move the shuttle 114 forward.

The sear 141 is in contact with the trigger bar 130 (FIG. 15) attached to the shuttle 114 preventing the shuttle 114 from moving forward. See FIGS. 13, 14, 15 and 16 that illustrate how the trigger 140 and sear 141 resist the motion of the trigger bar 130. When the trigger roller 145 has moved far enough that it no longer restricts the rotation of the sear 141, the sear 141 is rotated by the forces generated by the plunger springs 171 and the shuttle 114 and draw bars 116 are free to move forward very quickly. Referring to FIG. 10, as the shuttle 114 moves forward it is guided by sliding on the guide shaft 111, friction being reduced by the use of the guide shaft bearings 112, appropriately spaced by the guide shaft bearing spacer 113.

Should the capture mechanism 100 be triggered in error or fail to capture the client spacecraft 503 the shuttle 114 may continue too far forward striking the ball screw nut 124 (FIG. 9). To prevent damage in such a condition, the ball screw nut 124 is fitted with two shock absorbers 125 that will absorb the impact of the shuttle 114 from a failed capture.

Referring to FIGS. 19A and 33, the forward motion of the draw bars 116 also forces the cam follower assembly 240 forward. The cam follower 240 assembly is connected to the main housing 110 by journal bearings 206 and 262 (FIGS. 29 and 31) that restrict lateral movement but permit rotational and axial movement and by a compliance spring 260 that prevents damage at the extremes of motion which is contained by the clamp retainer 261 which is bolted to the main housing 110.

FIG. 19A shows the configuration of the clamp jaw assembly 200 at the instant the shuttle 114 begins to move. The launch adapter ring 502 is in the correct position to be grasped. As the cam follower assembly 240 moves forward the cam rollers 248 move along a predetermined jaw cam surface 302 (FIG. 5) and force the variable jaw assembly 210 and the locking jaw assembly 230 closer towards each other overcoming the biasing effect of the jaw hinge springs 207. FIG. 19B shows the clamp jaw assembly 200 at the end of the plunger spring 171 stroke with the variable jaw assembly 210 and the locking jaw assembly 230 closed sufficiently such that the launch adapter ring 502 cannot escape, yet there is no actual contact with the launch adapter ring 502. The launch adapter ring 502 is now considered "soft captured" and the first, automatic step of the two-step capture is complete.

Referring to FIGS. 11, 11, 26, 27 and 28, microswitches 117 (FIG. 11) within the capture mechanism 100 are closed as the shuttle 114 passes by them providing a signal to the computer system 600 that soft capture has been achieved. The computer system 100 then commands the actuator 180 to rotate such that the torque is transmitted from the motor output gear 184 through the idler 185 and to the ball screw input gear 186 causing the ball screw 120 to rotate. The ball screw 120 rotates within and is connected to the main housing 110 by the ball screw thrust bearing 121 and the ball screw tail bearing 122 (FIG. 21). As shown in FIG. 21, Ball screw 120 also rotates within the ball nut 124 which is fixed within the shuttle 114 by the shock absorber mount plate 126 and the nut plate 127. Because the ball nut 124 is constrained from rotating within the shuttle 114, the actuator 180 torque results in an axial force on the shuttle 114 forcing the shuttle to continue to move forward also driving the two cam follower assemblies 240 further forward. During the rotation of actuator 180 during the capture sequence, the rotation location of the actuator shaft may be continuously monitored and stored in the computer 600. Alternatively, calibration during assembly will reveal the number of rotations of the actuator shaft of actuator 180 required to perform the capture sequence and hence the reset sequence.

As the cam follower assembly 240 moves further forward, the shape of the jaw cam surfaces 302 forces the variable jaw assembly 210 and the lock jaw assembly 230 closer together, as shown in FIG. 19C. Part of the cam follower assembly 240 is the contact 246. in the position defined as "seated", shown in FIG. 19C, the jaws 210 and 230 are closed to the point that they just about touch the outer and inner diameters of the launch adapter ring 502 and the contact 246 almost touches the face of the launch adapter ring 502. As the actuator 180 continues to apply torque the cam follower continues to move forward and the variable jaw assembly 210 and the lock jaw assembly 230 continue to get closer together. The launch adapter ring eventually contacts the contact rods 232 on the locking jaw assembly 230, the contact plungers 217 on the variable jaw assembly 210 and the contact 246 on the cam follower assembly 240.

The actuator 180 continues to force the cam follower assembly 240 further forward and, as shown in FIG. 19C, the shape of the jaw cam surface 302 forces the variable jaw assembly 210 and the lock jaw assembly 230 even closer together. In doing so, the contact rods 232 (FIG. 34) force the launch adapter ring 502 down onto the contact plungers 217 compressing the contact springs 218 (FIG. 30). At the same time the contact 246 in FIG. 33 is pushed into the face of the launch adapter ring 502 compressing the contact spring 245 in FIG. 33. When the desired level of force is generated in the contact springs 218 and 245 the launch adapter ring 502 is considered fully preloaded to the point where the attachment between the capture mechanism 100 and the launch adapter ring 502 has achieved the desired level of stiffness (i.e. has been "rigidised") to permit the attachment to resist loads generated during spacecraft stabilisation and other servicing tasks. This condition is shown in FIG. 19D.

In order to provide a further lock between the two spacecraft, the locking jaw assembly 230 in FIG. 34 is equipped with a lock that physically prevents the launch adapter ring 502 from being removed from the capture mechanism 100. As shown in FIG. 19E, when the cam follower assembly 240 has reached the position where the full preload has been developed, it is advanced still further. The combination of the cam rollers 248 and the jaw cam surface 302 do not act to compress the jaws 210 and 230 further, but the lock roller 252 now engages with the lock cam surface 303 on the back of the lock 235 and overcomes the biasing effect of the lock spring 236 (shown in FIG. 34) to force the lock 235 into a position where it prevents the movement of the launch adapter ring 502. The capture mechanism 100 and the launch adapter ring 502 are now preloaded and locked together completing the second stage of the two-stage capture sequence.

Referring again to FIGS. 19E to 19A, to permit the servicing of several spacecraft or to permit additional attempts to capture a client spacecraft that might not have been captured on the first attempt, the capture mechanism 100 can be unlatched and reset to its initial condition. To do so generally amounts to running the actuator 180 in the opposite direction and causing the cam follow assembly 240 to move aft, moving the cam rollers 248 in the reverse direction down the lock cam surface 302 and the jaw cam surface 301 which, in sequence allows the lock 235 to be biased away from the launch adapter ring 502 and then unloads the contact 246 and the contact plungers 217. The jaw hinge springs then can bias the jaws 210 and 230 away from the launch adapter ring 502. At any point between FIGS. 19B and 19A it is possible for the capture mechanism to be maneuvered away from the launch adapter ring 502 by the robotic arm 501.

To fully reset the capture mechanism 100, the trigger 140 must be reset in its initial position. To do so, the actuator 180 continues to force the shuttle 114 aftwards within the capture mechanism 100 until the trigger reset pawl 135, see FIG. 15, located on the trigger reset lever 136, contacts the trigger pawl surface 304 on the trigger bar support 131. The trigger reset lever 136 is biased in the untriggered position by the trigger lever reset spring 146 and prevented from rotating too far by the trigger lever reset stop 147 as shown in FIG. 15. As the shuttle 114 is pushed aft, the contact between the trigger reset pawl 135 and the trigger pawl surface 304 rotates the trigger reset lever 136. The sear reset rod 143 contacting the back of the lever slot 305 then forces the sear 141 to rotate along with the trigger reset lever 135. The trigger 140 and trigger roller 145 are flexibly secured within the trigger housing 132 and biased to the untriggered position by the trigger spring 142. As the trigger roller 145 is moved out of the way by the motion of the sear 141, the trigger 140 rotates until the trigger roller 145 passes over the top of the sear 141 and then starts to contact the trigger surface 306, see FIG. 16. Prior knowledge of how many actuator 180 turns are required to reset the trigger 140 allows the computer system 600 or a human operator to know when the trigger 140 has been reset. Alternately, a position sensor (not shown in the embodiment) may be used to determine when the sear 141 had returned to the untriggered state. The trigger spring 142 biases the trigger 140 into the correct position against the trigger surface 306 on the sear 141.

The rotation of the actuator 180 is once again reversed to drive the shuttle 114 forward. As the shuttle 114 moves forward the trigger bar 130 contacts the trigger bar surface 307 on the sear 141. The trigger mechanism is now reset, however the ball screw nut 124 continues to be driven forward in the ball screw nut slot 308, (FIGS. 22 and 24) leaving the shuttle 114 to be retained by the trigger mechanism. The ball screw nut 124 has been moved forward sufficiently that when the capture mechanism 100 is triggered the shuttle 114 can move forward far enough to attain the soft capture state without being restricted by the shuttle 114 prematurely striking the ball nut screw 124. The capture mechanism 100 is now completely reset and ready for another capture.

Referring to FIG. 1, in order to service a wider range of clients and to accommodate variations in bracket size and position, the capture mechanism 100 may include additional features. To accommodate differences in launch adapter ring 502 diameter, the two clamp jaw assemblies 200 are mounted on clamp housing bearings 203 as shown in FIG. 29. These bearings 203 permit the clamp housing 201 to rotate about the axis of the cam follower assembly 240 with respect to the main housing 110. In this embodiment the two clamp jaw assemblies 200 are free to rotate independently. To keep the clamp jaw assemblies 200 in their nominal positions, each assembly 200 is connected to a torque rod 284 (FIG. 32) by a link 282 and then connected to the main housing 110 by a bracket 281. To keep the torque rod 284 centred on the bracket 281 a spring 283 is located on either side of the bracket 281. Rotations of the clamp jaw assembly 200 are accommodated by the sliding of the torque rod 284 within a slot in the bracket 281 which compresses one or the other spring 283 which generates a righting moment that returns the clamp jaw assembly 200 to the nominal position.

As shown in FIG. 30, to accommodate launch adapter rings 502 of differing profile shape the variable jaw assembly 210 incorporates a two-part jaw with a fixed clamp hinge plate 212 connected flexibly to a variable jaw 214 by a clamp hinge pin 215. Rotation of the variable jaw 214 is limited to a desired range by features machined into the variable jaw 214 and the clamp hinge plate 212 and the variable jaw 214 is biased to any desired position relative to the clamp hinge plate 212 by the spring 216. When the variable jaw assembly 210 is closed over varying profiles within a known range of shapes, the shape and flexible position of the variable jaw 214 permits the entire clamp jaw assembly 200 to correctly grasp varying shapes within a predetermined range.

An alternate embodiment can incorporate a linking mechanism that coordinates the rotation of the two clamp jaw assemblies 200 so that a wider range of launch adapter ring 502 diameters can be accommodated. To further increase the range of launch adapter ring 502 diameters, each bracket 281 can be connected to an actuator that changes the nominal position of the bracket, and therefore the changes nominal diameter of launch adapter ring 502 being grasped.

An alternate embodiment has the entire capture mechanism 100 as a separate tool that the robotic arm 501 may releasably grip to permit the robotic arm to perform additional functions. The separate tool embodiment would include a releaseable interface between the robotic arm 501 and the capture mechanism 100 such that mechanical forces, electrical power and sensor signals can be transmitted across the interface. Several such interfaces exist in prior art and they are not part of this invention.

An alternate embodiment would delete the vision system 602, and the line producing lasers 151 and rely exclusively upon human control to maneuver the capture mechanism 100 and upon mechanical contact to actuate the trigger mechanism per the alternate embodiment above.

The capture mechanism disclosed herein is very advantageous over the spacecraft capture mechanism disclosed in US Patent Publication 2013-0249229-A1 published Sep. 26, 2013, (hereinafter '229), for the following reasons. The capture mechanism disclosed in '229 has a very limited range of objects that it can optimally grasp, while the mechanism disclosed herein is designed for a much greater range of objects that it can optimally grasp and that adjustment can be varied during the use of the tool to greatly increase the utility of the tool. As one example of this, the pairs of grasping jaws include structural features configured to accommodate local variations in size and shape of the capture feature at the two locations on the capture feature being grasped by the two pairs grasping jaws.

Further, mechanism disclosed in '229 has a single set of grasping members, or jaws, which results in larger forces within the entire capture mechanism during the rigidising operation thereby requiring members of greater size and mass to withstand those forces. Larger and more massive members not only reduce response time, but also lead to a higher overall mechanism size and mass which is highly undesirable for spacecraft systems.

The single set of grasping members in '229 is manufactured to optimally grasp features of a limited range of sizes. This range cannot be changed once the grasping members are manufactured and installed in the mechanism. To increase its adjustability and utility, the mechanism in the current disclosure has multiple grasping mechanisms which may be adjusted in service to optimally grasp a much wider range of features and that may be changed for each grasping operation to greatly increase the utility of the tool.

In addition, the individual grasping members or pairs of grasping jaws of the capture mechanism disclosed herein also have adjustability designed into them to allow each of the grasping members to optimally contact and grasp objects with their anticipated relative motion with respect to the capture mechanism. This greatly enhances the tool's ability to accommodate varying objects to be grasped and increases the utility of the tool.

As an example of this, at least one grasping jaw of each pair of grasping jaws has a distal end locking portion which is flexibly mounted to a remainder of the grasping jaw and includes a cam surface which when in contact with an associated cam follower is forced into a locking position to lock the feature within the grasping jaws. In addition the present capture mechanism includes positioning mechanisms connected to each of the pairs of grasping jaws configured to vary a pose of each pair of grasping jaws with respect to the capture feature being grasped prior to being grasped. The quick grasp mechanism is configured such that each pair of grasping jaws is positioned independently of all other pairs of grasping jaws.

It will be understood that while the above discussion relates to an embodiment with at least two pairs of grasping jaws spaced from each other, it will be understood that more than two pairs of grasping jaws may be used, as the present disclosure is not meant to be limited to two pairs. In addition, the present disclosure may encompass an embodiment where only one pair of grasping jaws are needed. As the grasping jaws disclosed herein have various structure features that allow them to be adjusted for various sizes and shapes of capture features. This would be beneficial when the satellite being captured is very small and the capture feature is such that it is more amenable to grasping by one pair of grasping jaws.

In addition, a satellite may be produced with the capture system as part of the satellite.

Referring again to FIG. 35, a block diagram showing those items pertaining to the capture of a client spacecraft 503 in addition to the capture mechanism 100. These include the servicer spacecraft 500, the client spacecraft 503 with launch adapter ring 502 to be captured, a robotic arm 501 to which the capture mechanism 100 is interfaced and a communication system 506 to provide a two-way radio link 504 to Earth 505 (or space station or mother ship, whichever is the location of the teleoperation control).

In addition, the servicer spacecraft 500 includes an onboard computer control system 600 (see FIG. 36) which may be interfaced with the capture mechanism 100, so that it can coordinate all the components that are involved in the capture process, including the vision system 602, robotic arm(s) 501 (if more than one capture mechanism 100 is used). This control system 600 is also interfaced with any sensors used to determine the position and loading state of the soft capture or rigidise mechanisms. These sensors may include contact or non-contact sensors used to trigger the quick grasp mechanism (in lieu of the plunger) and position sensors to determine the degree of closure of the mechanisms using continuous means (encoders or resolvers) or discretely (using limit switches). With the presence of the computer system 600 interfaced with the capture mechanism 100, the capture process may be autonomously controlled by a local mission manager or may include some levels of supervised autonomy so that in addition to being under pure teleoperation there may be mixed teleoperation/supervised autonomy.

Referring again to FIG. 36, an example computing system 600 forming part of the servicing system is illustrated. The system includes a computer control system 601 configured, and programmed to control movement of the robotic arm 501 during the entire procedure of capturing launch adapter ring 502 on the client satellite 503.

The command and control system is also configured to control movement of the robotic arm 501 and for controlling the action of the capture mechanism 100. This may be the same command and control system that is interfaced with the capture mechanism 100, for example a computer mounted on the servicer spacecraft which is programmed with instructions to carry out all operations needed to be performed by the servicer satellite during approach, capture/docking with the client satellite and refueling operations. It may also be a separate computer system.

Communication system 506 is interfaced with the robotic arm 501 and configured to allow remote operation (from the Earth 505 or from any other suitable location) of the vision system 602 (which may include one or more cameras), the robotic arm 501 and hence the capture mechanism 100. The vision system 602 may include distinct markers mounted on the capture mechanism 100. The communication system allows local automatic or autonomous control, and may send a) vision system information robot control computer on spacecraft, where it processes visual information to determine relative pose and allow the arm/positioning device to position the capture mechanism relative to the capture 500; and/or b) capture tool information/telemetry including the light beam state and trigger information.

Alternatively, it may be under teleoperated control from a remote location (earth) where the vision system information and other telemetry is provided to the operator to make decisions and control the action of the positioning device (arm) and the capture tool.

In one form, the vision system 602 may include one or more video cameras. To improve depth perception, it may be augmented with a range finding device, such as a laser range finder or radar. The cameras of vision system 602 may be used within a telerobotic control mode where an operator controlling the servicing actions on earth or from some other remote location views distinct views of the worksite on display screens at the command and control console. In an alternative mode, the position of elements of the capture mechanism 100 or launch adapter ring 502 may be determined by either a stereo camera and vision system which extracts 3d points and determines position and orientation of the capture mechanism 100 or other relevant features on the ring 502, client spacecraft 503 or capture mechanism 100 from which the robotic arm 501 can be driven to desired locations according the sensed 6 degree-of-freedom coordinates. It should be noted that the term position in the context of the positioning of the servicing spacecraft with respect to the spacecraft to be captured includes the orientation of the object as well as the translation vector between the two objects, i.e. the overall relative pose of the capture feature on the client spacecraft with respect to servicer spacecraft.

The stereo camera could also be replaced with a scanning or flash lidar system from which desired 6 degree-offreedom coordinates could be obtained by taking measured 3-D point clouds and estimating the pose of desired objects based on stored CAD models of the desired features or shapes on the refueling worksite. For those applications where the spacecraft was designed with the intention to be serviced, a simple target such as described in Ogilvie et al. (Ogilvie, A., Justin Allport, Michael. Hannah, John Lymer, "Autonomous Satellite Servicing Using the Orbital Express Demonstration Manipulator System," Proc. of the 9th International Symposium on Artificial Intelligence, Robotics and Automation in Space (i-SAIRAS '08), Los Angeles, Calif., Feb. 25-29, 2008) could be used in combination with a monocular camera on the servicing robotics to locations items of interest. Finally, the robotic arm or device used to position the capture mechanism 100 may include a sensor or sensors capable of measuring reaction forces between the capture tool and the bracket being captured. These can be displayed to the operator to aid the operator in teleoperation control or can be used in an automatic force-moment accommodation control mode, which either aids a tele-operator or can be used in a supervised autonomous control mode.

As mentioned above, computer control system 603 is interfaced with vision system 602 and robotic arm 501. Previously mentioned communication system 506 is provided which is interfaced with the robotic arm 501 and configured to allow remote operation (from the Earth 506 or from any other suitable location) of the vision system 602 (the robotic arm 501 and capture mechanism 100. A system of this type is very advantageous particularly for space based systems needing remote control.

The robotic arm 501 possesses its own embedded processor and receives commands from the servicing spacecraft computer. The robotic arm 501 also passes power and data from the central computer through to the capture mechanism 100 in the event there are sensors of any type, gauges or other power requiring devices Some aspects of the present disclosure can be embodied, at least in part, in software. That is, the techniques can be carried out in a computer system or other data processing system in response to its processor, such as a microprocessor, executing sequences of instructions contained in a memory, such as ROM, volatile RAM, non-volatile memory, cache, magnetic and optical disks, or a remote storage device. Further, the instructions can be downloaded into a computing device over a data network in a form of compiled and linked version. Alternatively, the logic to perform the processes as discussed above could be implemented in additional computer and/or machine readable media, such as discrete hardware components as large scale integrated circuits (LSI's), application-specific integrated circuits (ASIC's), or firmware such as electrically erasable programmable read-only memory (EEPROM's).

FIG. 37 provides an exemplary, non-limiting implementation of computer control system 601, forming part of the command and control system, which includes one or more processors 603 (for example, a CPU/microprocessor), bus 609, memory 607, which may include random access memory (RAM) and/or read only memory (ROM), one or more internal storage devices 604 (e.g. a hard disk drive, compact disk drive or internal flash memory), a power supply 606, one more communications interfaces 605, and various input/output devices and/or interfaces 608.

Although only one of each component is illustrated in FIG. 37, any number of each component can be included in computer system 600. For example, a computer typically contains a number of different data storage media. Furthermore, although bus 609 is depicted as a single connection between all of the components, it will be appreciated that the bus 609 may represent one or more circuits, devices or communication channels which link two or more of the components. For example, in personal computers, bus 609 often includes or is a motherboard.

In one embodiment, computer control system 601 may be, or include, a general purpose computer or any other hardware equivalents configured for operation in space. Computer control system 601 may also be implemented as one or more physical devices that are coupled to processor 603 through one of more communications channels or interfaces. For example, the computer control system 601 can be implemented using application specific integrated circuits (ASIC). Alternatively, computer control system 601 can be implemented as a combination of hardware and software, where the software is loaded into the processor from the memory or over a network connection.

The computer control system 601 may be programmed with a set of instructions which when executed in the processor causes the system to perform one or more methods described in the present disclosure. Computer control system 601 may include many more or less components than those shown.

While some embodiments have been described in the context of fully functioning computers and computer systems, those skilled in the art will appreciate that various embodiments are capable of being distributed as a program product in a variety of forms and are capable of being applied regardless of the particular type of machine or computer readable media used to actually effect the distribution.

A computer readable medium can be used to store software and data which when executed by a data processing system causes the system to perform various methods. The executable software and data can be stored in various places including for example ROM, volatile RAM, non-volatile memory and/or cache. Portions of this software and/or data can be stored in any one of these storage devices. In general, a machine readable medium includes any mechanism that provides (i.e., stores and/or transmits) information in a form accessible by a machine (e.g., a computer, network device, personal digital assistant, manufacturing tool, any device with a set of one or more processors, etc.). Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., compact discs (CDs), digital versatile disks (DVDs), etc.), among others. The instructions can be embodied in digital and analog communication links for electrical, optical, acoustical or other forms of propagated signals, such as carrier waves, infrared signals, digital signals, and the like.

The present system is also configured for full autonomous operation. A fully autonomous system is a system that measures and responds to its external environment; full autonomy is often pursued under conditions that require very responsive changes in system state to external conditions or for conditions that require rapid decision making for controlling hazardous situations. The implementation of full autonomy is often costly and is often unable to handle unforeseen or highly uncertain environments. Supervised autonomy, with human operators able to initiate autonomous states in a system, provides the benefits of a responsive autonomous local controller, with the flexibility provided by human teleoperators.

Therefore what is claimed is:

1. A system for capturing a capture feature on a free flying spacecraft, comprising:
   a capture mechanism including
   i) a quick grasp mechanism mounted for movement in a housing, said quick grasp mechanism including at least two spaced pairs of grasping jaws and a closing/opening mechanism connected to said at least two pairs of grasping jaws for closing/opening each pair of grasping jaws, said quick grasp mechanism being configured for forcing said at least two spaced pairs of grasping jaws together around said capture feature to grasp the capture feature;
   ii) said at least two pairs of grasping jaws including structural features configured to accommodate local variations in size and shape of the capture feature at at least two locations on the capture feature being grasped by said at least two pairs grasping jaws; and
   ii) a rigidizing mechanism including a rigidizing contact feature, said rigidizing mechanism being configured to force said at least two spaced grasping jaws further together to a closed position and at the same time driving said rigidizing contact feature into contact with said capture feature within said at least two grasping jaws to secure said capture feature within said closed grasping jaws between said rigidizing contact and said closed grasping jaws, to rigidize the capture feature and the spacecraft.

2. The system according to claim 1, wherein said rigidizing contact feature is a reciprocally moveable member, wherein said rigidizing mechanism includes a pair of cam followers with each cam follower engaging a cam surface integral to each associated grasping jaw, an actuator connected to said reciprocally moveable member, and as said reciprocally moveable member is driven forward by said actuator, said pair of cam followers drive the grasping jaws closed and drives said reciprocally moveable member forward into contact with the capture feature.

3. The system according to claim 1, including a sensor associated with said quick grasp mechanism configured to trigger said quick grasp mechanism to close said at least two pairs of grasping jaws when it senses the capture feature at a predetermined location with respect to said quick grasp mechanism.

4. The system according to claim 1, including positioning mechanisms operably connected to each of said at least two pairs of grasping jaws configured to vary a pose of each pair of grasping jaws with respect to said capture feature being grasped prior to being grasped.

5. The system according to claim 4, wherein said quick grasp mechanism is configured for positioning each pair of grasping jaws independently of all other pairs of grasping jaws.

6. The system according to claim 4 wherein at least one grasping jaw of each pair of grasping jaws has one or more distal end portions which are flexibly mounted to a remainder of the at least one grasping jaw, and are shaped to accept a range of capture feature shape profiles.

7. The system according to claim 1 wherein at least one grasping jaw of each pair of grasping jaws has one or more distal end portions which are flexibly mounted to a remainder of the at least one grasping jaw, and are shaped to accept a range of capture feature shape profiles.

8. The system according to claim 1 wherein at least one grasping jaw of each pair of grasping jaws has a distal end locking portion which is flexibly mounted to a remainder of said at least one grasping jaw and includes a cam surface which when in contact with an associated cam follower is forced into a locking position to lock the feature within the grasping jaws.

9. The system according to claim 1 including an optical-based initiator for activating said closing/opening mechanism, and wherein said optical-based initiator includes at least one light source and a light detector for detecting a beam of light from said at least one light source, said light detector being spaced from said light source with the light source and light detector being located in positions with respect to said at least two pairs of grasping jaws such that when the capture feature breaks the beam of light said closing/opening mechanism is activated to close each pair of grasping jaws towards each other.

10. The system according to claim 1 including a mechanical initiator, said mechanical initiator for activating said closing/opening mechanism, said mechanical initiator including at least one mechanical initiator feature located with respect to said at least two pairs of grasping jaws such that when the capture feature physically contacts said mechanical initiator feature, said opening/closing mechanism is activated.

11. The system according to claim 1, further comprising
   a) a positioning mechanism releasably attachable to the capture mechanism capable of positioning the capture mechanism into close proximity to the capture feature to trigger the quick grasp mechanism; and
   b) a sensing system for ascertaining a relative position of the capture mechanism with respect to the capture feature.

12. The system according to claim 11 including a computer control system connected to said sensing system and said positioning mechanism and programmed to position the capture mechanism in close proximity to said capture feature to trigger said quick grasp mechanism.

13. The system according to claim 12 wherein said computer control system is further programmed to control the actions of said quick grasp and ridigizing mechanisms.

14. The system according to claim 12 including a second computer control system programmed to control the actions of said quick grasp and ridigizing mechanisms.

15. The system according to claim 12 further comprising a communication system configured to provide communication between a remote command and control system and said computer control system.

16. The system according to claim 15 wherein said sensing system includes a vision system mounted and configured to provide real time images of all capture and release operations, said vision system being connected to said communication system for transmitting said images to a teleoperator during teleoperation.

17. The system according to claim 14 wherein said sensing system includes a vision system mounted and configured to provide real time images of all feature capture operations, said vision system being connected to said communication system for transmitting said images to said computer control system and being configured to be used in an autonomous control system.

18. A servicer satellite for capturing a capture feature on a free flying client satellite, comprising:
   a) propulsion and guidance systems;
   b) a capture mechanism, the capture mechanism comprising ii) said at least two pairs of grasping jaws including structural features configured to accommodate local variations in size and shape of the capture feature at at least two locations on the capture feature being grasped by said at least two pairs grasping jaws; and ii) a rigidizing mechanism including a rigidizing contact feature, said rigidizing mechanism being configured to force said at least two spaced grasping jaws further together to a closed position and at the same time driving said rigidizing contact feature into contact with said capture feature within said at least two grasping jaws to secure said capture feature within said closed grasping jaws between said rigidizing contact and said closed grasping jaws, to rigidize the capture feature and the spacecraft c) a positioning mechanism releasably attached to the capture mechanism capable of positioning the capture mechanism to a desired proximity to the capture feature to trigger the quick grasp mechanism;

d) a sensing system for ascertaining a relative position of the capture mechanism and the capture feature; and e) a communication system configured to provide communication between a command and control system and a remote operator for remote teleoperator control, supervised autonomous control, or fully autonomous control of all servicer satellite operations and operation of said capture mechanism between the servicer spacecraft and the client satellite.

19. The servicer satellite according to claim 18 wherein said command and control system includes a computer control system connected to said sensing system and said positioning mechanism and programmed to position the capture mechanism in a desired proximity to said capture feature to trigger said quick grasp mechanism.

20. The servicer satellite according to claim 18, wherein said rigidizing contact feature is a reciprocally moveable member, wherein said rigidizing mechanism includes a pair of cam followers with each cam follower engaging a cam surface integral to each associated grasping jaw, an actuator connected to said reciprocally moveable member, and as said reciprocally moveable member is driven forward by said actuator, said pair of cam followers drive the grasping jaws closed and drives said reciprocally moveable member forward into contact with the capture feature.

21. The servicer satellite according to claim 18, including a sensor associated with said quick grasp mechanism configured to trigger said quick grasp mechanism to close said at least two pairs of grasping jaws when it senses the capture feature at a predetermined location with respect to said quick grasp mechanism.

22. The servicer satellite according to claim 18, including positioning mechanisms operably connected to each of said at least two pairs of grasping jaws configured to vary a pose of each pair of grasping jaws with respect to said capture feature being grasped prior to being grasped.

23. The servicer satellite according to claim 22, wherein said quick grasp mechanism is configured for positioning each pair of grasping jaws independently of all other pairs of grasping jaws.

24. The servicer satellite according to claim 22 wherein at least one grasping jaw of each pair of grasping jaws has one or more distal end portions which are flexibly mounted to a remainder of the at least one grasping jaw, and are shaped to accept a range of capture feature shape profiles.

25. The servicer satellite according to claim 18 wherein at least one grasping jaw of each pair of grasping jaws has one or more distal end portions which are flexibly mounted to a remainder of the at least one grasping jaw, and are shaped to accept a range of capture feature shape profiles.

26. The servicer satellite according to claim 18 wherein at least one grasping jaw of each pair of grasping jaws has a distal end locking portion which is flexibly mounted to a remainder of said at least one grasping jaw and includes a cam surface which when in contact with an associated cam follower is forced into a locking position to lock the feature within the grasping jaws.

27. The servicer satellite according to claim 18 including an optical-based initiator for activating said closing/opening mechanism, and wherein said optical-based initiator includes at least one light source and a light detector for detecting a beam of light from said at least one light source, said light detector being spaced from said light source with the light source and light detector being located in positions with respect to said at least two pairs of grasping jaws such that when the capture feature breaks the beam of light said closing/opening mechanism is activated to close each pair of grasping jaws towards each other.

28. The servicer satellite according to claim 18 including a mechanical initiator, said mechanical initiator including at least one mechanical initiator feature located with respect to said at least two pairs of grasping jaws such that when the capture feature physically contacts said mechanical initiator feature whereby said opening/closing mechanism is activated.

29. A capture mechanism for capturing a capture feature on a free flying spacecraft, comprising:
i) a quick grasp mechanism mounted for movement in a housing, said quick grasp mechanism including a pair of opposed grasping jaws configured to be sprung closed and a closing/closing mechanism connected to said opposed grasping jaws for closing/opening said pair of grasping jaws, said quick grasp mechanism being configured for forcing said pair of grasping jaws together around said capture feature to grasp the capture feature;
ii) at least one grasping jaw of said pair of grasping jaws including one or more distal end portions which are flexibly mounted to a remainder of the at least one grasping jaw, and are shaped and sized to accept and grasp a predetermined range of capture feature shape profiles;
iii) a rigidizing mechanism independently actuated from said quick grasp mechanism, said rigidizing mechanism including a rigidizing contact feature, said rigidizing mechanism being configured to force said pair of grasping jaws further together to a closed position and at the same time driving said rigidizing contact feature into contact with said capture feature within said at least two grasping jaws to secure said capture feature within said closed grasping jaws between said rigidizing contact and said closed grasping jaws, to rigidize the capture feature and the spacecraft.

30. The capture mechanism according to claim 28 wherein at least one grasping jaw of said pair of grasping jaws has a distal end locking portion which is flexibly mounted to a remainder of said at least one grasping jaw and includes a cam surface which when in contact with an associated cam follower is forced into a locking position to lock the feature within the grasping jaws.

31. A method for capturing a capture feature on a free flying spacecraft, comprising:
a) maneuvering a servicer satellite in proximity to a free flying spacecraft;

b) positioning a capture mechanism mounted on the servicer satellite into proximity to a capture feature located on the free flying spacecraft, the capture mechanism including
  i) a quick grasp mechanism mounted for movement in a housing, said quick grasp mechanism including at least two spaced pairs of grasping jaws and a closing/closing mechanism connected to said at least two pairs of grasping jaws for closing/opening each pair of grasping jaws, said quick grasp mechanism being configured for forcing said at least two spaced grasping jaws together around said capture feature to grasp the capture feature;
  ii) said at least two pairs of grasping jaws including structural features configured to accommodate local variations in size and shape of the capture feature at at least two locations on the capture feature being grasped by said at least two pairs grasping jaws; and
  ii) a rigidizing mechanism including a rigidizing contact feature, said rigidizing mechanism being configured to force said at least two spaced grasping jaws further together to a closed position and at the same time driving said rigidizing contact feature into contact with said capture feature within said at least two grasping jaws to secure said capture feature within said closed grasping jaws between said rigidizing contact and said closed grasping jaws, to rigidize the capture feature and the spacecraft;
c) once the capture mechanism is in proximity to said capture feature, advancing the capture mechanism until quick grasp mechanism is in position and triggering the quick grasp mechanism to close said at least two pairs of grasping jaws to soft capture the capture feature, activating the rigidizing mechanism to rigidize the capture feature and the free flying spacecraft; and
d) after servicing the free flying spacecraft, disengaging the capture mechanism from the capture feature and maneuvering a servicer satellite away from the free flying spacecraft.

32. The method according to claim 31 wherein the step of triggering the quick grasp mechanism to close said at least two pairs of grasping jaws is initiated using an initiator built into said capture mechanism.

33. The method according to claim 32 wherein the initiator is an optically based initiator, and wherein said optical-based initiator includes at least one light source and a light detector for detecting a beam of light from said at least one light source, said light detector being spaced from said light source with the light source and light detector being located in positions with respect to said at least two pairs of grasping jaws such that when the capture feature breaks the beam of light said closing/opening mechanism is activated to close each pair of grasping jaws towards each other.

34. The method according to claim 32 wherein the initiator is a mechanically based initiator, said mechanically based initiator including at least one mechanical initiator feature located with respect to said at least two pairs of grasping jaws such that when the capture feature physically contacts said mechanical initiator feature, said opening/closing mechanism is activated.

35. The method according to claim 31 wherein the step of triggering the quick grasp mechanism to close said at least two pairs of grasping jaws is initiated remotely by an operator controlling capture operations.

\* \* \* \* \*